US012691753B2

(12) United States Patent
Sun

(10) Patent No.: US 12,691,753 B2

(45) Date of Patent: Jul. 28, 2026

(54) ACTUATION DEVICE, AND REFUELING PORT OR CHARGING PORT FLAP ASSEMBLY

(71) Applicant: Illinois Tool Works Inc., Glenview, IL (US)

(72) Inventor: Yuan Sun, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 379 days.

(21) Appl. No.: 18/242,616

(22) Filed: Sep. 6, 2023

(65) Prior Publication Data

US 2024/0083243 A1    Mar. 14, 2024

(30)    Foreign Application Priority Data

Sep. 14, 2022    (CN) .......................... 202211115245.X
Aug. 14, 2023    (CN) .......................... 202311021191.5

(51) Int. Cl.
    B60K 15/05       (2006.01)
    E05B 81/06       (2014.01)
    E05B 83/34       (2014.01)

(52) U.S. Cl.
    CPC .............. B60K 15/05 (2013.01); E05B 81/06 (2013.01); E05B 83/34 (2013.01); *B60K 2015/053* (2013.01); *B60K 2015/0576* (2013.01); *B60K 2015/0584* (2013.01)

(58) Field of Classification Search
    CPC .............. B60K 15/05; B60K 2015/053; B60K 2015/0576; B60K 2015/0584; E05B 81/06; E05B 83/34
    See application file for complete search history.

(56)    References Cited

U.S. PATENT DOCUMENTS

| | | | |
|---|---|---|---|
| 8,382,187 B2 * | 2/2013 | Guendouz .............. | B60K 15/05 141/348 |
| 8,677,690 B2 * | 3/2014 | Lee ......................... | E05B 83/34 49/324 |
| 9,689,183 B2 * | 6/2017 | Ito ........................... | E05B 81/06 |
| 9,856,679 B2 * | 1/2018 | Ito ........................... | E05B 81/06 |

(Continued)

*Primary Examiner* — Jonathan Malikasim

(74) *Attorney, Agent, or Firm* — McAndrews, Held & Malloy, Ltd.

(57)    ABSTRACT

The present disclosure provides an actuation device and a refueling port or charging port flap assembly. The actuation device comprises: a housing, a rotary motion mechanism, a linear motion mechanism, a rotary output mechanism and a linear output mechanism. The rotary motion mechanism and the linear motion mechanism are mounted inside the housing. The rotary output mechanism and the linear output mechanism are connected to the outside of the housing. The rotary output mechanism is configured to open and close a flap. The linear output mechanism is configured to lock and unlock the flap. A motion input mechanism, a motion output mechanism and a mounting structure of the actuation device each have a predetermined structure and size, so that the design of the actuation device can be simplified, facilitating mounting. In the present disclosure, further, a direction of a linear motion output of the actuation device is configured to be parallel to a direction of a rotation axis about which a rotary motion output of the actuation device is performed, thereby simplifying the mechanical structure of the actuation device.

20 Claims, 40 Drawing Sheets

(56) References Cited

U.S. PATENT DOCUMENTS

| | | | | |
|---|---|---|---|---|
| 10,196,841 | B2 * | 2/2019 | Kitamura | E05B 81/06 |
| 10,526,822 | B2 * | 1/2020 | Kitamura | E05B 77/38 |
| 10,759,290 | B2 * | 9/2020 | Sha | E05F 15/603 |
| 11,235,659 | B2 * | 2/2022 | Dvorak | B60K 15/05 |
| 11,433,764 | B2 * | 9/2022 | Noda | E05F 15/611 |
| 12,109,877 | B2 * | 10/2024 | Kaneko | B60K 15/05 |
| 2005/0274563 | A1 * | 12/2005 | Ahnafield | B60W 10/18 |
| | | | | 180/315 |
| 2019/0047428 | A1 * | 2/2019 | Sha | E05F 15/603 |
| 2019/0093399 | A1 * | 3/2019 | Sakurai | B60K 15/05 |
| 2022/0134873 | A1 * | 5/2022 | Beck | B60K 15/05 |
| | | | | 296/97.22 |
| 2022/0134874 | A1 * | 5/2022 | Tanaka | B60K 15/05 |
| | | | | 296/97.22 |

* cited by examiner

712

770

704

720

732

736

937

936    946

937

939    952

945

ACTUATION DEVICE, AND REFUELING PORT OR CHARGING PORT FLAP ASSEMBLY

RELATED APPLICATIONS

The present application claims the benefit of Chinese Patent Application Nos. 202211115245X, filed Sep. 14, 2022, and 2023110211915, filed Aug. 14, 2023, each titled "Actuation Device, and Refueling Port or Charging Port Flap Assembly," the contents of which are hereby incorporated by reference.

TECHNICAL FIELD

The present disclosure relates to an actuation device, and in particular to a simplified actuation device.

BACKGROUND

To enable refueling or recharging, a vehicle body of a vehicle is equipped with a refueling or charging port having a flap. In the early days, the closing and opening of a refueling port or charging port flap was manually operated. As the functionality of the vehicle evolves, consumers need to operate the refueling port or charging port flap in an automated way. Specifically, when refueling or charging is required, the flap needs to be automatically driven into an unlocked state first, and then automatically driven into an open position. After the refueling or charging is completed, the refueling port or charging port flap needs to be driven into a closed position, and then automatically driven into a locked state.

SUMMARY OF THE DISCLOSURE

In conventional designs, the structure for actuating and driving a refueling port or charging port flap is specifically designed in each vehicle model. For vehicles of different manufacturers and different vehicle models, due to the different sizes of the vehicle bodies of various types of models, the positions of the flap and the specific structures of the flap are different, resulting in a very complicated mechanical structure for automatically controlling the refueling port or charging port flap and a locking device, thereby making it very difficult to assemble and manufacture the mechanical structure for automatic control.

In the present disclosure, the structure for automatically controlling the refueling port or charging port flap and the locking device is integrated in a housing, and the housing is provided with a linear motion mechanism and a rotary motion mechanism that can work without relying on the mechanism outside the housing. A driving structure (comprising the linear motion mechanism and the rotary motion mechanism) in the housing has two outputs comprising a linear motion output and a rotary motion output. The housing is further provided with a driving input for driving the linear motion mechanism and the rotary motion mechanism in the housing. A mounting structure is provided outside the housing. The mounting structure and size outside the housing are predetermined, and the lengths of the linear motion output and the rotary motion output outside or inside the housing are predetermined. Therefore, when the vehicle manufacturers predetermine the size of an actuation device according to the size of the mounting structure of a shell of a driving component and the lengths of the linear motion output and the rotary motion output outside or inside the housing, the design of the actuation device can be simplified and the mounting of the actuation device can be facilitated.

Furthermore, the refueling port or charging port flap and the locking device move differently and have different positions on the vehicle body. The actuation device produces a rotary motion output to open and close the refueling port or charging port flap, and produces a linear motion output to drive the locking device to move, so as to lock and unlock the refueling port or charging port flap. In the present disclosure, a direction of the linear motion output of the actuation device is configured to be parallel to a direction of an axis about which the rotary motion output is performed, and the actuation device of such a configuration can reduce transmission distances of the motion outputs and simplify the mechanical structure.

In a first aspect, the present disclosure provides an actuation device for actuating a flap movably mounted on a base. The actuation device comprises a housing, a rotary motion mechanism, a linear motion mechanism, a rotary output mechanism and a linear output mechanism. The rotary motion mechanism and the linear motion mechanism are mounted inside the housing. The rotary output mechanism and the linear output mechanism are connected to the outside of the housing. The rotary output mechanism is configured to open and close a flap. The linear output mechanism is configured to lock and unlock the flap.

According to the first aspect described above, the actuation device further comprises a power input mechanism. The power input mechanism is configured to receive power provided by a power source, so as to drive the rotary motion mechanism and the linear motion mechanism.

According to the first aspect described above, the rotary output mechanism, the linear output mechanism and the power input mechanism each have a predetermined structure and size.

According to the first aspect described above, the housing comprises a mounting component. The mounting component has a predetermined structure and size.

According to the first aspect described above, the actuation device is mounted on the base via the mounting component. The rotary output mechanism cooperates with a rotary driving mechanism mounted on the base. The linear output mechanism cooperates with a linear driving mechanism mounted on the base. The linear output mechanism cooperates with a flap connecting mechanism connected to the flap.

According to the first aspect described above, the flap is opened and closed by the rotary driving mechanism. The flap is locked and unlocked by the linear driving mechanism.

In a second aspect, the present disclosure provides an actuation device for actuating a flap movably mounted on a base. The actuation device comprises a rotary motion mechanism, a linear motion mechanism and a driving mechanism. The rotary motion mechanism is configured to rotate about a rotation axis to open and close the flap. The linear motion mechanism is configured to move linearly to lock and unlock the flap. The driving mechanism is connected to the rotary motion mechanism and the linear motion mechanism, and is configured to drive the rotary motion mechanism and the linear motion mechanism. A direction in which the linear motion mechanism moves linearly is parallel to a direction of the rotation axis about which the rotary motion mechanism rotates.

According to the second aspect described above, the driving mechanism comprises a driving shaft, and is configured to be capable of rotating about an axis of the driving shaft so as to drive the rotary motion mechanism to rotate about the rotation axis and to drive the linear motion mechanism to move linearly. The direction of the rotation axis about which the rotary motion mechanism rotates is parallel to a direction of the axis of the driving shaft. The direction in which the linear motion mechanism moves linearly is parallel to the direction of the axis of the driving shaft.

According to the second aspect described above, the linear motion mechanism comprises an inner circumferential portion. The inner circumferential portion is arranged partially around the driving mechanism. The inner circumferential portion is configured to cooperate with the driving mechanism such that the linear motion mechanism reciprocates along a predetermined linear path to unlock and lock the flap.

According to the second aspect described above, the driving mechanism comprises an unlocking driving portion. The unlocking driving portion is configured to be capable of rotating about the axis of the driving shaft. The inner circumferential portion of the linear motion mechanism comprises an unlocking engagement portion. The unlocking driving portion and the unlocking engagement portion are configured such that when the driving mechanism rotates in a first rotational direction, the unlocking driving portion is capable of rotating to come into contact with and drive the unlocking engagement portion, so as to cause the linear motion mechanism to move linearly in a first linear direction parallel to the axis of the driving shaft to unlock the flap.

According to the second aspect described above, the driving mechanism further comprises a locking driving portion. The locking driving portion is configured to be capable of rotating about the axis of the driving shaft. The unlocking driving portion and the locking driving portion are separated in a circumferential direction. The inner circumferential portion of the linear motion mechanism further comprises a locking engagement portion. The unlocking engagement portion and the locking engagement portion are respectively arranged at opposite ends of the inner circumferential portion. The locking driving portion and the locking engagement portion are configured such that when the driving mechanism rotates in a second rotational direction, the locking driving portion is capable of rotating to come into contact with and drive the locking engagement portion, so as to cause the linear motion mechanism to move linearly in a second linear direction parallel to the axis of the driving shaft to lock the flap. The first rotational direction is opposite to the second rotational direction. The first linear direction is opposite to the second linear direction.

According to the second aspect described above, the unlocking driving portion comprises an unlocking driving slope. The unlocking driving slope is arranged obliquely relative to the axis of the driving shaft. The unlocking engagement portion comprises an unlocking engagement slope arranged facing the unlocking driving slope. The unlocking driving slope and the unlocking engagement slope are configured such that when the unlocking driving portion rotates in the first rotational direction, the unlocking driving slope is capable of coming into contact with and driving the unlocking engagement slope, so as to drive the linear motion mechanism to move linearly in the first linear direction to unlock the flap.

According to the second aspect described above, the locking driving portion comprises a locking driving slope arranged obliquely relative to the axis of the driving shaft. The locking engagement portion comprises a locking engagement slope arranged facing the locking driving slope. The locking driving slope and the locking engagement slope are configured such that when the locking driving portion rotates in the second rotational direction, the locking driving slope is capable of coming into contact with and driving the locking engagement slope, so as to drive the linear motion mechanism to move linearly in the second linear direction to lock the flap.

According to the second aspect described above, the linear motion mechanism further comprises an outer circumferential portion. The outer circumferential portion is arranged partially around the inner circumferential portion and is radially connected to the inner circumferential portion. The driving mechanism is configured to be capable of driving the inner circumferential portion and thus driving the outer circumferential portion to move linearly in a direction parallel to the axis of the driving shaft to lock and unlock the flap.

According to the second aspect described above, the outer circumferential portion is provided with a linear output portion arranged parallel to the direction of the axis of the driving shaft. The linear output portion is configured to be capable of linearly moving in the direction parallel to the axis of the driving shaft to lock and unlock the flap.

According to the second aspect described above, the linear output portion is configured to be capable of moving linearly in the direction parallel to the axis of the driving shaft to block and release a locking engagement portion connected to the flap, so as to lock and unlock the flap. The locking engagement portion is arranged on a flap connecting mechanism connected to the flap.

According to the second aspect described above, the outer circumferential portion is further provided with a guiding rod portion. The guiding rod portion is arranged parallel to the linear output portion. The linear output portion and the guiding rod portion are configured such that the linear motion mechanism moves linearly around the driving mechanism in the direction parallel to the axis of the driving shaft without radial deviation.

According to the second aspect described above, the actuation device is capable of being mounted in a separate housing and operates independently.

In a third aspect, the present disclosure provides a refueling port or charging port flap assembly, comprising a base, a flap and an actuation device described above. The flap is movably mounted on the base. The actuation device is arranged on the base.

According to the third aspect described above, the refueling port or charging port flap assembly further comprises a power source. The power source is arranged on the actuation device.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION OF EMBODIMENTS

Various specific embodiments of the present disclosure will be described below with reference to the accompanying drawings which form a part of this description. It is to be understood that although the terms indicating orientations, such as "front", "rear", "upper", "lower", "left", "right", "top" and "bottom", are used in the present disclosure to describe structural parts and elements in various examples of the present disclosure, these terms are used herein only for ease of illustration and are determined based on the example orientations as shown in the accompanying drawings. Since the embodiments disclosed in the present disclosure can be arranged in different directions, these terms indicating directions are merely illustrative and should not be considered as limitations.

Figure 1A:
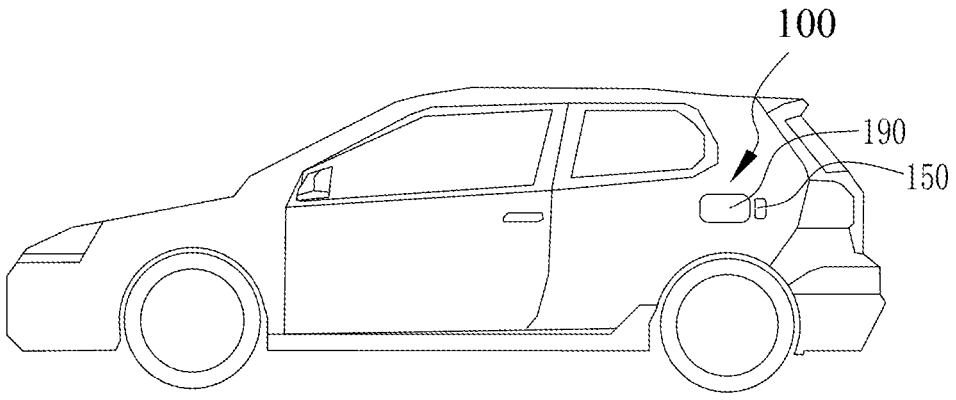
FIG. 1A is a structural schematic diagram of a refueling port or charging port flap assembly of the present disclosure mounted on a vehicle body of a vehicle.
Figure 1B:
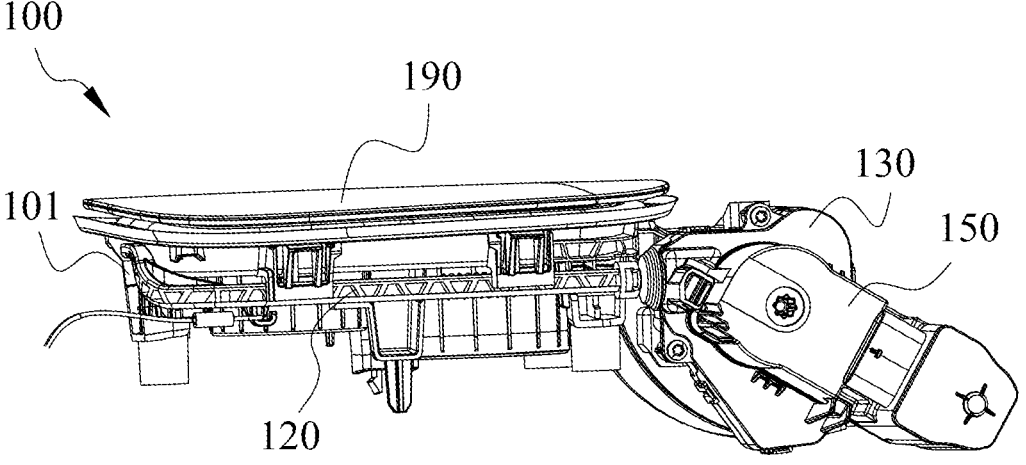
FIG. 1B is a perspective view, viewed from the front, of an embodiment of a refueling port or charging port flap assembly of the present disclosure, with a flap in a closed state.
Figure 1C:
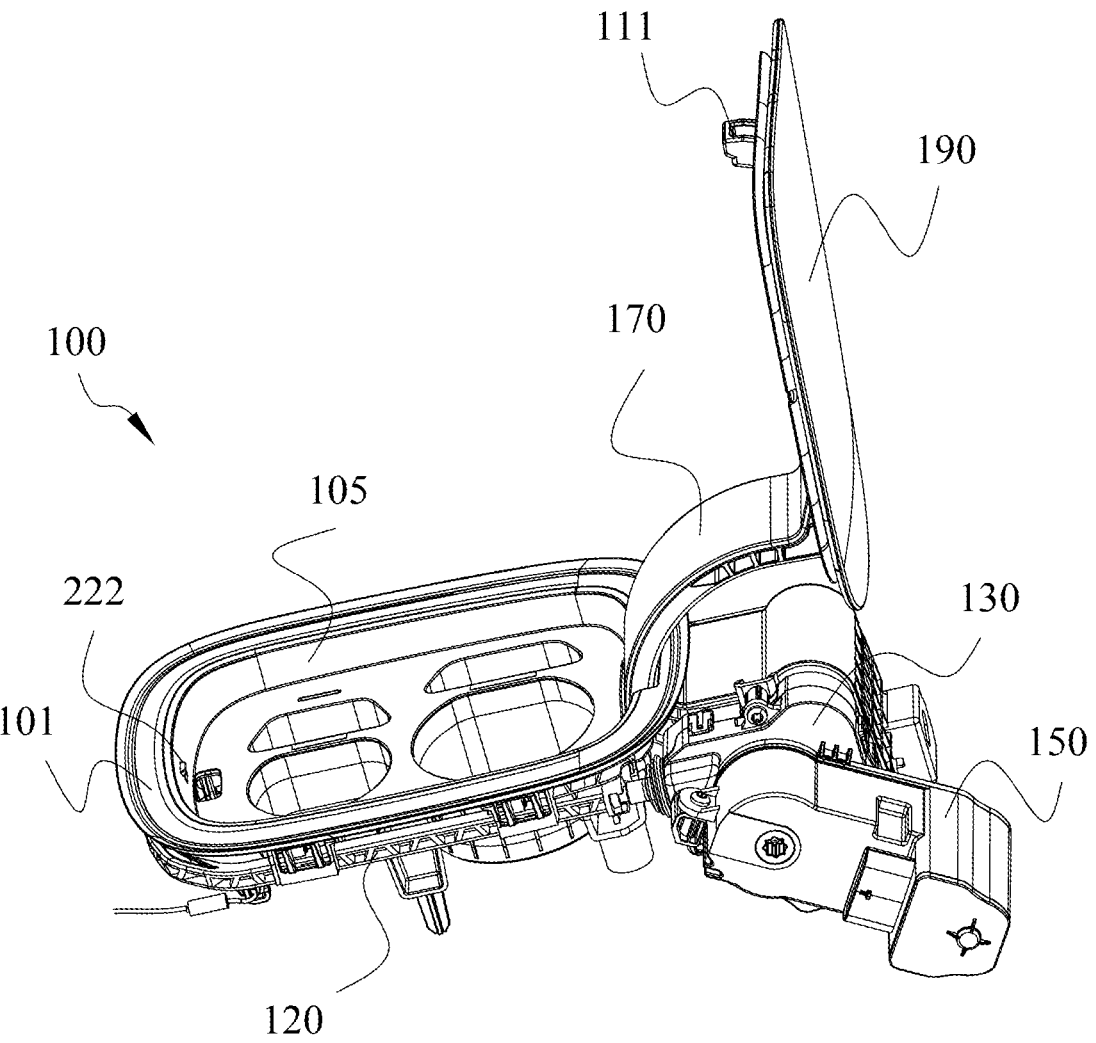
FIG. 1C is a perspective view, viewed from the front, of the refueling port or charging port flap assembly shown in FIG. 1B, with the flap in an open state.
Figure 1D:
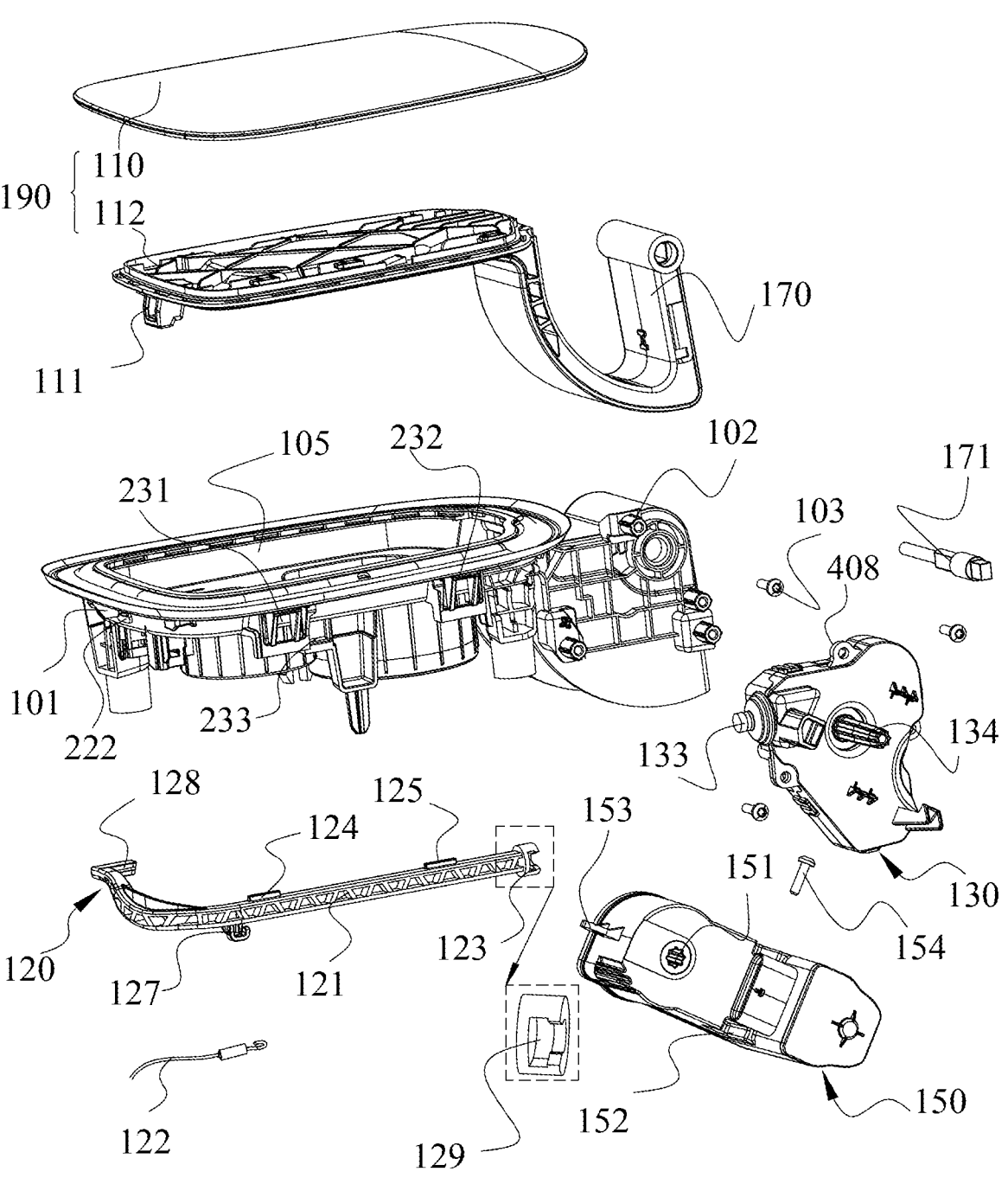
FIG. 1D is an exploded view, viewed from the front, of the refueling port or charging port flap assembly shown in FIG. 1B.
Figure 1E:
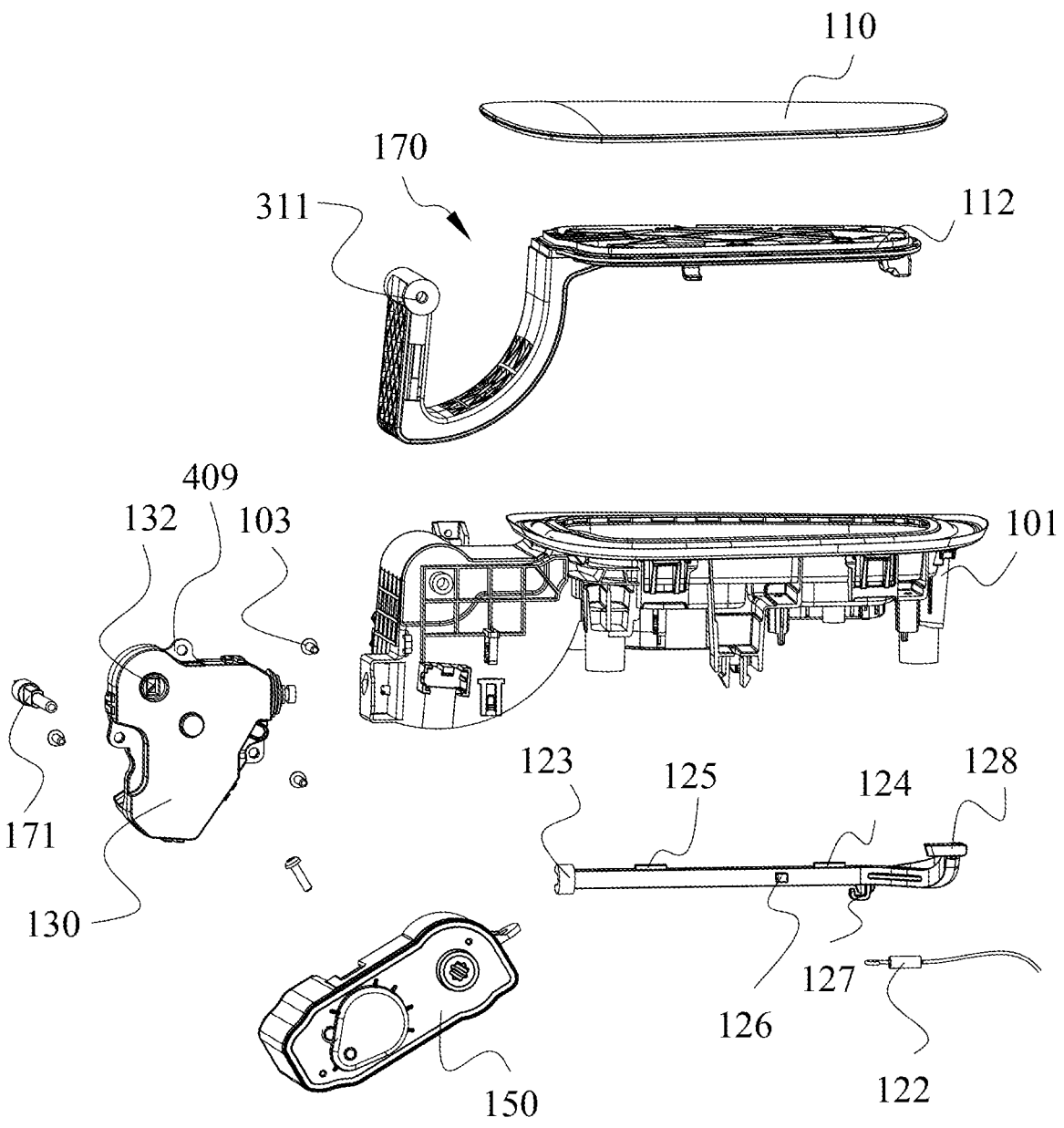
FIG. 1E is an exploded view, viewed from the rear, of the refueling port or charging port flap assembly shown in FIG. 1B.

FIGS. 1A through 1E are structural diagrams of an embodiment of a refueling port or charging port flap assembly 100 of the present disclosure, for showing components of the refueling port or charging port flap assembly and their general positional relationships. FIG. 1A is a structural schematic diagram of the refueling port or charging port flap assembly mounted on a vehicle body of a vehicle; FIG. 1B is a perspective view, viewed from the front, of an embodiment of a refueling port or charging port flap assembly of the present disclosure, with a flap in a closed state; FIG. 1C is a perspective view, viewed from the front, of the refueling port or charging port flap assembly shown in FIG. 1B, with the flap in an open state; FIG. 1D is an exploded view, viewed from the front, of the refueling port or charging port flap assembly shown in FIG. 1B; and FIG. 1E is an exploded view, viewed from the rear, of the refueling port or charging port flap assembly shown in FIG. 1B. For convenience of illustration and description, unless otherwise specified, the right side of a base shown in FIG. 1B is defined as the right side, and the other side opposite to the right side is defined as the left side. The front side of the base shown in FIG. 1B is defined as the front side, and the side opposite to the front side is defined as the rear side.

As shown in FIG. 1A, the refueling port or charging port flap assembly 100 of the present disclosure is configured to be mounted on a vehicle body of a vehicle, and a power source 150 is mounted inside the vehicle body of the vehicle. When refueling or charging is required, the power source 150 first automatically drives a flap 190 in the flap assembly 100 into an unlocked state, and then automatically drives the flap 190 into an open position. After the refueling or charging is completed, the power source 150 automatically drives the flap 190 into a closed position, and then automatically drives the flap 190 into a locked state. As shown in FIGS. 1B through 1E, the refueling port or charging port flap assembly 100 comprises a base 101, a flap 190, and an actuation assembly. The actuation assembly comprises a hinge 170, a flap rotating shaft 171 (rotary driving mechanism), an actuation device 130, a power source 150, and a locking device 120 (linear driving mechanism). The hinge 170, the flap rotating shaft 171, the actuation device 130, the power source 150 and the locking device 120 are mounted on the base 101. Specifically, the base 101 has an accommodating cavity 105. The flap 190 comprises a flap body 110 and a connection portion 112. The flap body 110 covers the connection portion 112. The connection portion 112 is connected to the hinge 170. The right end of the hinge 170 is rotatably mounted on the base 101 by means of the flap rotating shaft 171 such that the flap 190 can rotate relative to the base 101. The connection portion 112 is provided with a flap hole 111.

The flap 190 has a closed position and an open position. When the flap 190 is in the closed position, the flap 190 covers the top of the accommodating cavity 105 to seal the top of the accommodating cavity 105. When the flap 190 is in the open position, the accommodating cavity 105 is exposed to accommodate an external component for refueling or charging. The locking device 120 is mounted on the front side of the base 101 and is configured to lock or unlock the connection portion 112, so as to lock or unlock the flap 190. The locking device 120 has a locked position and an unlocked position. When the locking device 120 is in the locked position, the locking device 120 passes through a through hole 222 (see FIG. 1D) in the base 101 and extends into the flap hole 111 in the flap 190. When the locking device 120 is in the unlocked position, the locking device 120 is withdrawn from the flap hole 111 in the flap 190, such that the flap 190 can rotate relative to the base 101. The power source 150 is mounted on the front side of the actuation device 130 and is configured to provide a driving force to cause the actuation device 130 to drive the opening or closing of the flap 190, and to provide a driving force to cause the actuation device 130 to drive the locking or unlocking of the locking device 120. As an example, the power source 150 is an electric motor. The power source 150 is controlled by a controller 1200 (see FIG. 12) to provide a driving force for the actuation device 130.

The actuation device 130 is mounted to a mounting component 102 of the base 101 via a fastener 103, so as to be fixed to the front side of the base 101. The actuation device 130 comprises a housing, a driving device 131 (which comprises a driving shaft 134, a driving member 135, and a driving gear 136), a transmission gear 132, a transmission rod assembly 133 and a seal 137 (see FIGS. 4A through E). The driving device 131, the transmission gear 132 and the transmission rod assembly 133 are generally arranged inside the housing, and can operate independently without relying on the mechanism to which they are mounted outside the housing. The driving device 131 is used as a driving input mechanism for receiving power input from the outside. The driving device 131 is configured to receive the power provided by the power source 150 to drive the transmission gear 132 and the transmission rod assembly 133. The transmission rod assembly 133 is used as a linear motion mechanism, which is configured to perform a reciprocating linear motion along a predetermined linear path. A locking engagement portion 251 (see FIG. 5G) on the transmission rod assembly 133 is used as a linear output mechanism, which is configured to provide a linear motion output to unlock and lock the flap 190. The transmission gear 132 is used as a rotary motion mechanism, which is configured to perform a reciprocating rotary motion along a predetermined rotary path. An opening 264 (see FIG. 5I) in the transmission gear 132 is used as a rotary output mechanism, which is configured to provide a rotary motion output to open and close the flap 190. The driving device 131, the transmission gear 132 and the transmission rod assembly 133 cooperate with each other to convert the power input into the linear motion output and the rotary motion output, so as to unlock and lock the flap 190 and open and close the flap 190.

The driving device 131 (power input mechanism), the transmission gear 132 (rotary output mechanism) and the transmission rod assembly 133 (linear output mechanism) of the actuation device 130 each have a predetermined structure and size. The housing of the actuation device 130 further comprises mounting components 408, 409 each of which has a predetermined structure and size. Therefore, the design and manufacture of the actuation device 130 can be simplified. Moreover, when the vehicle body, for example, the base of the vehicle body, is provided with components having structures and sizes which correspond to those of the driving device 131 (power input mechanism), the transmission gear 132 (rotary output mechanism) and the transmission rod assembly 133 (linear output mechanism) of the actuation device 130, the actuation device 130 can be easily mounted to the vehicle body, and engaged with these components on the vehicle body, so as to actuate the flap 190. As shown in FIGS. 1B through 1E, the driving shaft 134 protrudes from an opening on the front side of the housing to be engaged with an opening 151 of the power source 150 on the front side of the actuation device 130, such that the driving shaft 134 can be driven to rotate by the power source 150. The transmission rod assembly 133 protrudes from an opening on the left side of the housing to be engaged with an engagement portion 123 of the locking device 120, such that the linear movement of the transmission rod assembly 133 to the left and right can cause the locking device 120 to move linearly to the left and right, so as to unlock and lock the flap 190. The transmission gear 132 is aligned with an opening on the rear side of the housing and is engaged with an end of the flap rotating shaft 171, such that the rotation of the transmission gear 132 can drive the flap rotating shaft 171 to rotate, so as to open and close the flap 190. The seal 137 is arranged outside the housing and on the transmission rod assembly 133, for sealing the opening 405 on the left side of the housing to prevent dust, water, etc. from entering the housing through the opening 405. In other embodiments, the actuation device 130 is not provided with a seal.

As shown in FIGS. 1D through 1E, the locking device 120 comprises a locking bar 121, an engagement portion 123, a first guiding portion 124, a second guiding portion 125, a protruding portion 126 and a hook portion 127. The locking bar 121 has an elongated shape and extends for a certain length from right to left, then for a certain length from front to back, and then for a certain length from left to right. The locking bar 121 has one end connected to the engagement portion 123, and the other end forming a locking pin 128. The locking pin 128 can extend into or be withdrawn from the through hole 222 in the base 101 and the flap hole 111 in the connection portion 112 of the flap 190, so as to lock the flap 190 to the base 101 or to unlock the flap 190 from the base 101. The engagement portion 123 is arranged at the right end of the locking bar 121 and is substantially a cylinder. The front side and the right side of the cylinder are provided with openings, and the interior of the cylinder forms an accommodating cavity 129 to accommodate the locking engagement portion 251 (see FIG. 5G) of the transmission rod assembly 133, such that the engagement portion 123 and the transmission rod assembly 133 are connected together. When moving in left and right directions, the transmission rod assembly 133 can drive the engagement portion 123 to move in the left and right directions, so that the transmission rod assembly 133 can drive the locking device 120 to move. The engagement portion 123 includes other suitable structures for connection with the transmission rod assembly 133. The first guiding portion 124 and the second guiding portion 125 are provided on the upper side of the locking bar 121, and the first guiding portion 124 and the second guiding portion 125 are separated by a certain distance. The protruding portion 126 is arranged on the rear side of the locking bar 121. The first guiding portion 124 and the second guiding portion 125 can cooperate with protruding portions 231, 232 on the base 101 respectively, and the protruding portion 126 can cooperate with a receiving portion 233 on the base 101, such that the locking device 120 can be guided to move in the left and right directions. The hook portion 127 is arranged on the lower side of the locking bar 121, and the hook portion 127 is connected to a pull cord 122. An operator can pull the pull cord 122 to move the hook portion 127 to the left, so as to move the locking device 120 to the left. At this time, the locking pin 128 is withdrawn from the through hole 222 in the base 101 and the flap hole 111 in the connection portion 112 of the flap 190, so as to unlock the flap 190 from the base 101. This operation is a manual unlocking initiated in a power-off state. In other embodiments, the locking device includes other suitable structures.

Figures 2A, 2B:
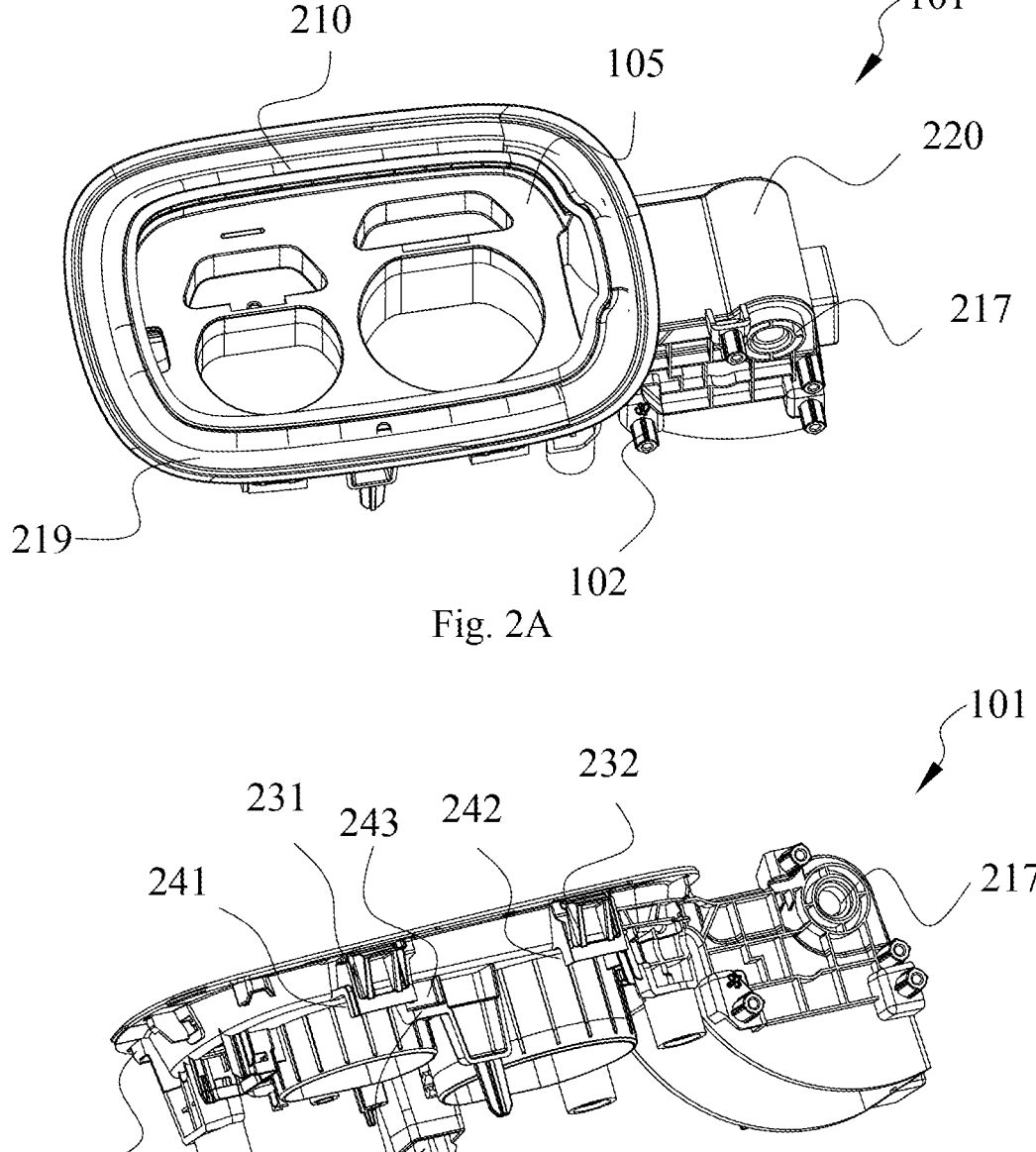
FIG. 2A is a perspective view, viewed from above, of a base shown in FIGS. 1B through 1E.
FIG. 2B is a perspective view, viewed from below, of the base shown in FIGS. 1B through 1E.

FIG. 2A is a perspective view, viewed from above, of the base 101 shown in FIGS. 1B through 1E; and FIG. 2B is a perspective view, viewed from below, of the base 101 as shown in FIGS. 1B through 1E, for more clearly showing the specific structure of the base 101. As shown in FIGS. 2A through 2B, the base 101 comprises a housing 210 forming the accommodating cavity 105, and a mounting portion 220. The mounting portion 220 is connected to the housing 210, and is located at the right end of the base 101. The base 101 can be mounted on a vehicle body of a vehicle by means of the mounting portion 220. The top and the bottom of the accommodating cavity 105 of the housing 210 are both opened such that after the flap assembly 100 is mounted on the vehicle body, the accommodating cavity 105 is in communication with a refueling port or a charging port of the vehicle. In this way, an external component for refueling or charging may extend into the refueling port or the charging port of the vehicle through the accommodating cavity 105. An accommodating cavity (not shown in the figures) in communication with the accommodating cavity 105 of the housing 210 is formed in the mounting portion 220 of the base 101 for accommodating a part of the hinge 170.

A flange 219 that is folded outward is provided at the top of the housing 210 of the base 101. A side wall of the housing 210 is provided with the through hole 222. The through hole 222 is formed in the left end of the base 101 and close to the front side. The through hole 222 is configured to receive a locking pin 128 on the locking device 120 (see FIGS. 1D through 1E).

The front side of the base 101 is provided with protruding portions 231, 232. The protruding portions 231, 232 extend forward and downward from the front side of the base 101, such that recesses 241, 242 are respectively formed between the protruding portions 231, 232 and a front side surface of the base 101 for accommodating the guiding portions 124, 125 of an upper portion of the locking device 120. The front side of the base 101 is further provided with the receiving portion 233. The receiving portion 233 extends downward from the bottom of the base 101 and extends to the front side, such that a recess 243 is formed between the receiving portion 233 and the base 101 for accommodating the protruding portion 126 on the rear side of locking device 120. The protruding portions 231, 232 and the receiving portion 233 are configured to guide and limit the movement of the locking device 120 in the left and right directions. The front side of the base 101 is provided with a flap rotating shaft mounting hole 217, which passes through the base 101 in front and rear directions, at the position of the mounting portion 220. The flap rotating shaft mounting hole 217 is configured to accommodate a hinge rotating shaft 304 (see FIG. 3A).

Figure 3A:
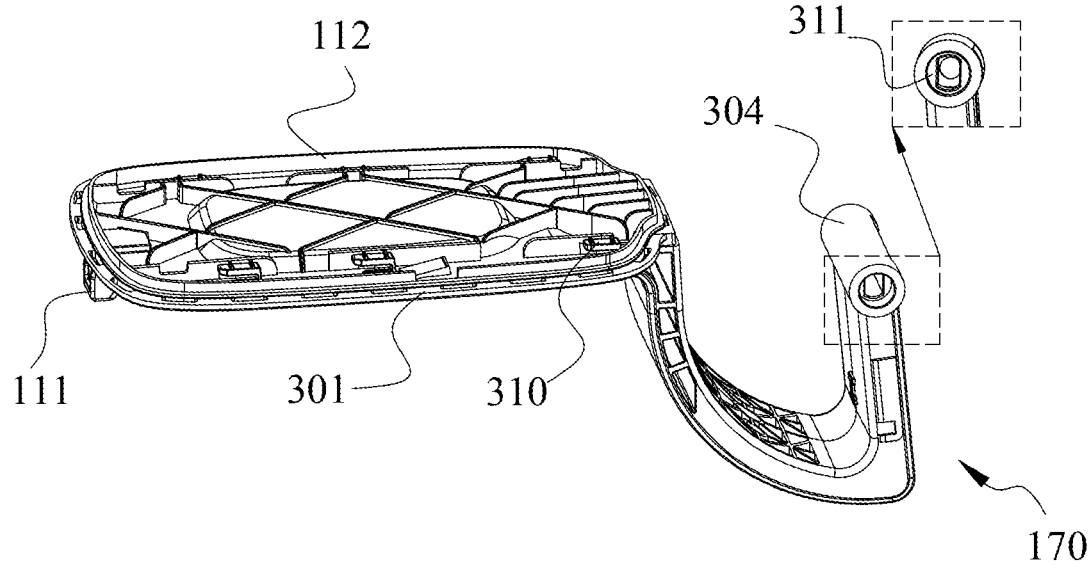
FIG. 3A is a perspective view, viewed from the front, of a hinge and a connection portion of the flap shown in FIGS. 1B through 1E.
Figure 3B:
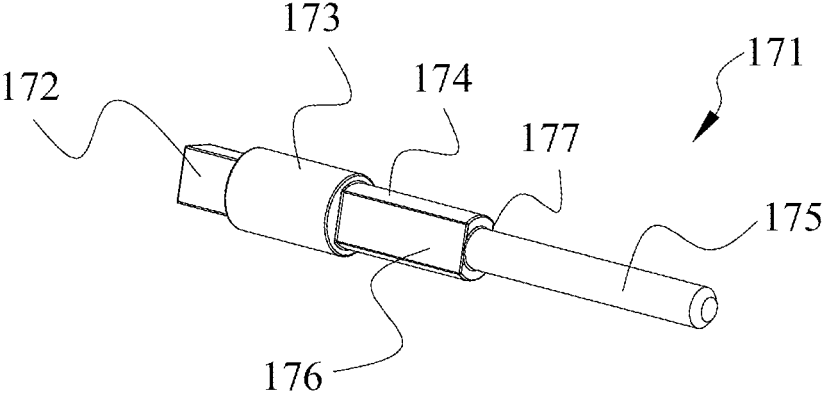
FIG. 3B is a perspective view, viewed from the right, of a flap rotating shaft shown in FIGS. 1B through 1E.

FIG. 3A is a perspective view, viewed from the front, of the hinge 170 and the connection portion 112 of the flap 190 shown in FIGS. 1B through 1E, for showing the specific structures of the hinge 170 and the connection portion 112 of the flap 190. FIG. 3B is a perspective view, viewed from the right, of the flap rotating shaft 171 shown in FIGS. 1B through 1E, for showing the specific structure of the flap rotating shaft 171. As shown in FIG. 3A, the hinge 170 and the connection portion 112 of the flap 190 are integrally formed. The hinge 170 is connected to the right side of the connection portion 112. The connection portion 112 is configured for connection with the flap body 110. Specifically, the top of the connection portion 112 is provided with a hinge snap-fitting portion 310, the bottom of the flap body 110 is provided with a corresponding flap snap-fitting portion (not shown), and the connection portion 112 can cooperate with the flap snap-fitting portion, to connect the connection portion 112 and the flap body 110 together. The lower side of the left end of the connection portion 112 is provided with the flap hole 111 to form a locking pin receiving portion. When the locking device 120 passes through the through hole 222 in the base 101 and the flap hole 111 (i.e., the locking pin receiving portion) in the connection portion 112 of the flap 190, the locking device 120 can lock the flap 190 and the hinge 170. When the locking device 120 is withdrawn from the flap hole 111, the locking device 120 unlocks the flap 190 and the hinge 170, and the flap 190 can be opened. The hinge 170 is generally bent and comprises a hinge rotating shaft 304 arranged at an end thereof. The hinge rotating shaft 304 is generally a cylinder that is accommodated in the flap rotating shaft mounting hole 217 of the base 101, such that the hinge 170 can rotate relative to the base 101. The hinge rotating shaft 304 is provided with a flap rotating shaft accommodating portion 311. The interior of the flap rotating shaft accommodating portion 311 has a structure matching an axial outer structure of the flap rotating shaft 171. The flap rotating shaft accommodating portion 311 is configured to cooperate with the flap rotating shaft 171 such that the flap rotating shaft 171 can be connected to the hinge 170.

As shown in FIG. 3B, the flap rotating shaft 171 is in the shape of an elongated column and comprises a first section 172, a second section 173, a third section 174 and a fourth section 175 arranged in sequence from left to right (from left to right in FIG. 3B) in the axial direction. The first section 172 is a cuboid, the second section 173 is a cylinder, the third section 174 is a column, and the fourth section 175 is a cylinder. The cylinder of the second section 173 has a cross-section greater than that of the cylinder of the fourth section 175. The third section 174 has parallel planes 176 and 177 on its front and rear sides (front and rear sides shown in FIG. 3B), respectively. The transmission gear 132 is connected to a first section 172 of the flap rotating shaft 171. The flap rotating shaft 171 has the same rotation axis as the transmission gear 132. The second section 173, the third section 174 and the fourth section 175 are accommodated in the flap rotating shaft accommodating portion 311 and match the internal structure of the flap rotating shaft accommodating portion 311, so as to connect the flap rotating shaft 171 to the hinge 170. The relative rotation between the flap rotating shaft 171 and the hinge 170 can be prevented through the engagement of the third section 174 with the matching internal structure of the flap rotating shaft accommodating portion 311. In other embodiments, the flap rotating shaft includes other suitable structures to be fixedly accommodated in the flap rotating shaft accommodating portion 311.

Figure 4A:
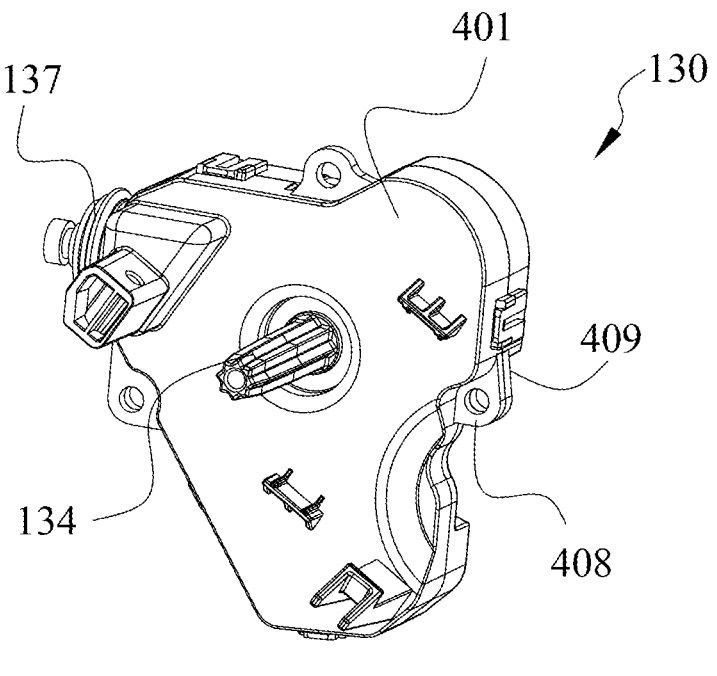
FIG. 4A is a perspective view, viewed from the front at an angle, of an actuation device shown in FIGS. 1B through 1E.
Figure 4B:
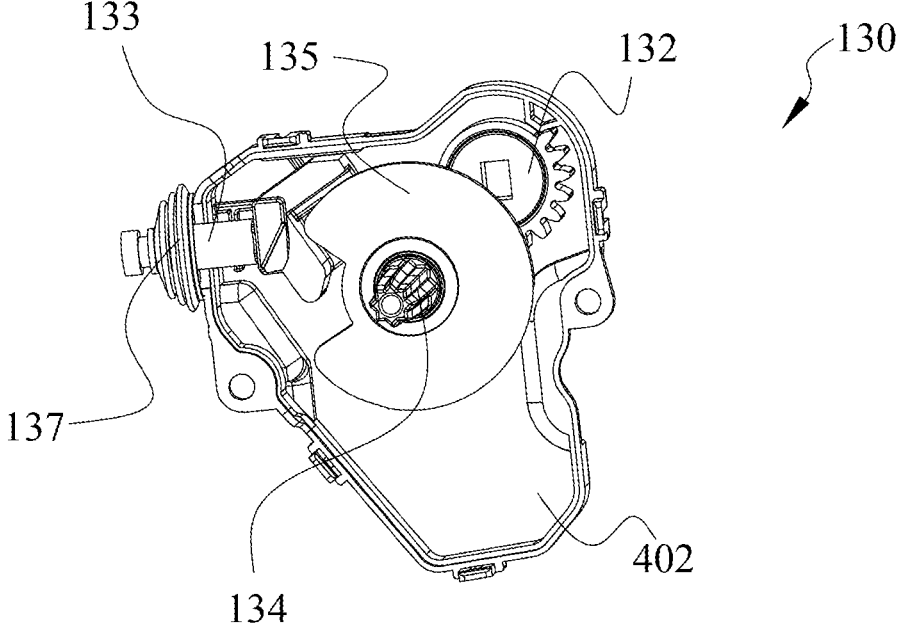
FIG. 4B is a perspective view of the actuation device in FIG. 4A with an front housing removed.
Figures 4C, 4D:
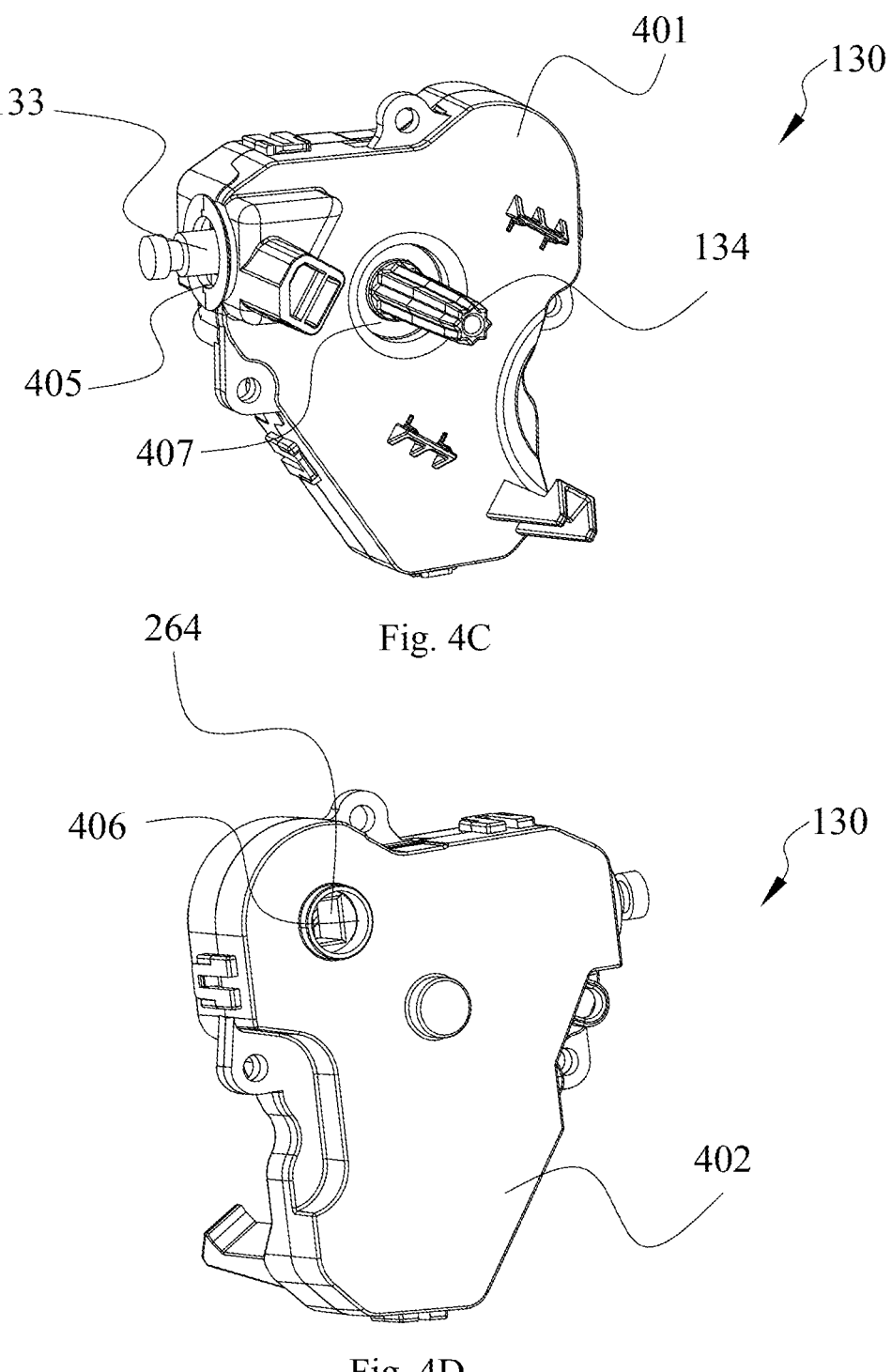
FIG. 4C is a perspective view, viewed from the front at another angle, of the actuation device shown in FIGS. 1B through 1E, with a seal removed.
FIG. 4D is a perspective view, viewed from the rear, of the actuation device shown in FIGS. 1B through 1E.
Figure 4E:
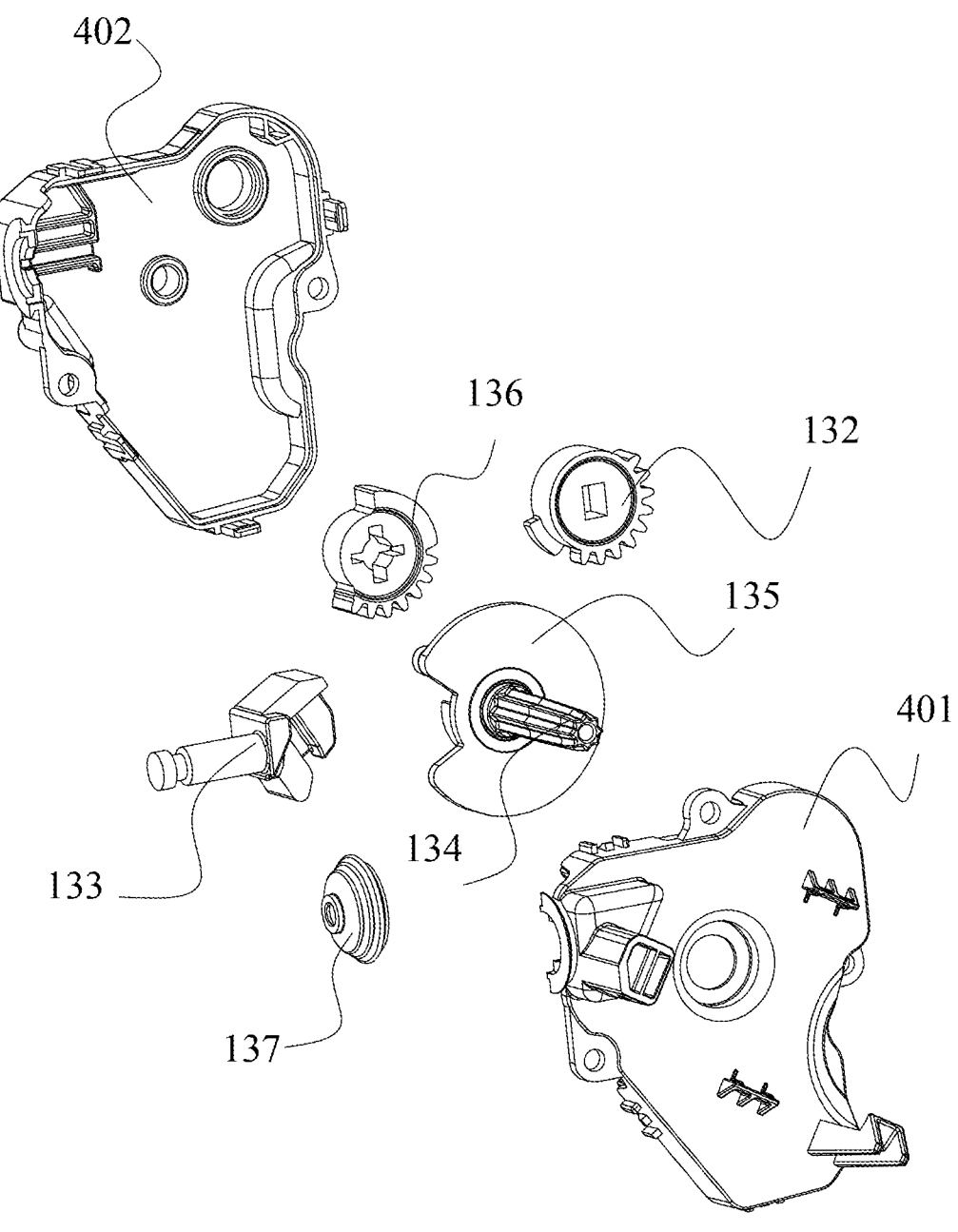
FIG. 4E is an exploded view, viewed from the front, of the actuation device shown in FIGS. 1B through 1E.
Figure 4F:
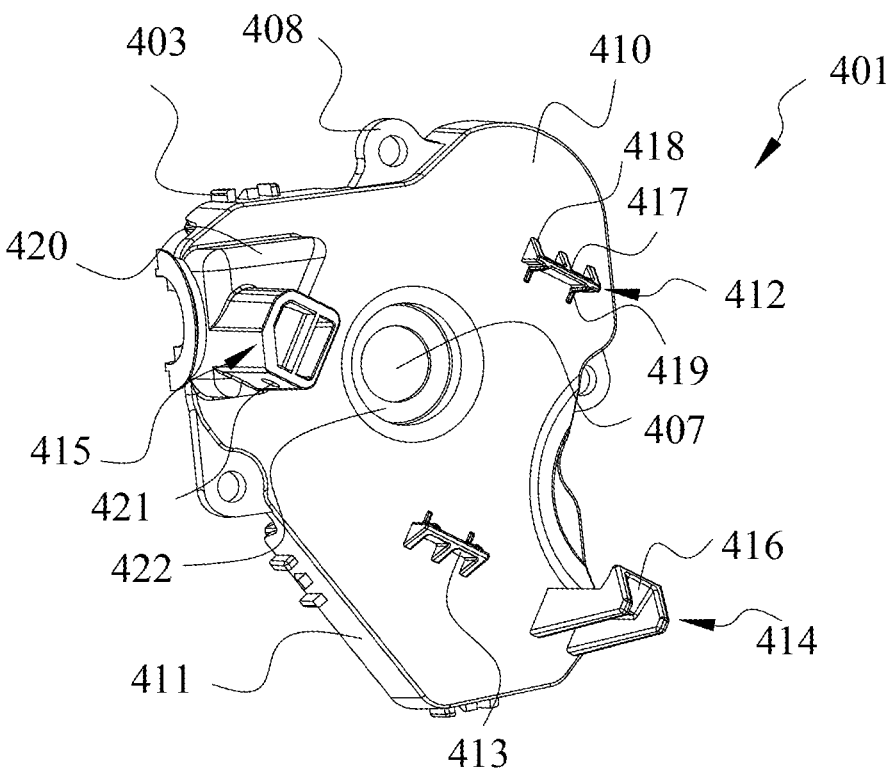
FIG. 4F is a perspective view, viewed from the front, of a front housing shown in FIG. 4E.
Figure 4G:
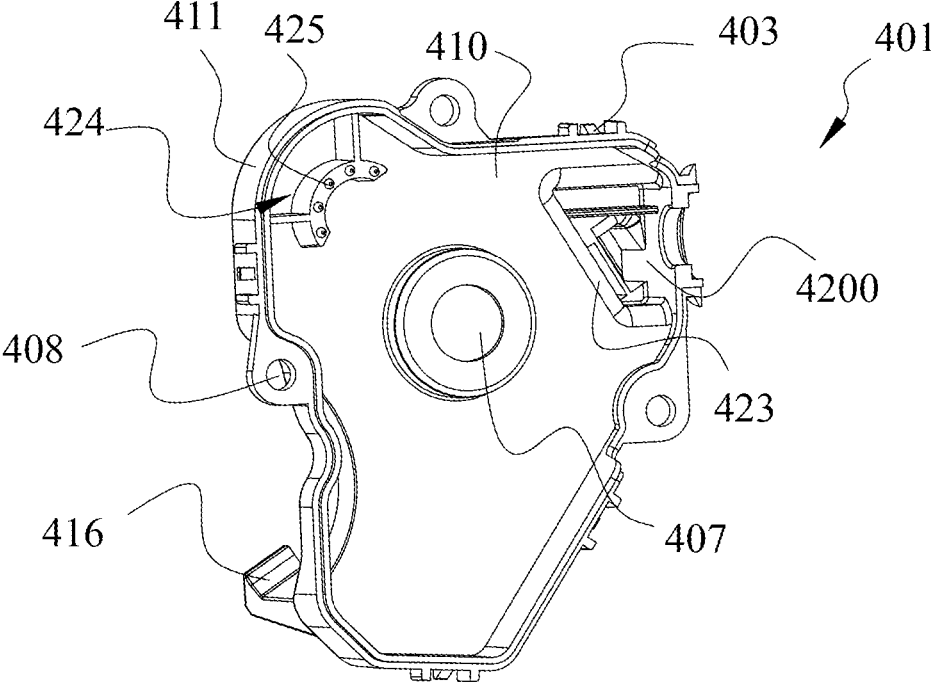
FIG. 4G is a perspective view, viewed from the rear, of the front housing shown in FIG. 4E.
Figure 4H:
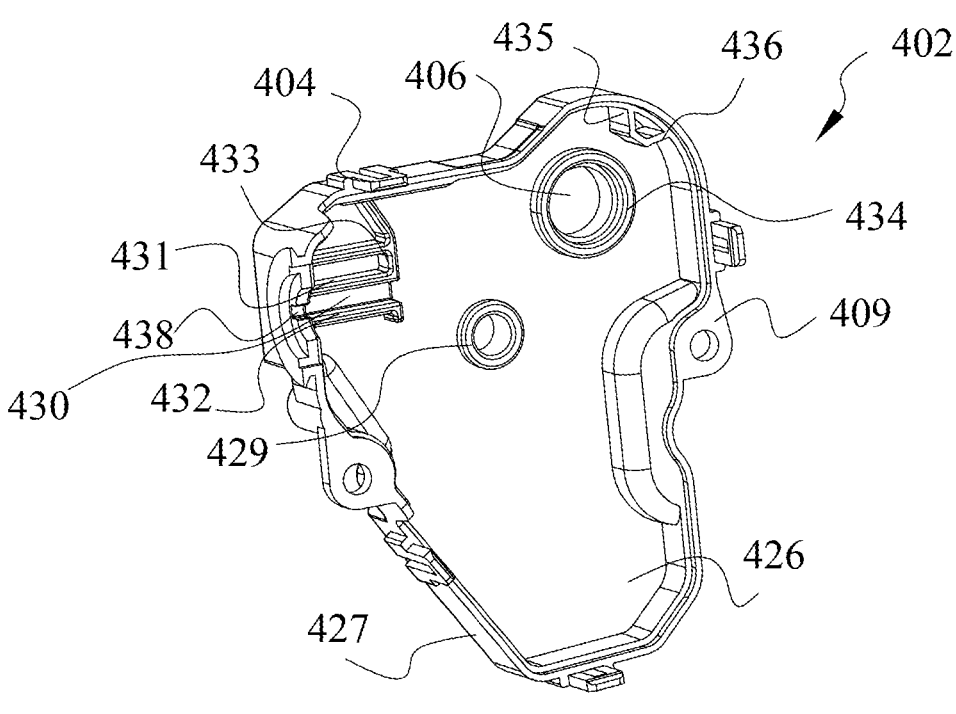
FIG. 4H is a perspective view, viewed from the front, of a rear housing shown in FIG. 4E.
Figure 4I:
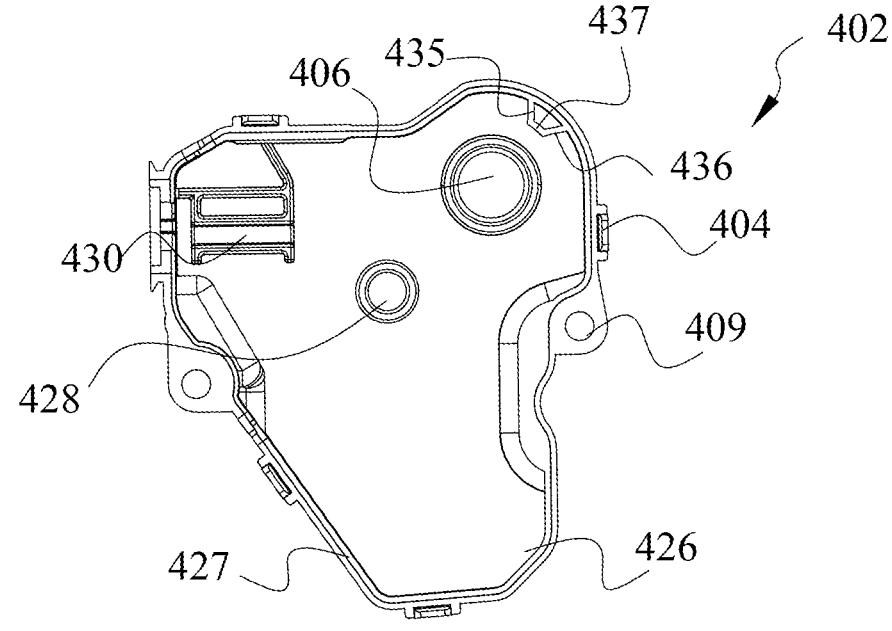
FIG. 4I is a front view of the rear housing shown in FIG. 4E.

FIG. 4A is a perspective view, viewed from the front at an angle, of the actuation device 130 shown in FIGS. 1B through 1E; FIG. 4B is a perspective view of the actuation device 130 in FIG. 4A with a front housing removed; FIG. 4C is a perspective view, viewed from the front at another angle, of the actuation device 130 shown in FIGS. 1B through 1E, with a seal 137 removed; FIG. 4D is a perspective view, viewed from the rear, of the actuation device 130 shown in FIGS. 1B through 1E; FIG. 4E is an exploded view, viewed from the front, of the actuation device 130 shown in FIGS. 1B through 1E; FIG. 4F is a perspective view, viewed from the front, of the front housing 401 shown in FIG. 4E; FIG. 4G is a perspective view, viewed from the rear, of the front housing 401 shown in FIG. 4E; FIG. 4H is a perspective view, viewed from the front, of a rear housing 402 shown in FIG. 4E; and FIG. 4I is a front view of the rear housing 402 shown in FIG. 4E.

As shown in FIGS. 4A through 4I, the housing of the actuation device 130 is substantially closed except for an opening 405 provided on the left side, an opening 406 provided on the rear side and an opening 407 provided on the front side. The housing is composed of a front housing 401 and a rear housing 402. The sides of the front housing 401, such as the upper side, the lower side, the left side and the right side, are provided with snap-fit members 403 (see FIGS. 4F through 4G). The sides of the rear housing 402, such as the upper side, the lower side, the left side and the right side, are provided with snap-fit members 404 (see FIGS. 4H through 4I). The snap-fit members 404 cooperate with the snap-fit members 403. When the snap-fit members 403 of the front housing 401 are engaged with the snap-fit members 404 of the rear housing 402, the front housing 401 and the rear housing 402 are engaged with each other to form a substantially closed housing. The sides of the front housing 401, such as the upper side, the left side and the right side, are provided with mounting components 408; and the sides of the rear housing 402, such as the upper side, the left side and the right side, are provided with mounting components 409 matching the mounting components 408. In an example, the mounting components 408, 409 are flanges having mounting holes. The fastener 103 can pass through the mounting holes of the mounting components 408, 409 and be fastened to the mounting component 102 on the base 101, so as to fasten the actuation device 130 to the base 101. In other embodiments, the mounting components 408, 409 include other suitable mounting structures for being mounted to the vehicle body.

An accommodating space is defined between the front housing 401 and the rear housing 402 for accommodating and mounting internal components, such as the driving device 131 (which comprises the driving shaft 134, the driving member 135, and the driving gear 136), the transmission gear 132 and the transmission rod assembly 133

(see FIGS. 4B and 4E). The driving shaft 134 protrudes from the opening 407 on the front side of the housing for being engaged with the opening 151 of the power source 150, such that the driving shaft 134 can be driven to rotate when the power source 150 is running. The transmission rod assembly 133 protrudes from the opening 405 on the left side of the housing, and a left end of the transmission rod assembly 133 is engaged with a right end of the locking device 120 to fix the transmission rod assembly 133 and the locking device 120 together, such that the movement of the transmission rod assembly 133 to the left and right can drive the locking device 120 to move to the left and right. The opening 264 (rotary output mechanism) in the transmission gear 132 is configured to open and close the flap 190. The opening 264 in the transmission gear 132 is aligned with the opening 406 on the rear side of the housing, and the flap rotating shaft 171 passes through the opening 406 on the rear side of the housing and is fixedly connected to the opening 264 in the transmission gear 132, such that the rotation of the transmission gear 132 can drive the flap rotating shaft 171 to rotate, so as to open and close the flap 190.

As shown in FIGS. 4F through 4G, the front housing 401 comprises a base portion 410 and a circumferential portion 411. The circumferential portion 411 extends rearward from the base portion 410 and is substantially perpendicular to the base portion 410. The front housing 401 is generally recess-shaped. The base portion 410 comprises an inner side facing the accommodating space and an outer side facing away from the accommodating space. An external mount is arranged on the outer side of the base portion 410, and the power source 150 can be mounted to the external mount, and thus mounted to the actuation device 130. The external mount comprises a side snap-fit member 412 and a side snap-fit member 413 arranged opposite each other, an upper snap-fit member 414, and a fastening mount 415. The side snap-fit member 412 comprises a base plate 417, a rib 418 and an L-shaped protrusion 419. The base plate 417 is substantially perpendicular to the base portion 410. The rib 418 extends from the base plate 417 and is substantially perpendicular to the base plate 417, the rib 418 extends from the base portion 410 and is substantially perpendicular to the base portion 410, and the rib 418 has a triangular shape. The L-shaped protrusion 419 extends from the base portion 410 to the base plate 417 and is in the shape of an elongated strip. The side snap-fit member 412 comprises two protrusions 419. In other embodiments, the side snap-fit member 412 comprises other suitable numbers of protrusions 419. The rib 418 is configured to enhance the firmness of the side snap-fit member 412. The side snap-fit member 412 has the same structure as the side snap-fit member 413, and both are substantially mirror images. The side snap-fit member 412 and the side snap-fit member 413 are respectively engaged with two sides of the power source 150 for fixing the power source 150 to the actuation device 130 to prevent the power source 150 from moving in a direction parallel to the base portion 410. A hook-like portion 416 is formed at a front end of the upper snap-fit member 414. The outer side of the power source 150 is provided with a recess 152 (see FIG. 1D), and the hook-like portion 416 of the upper snap-fit member 414 can be engaged with the recess 152 for fixing the power source 150 to the actuation device 130 to prevent the power source 150 from moving in a direction perpendicular to the base portion 410.

A boss 420 is also provided on the front side of the base portion 410 of the front housing 401, a cavity 4200 is formed inside the boss 420, and a reinforcing rib is provided in the cavity 4200 to make the boss 420 firmer. A rod portion 252 of the transmission rod assembly 133 and a first boss 254 (see FIG. 5G) of a transmission engagement portion 253 of the transmission rod assembly 133 can be accommodated in the cavity 4200 and move in the cavity 4200. The fastening mount 415 is arranged on the front side of the boss 420 and is in communication with the boss 420 at the connection. The fastening mount 415 is substantially a columnar body, which is provided with a through hole 421 in a transverse direction. In an embodiment, an internal thread is provided in the through hole 421 for matching with an external thread of the fastener. During mounting, an end through hole 153 of the power source 150 is aligned with the through hole 421 in the fastening mount 415, and then a fastener 154 passes through the end through hole 153 and is screwed into the through hole 421, so that the power source 150 is fixed to the fastening mount 415 (see FIG. 1D). Therefore, the power source 150 can be securely mounted to the actuation device 130 by means of the side snap-fit member 412, the side snap-fit member 413, the upper snap-fit member 414 and the fastening mount 415. In an embodiment, a cavity is formed inside the columnar fastening mount 415, and a reinforcing rib is provided in the cavity to make the fastening mount 415 firmer. The fastening mount 415 includes other suitable structures for mounting the power source 150 to the actuation device 130.

The front housing 401 has a recess 422 recessed rearward from the base portion 410. The center of the recess 422 comprises an opening 407 from which the driving shaft 134 protrudes. The recess 422 and an annular portion 429 of the rear housing 402 are configured to limit the axial movement of the driving member 135 and the driving gear 136.

The boss 420 on the front housing 401 comprises a limiting portion 423 arranged on a side wall of the boss 420. The limiting portion 423 can limit the rightward movement of an inclined curved surface 257 (see FIG. 5G) of the transmission rod assembly 133. An annular portion 424 is provided on the inner side of the base portion 410 of the front housing 401, and the annular portion 424 is substantially perpendicular to the base portion 410. A plurality of protrusions 425 are provided on an end surface of the annular portion 424 facing away from the base portion 410, and are substantially evenly separated from each other and circumferentially arranged around a central axis. The central axis substantially coincides with an axis of a rotation shaft about which the transmission gear 132 rotates. The protrusions 425 are configured to cooperate with an annular recess 520 (see FIG. 5I) of the transmission gear 132 to guide the transmission gear 132 to rotate around the rotation shaft. In an embodiment, the protrusion 425 is cone-shaped. In other embodiments, the protrusion 425 has other suitable shapes for guiding the rotation of the transmission gear 132.

As shown in FIGS. 4H through 4I, the rear housing 402 comprises a base portion 426 and a circumferential portion 427. The circumferential portion 427 extends frontward from the base portion 426 and is substantially perpendicular to the base portion 426. The rear housing 402 is generally recess-shaped. The base portion 426 comprises an inner side facing the accommodating space and an outer side facing away from the accommodating space. The base portion 426 of the rear housing 402 is provided with a recessed portion 428. The rear side of the recessed portion 428 is closed and the front side thereof is opened. The recessed portion 428 is configured to accommodate a rear end 145 of the driving shaft 134. An annular portion 429 is provided coaxially and in communication with the recessed portion 428 and is provided on the inner side of the base portion 410. The annular portion 429 is configured to support the driving gear 136 and a shaft driving protrusion 144 of the driving shaft 134.

A guiding groove 430 is provided on the inner side of the base portion 426 of the rear housing 402, and the left and right ends of the guiding groove 430 are opened. The guiding groove 430 is formed by two ribs 431, 432 arranged in parallel each other and approximately perpendicular to the base portion 426. The base portion 426 is also connected to other reinforcing ribs 433 to make the guiding groove 430 firmer. The guiding groove 430 is engaged with a protrusion 260 (see FIG. 5H) on the rear side of the transmission rod assembly 133 for guiding the protrusion 260 of the transmission rod assembly 133 to move linearly to the left and right.

The opening 406 is provided at the upper right corner of the base portion 426 of the rear housing 402, and penetrates the base portion 426. An annular portion 434 is aligned with the opening 406 and is provided on the inner side of the base portion 426. The annular portion 434 can be accommodated in an annular recess 265 (see FIG. 5J) on the rear side of the transmission gear 132 for limiting the rotation of the transmission gear 132 without deviation. The annular portion 434 is arranged coaxially with the annular recess 265.

An opening limiter 435 and a closing limiter 436 are also provided on the inner side of the base portion 426 of the rear housing 402. In an example, the opening limiter 435 and the closing limiter 436 are limiting surfaces. A left side surface of the opening limiter 435 can be engaged with a side surface of a transmission gear abutting portion 512 (see FIG. 5I) of the transmission gear 132 to block the transmission gear 132 from continuing to rotate, thereby limiting the opening angle of the flap 190. A lower side surface of the closing limiter 436 can be engaged with a side surface of an end transmission tooth 511 (see FIG. 5I) of the transmission gear 132 to block the transmission gear 132 from continuing to rotate, thereby limiting a distance by which the transmission rod assembly 133 is retracted (moves to the right), that is, limiting the distance by which the locking pin 128 is inserted (moves to the right) into the flap hole 111. The opening limiter 435 and the closing limiter 436 are ribs substantially perpendicular to the base portion 410. The opening limiter 435 and the closing limiter 436 are connected to each other via a reinforcing rib 437 to make the opening limiter 435 and the closing limiter 436 firmer. A left side wall of the rear housing 402 is provided with a groove 438 for guiding a protrusion 261 (see FIG. 5H) on the rear side of the transmission rod assembly 133 to move to the left and right. In other embodiments, the opening limiter 435 and the closing limiter 436 include other suitable structures to limit the rotation of the transmission gear 132.

As shown in FIG. 4E, the actuation device 130 comprises a driving device 131, a transmission gear 132 and a transmission rod assembly 133. The driving device 131 comprises a driving shaft 134, a driving member 135 and a driving gear 136. FIGS. 5A through 5K show detailed structural diagrams of the components of the actuation device 130.

Figures 5A, 5B, 5C, 5D:
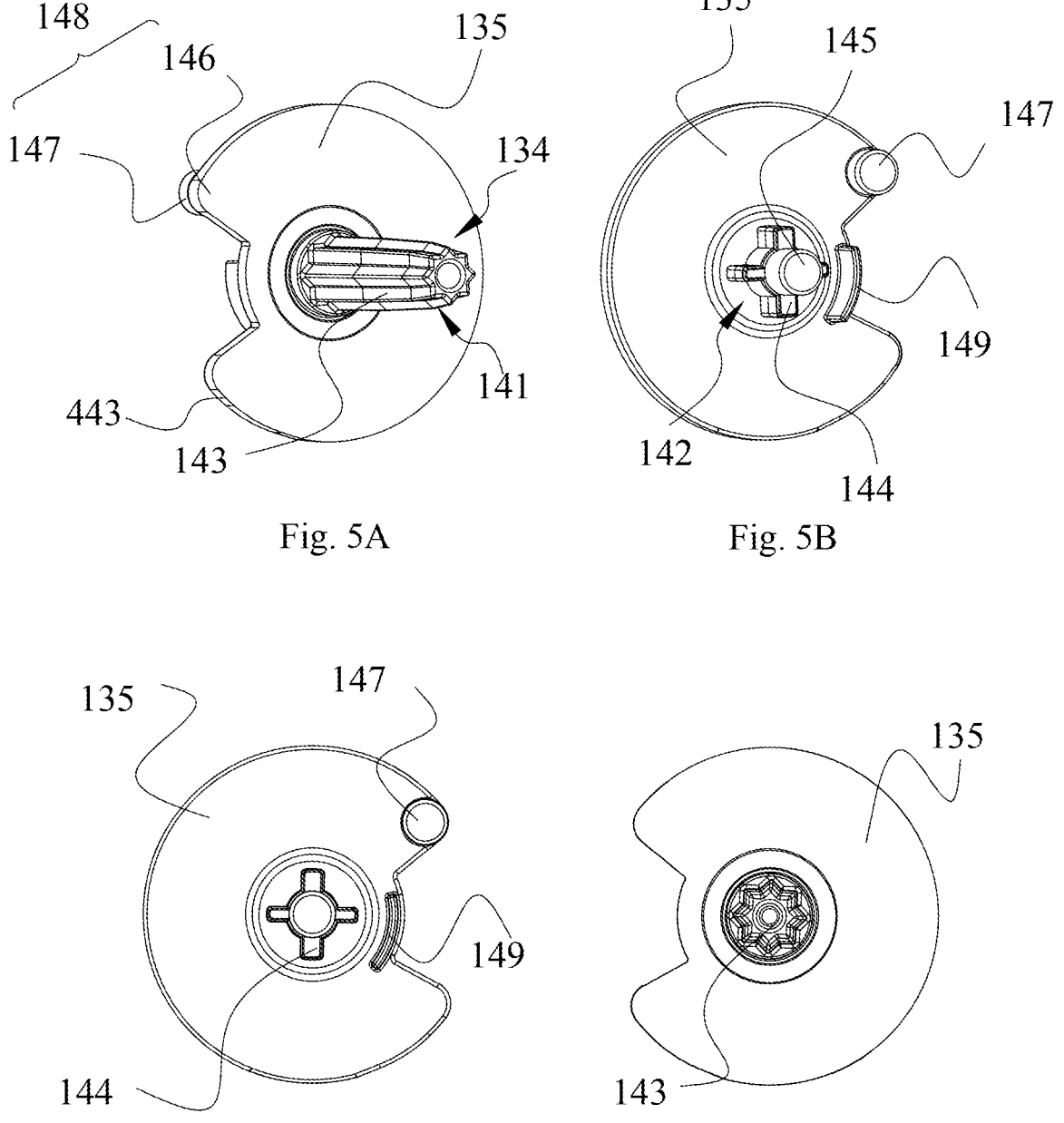
FIG. 5A is a perspective view, viewed from the front, of a driving shaft and a driving member shown in FIG. 4E.
FIG. 5B is a perspective view, viewed from the rear, of the driving shaft and the driving member shown in FIG. 4E.
FIG. 5C is a rear view of FIG. 5B.
FIG. 5D is a front view of FIG. 5B.
Figures 5E, 5F, 5G, 5H:
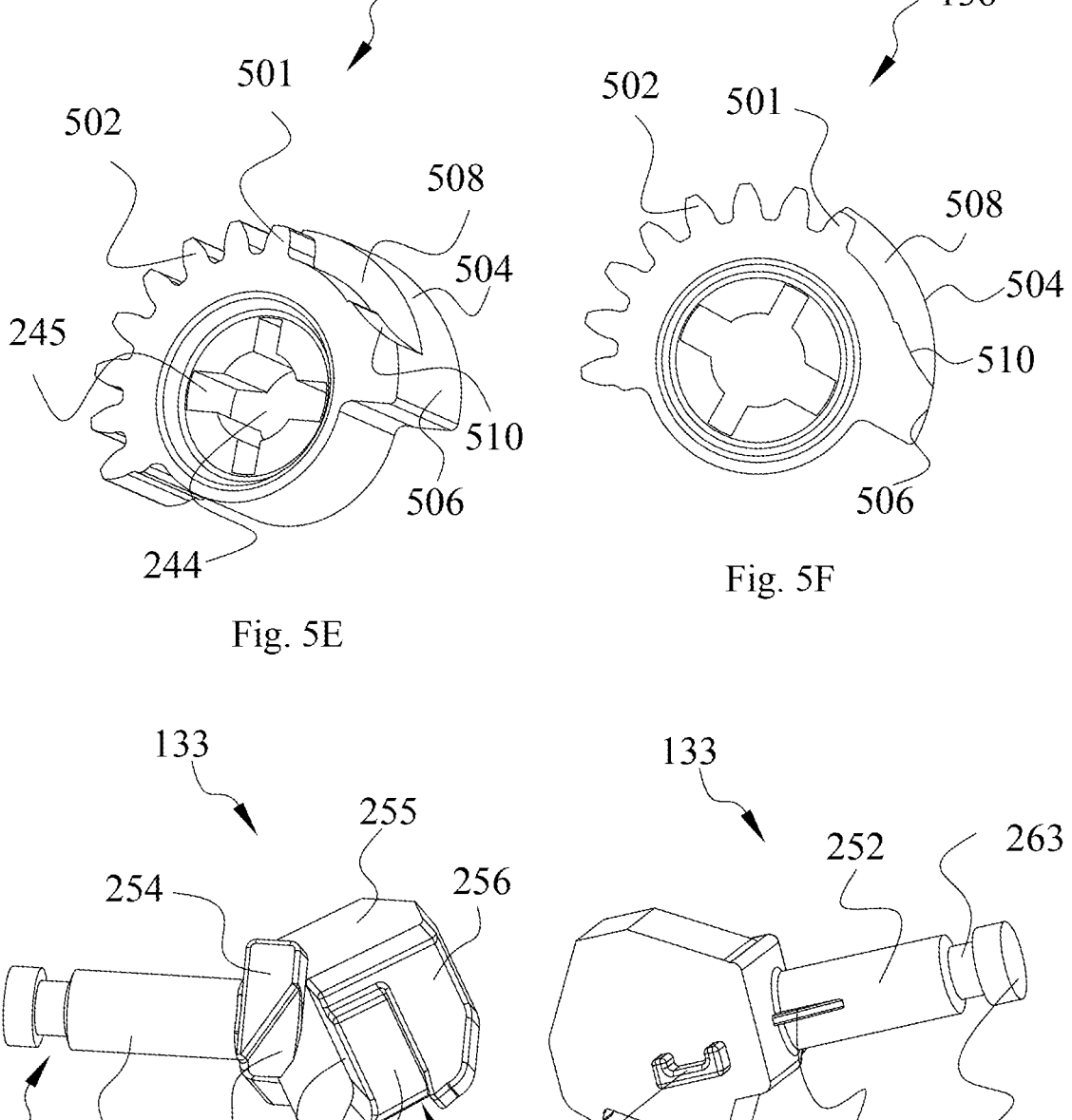
FIG. 5E is a perspective view, viewed from the rear, of a driving gear shown in FIG. 4E.
FIG. 5F is a front view of FIG. 5E.
FIG. 5G is a perspective view, viewed from the front, of a transmission rod assembly shown in FIG. 4E.
FIG. 5H is a perspective view, viewed from the rear, of the transmission rod assembly shown in FIG. 4E.
Figures 5I, 5J, 5K:
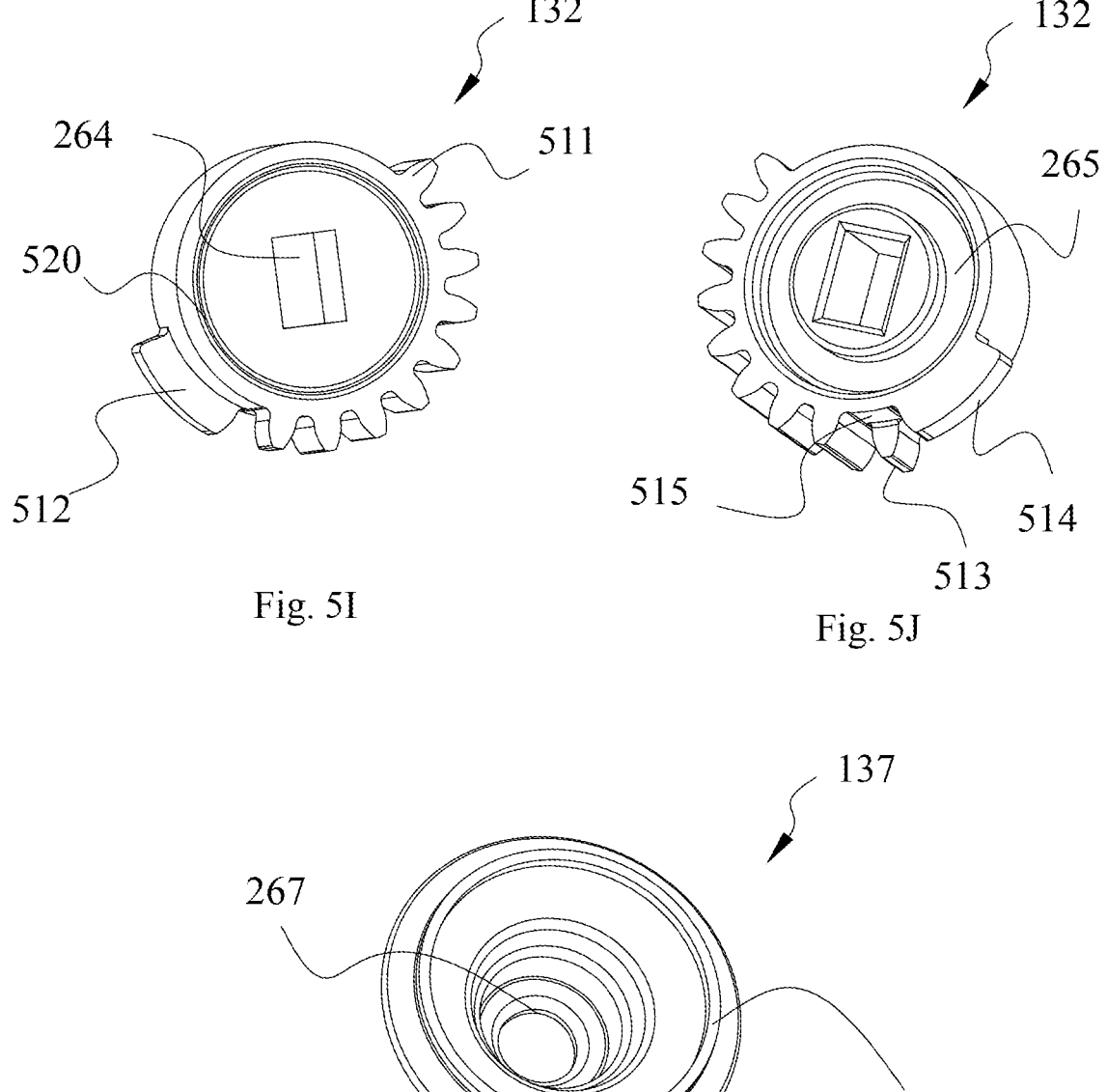
FIG. 5I is a perspective view, viewed from the front, of a transmission gear shown in FIG. 4E.
FIG. 5J is a perspective view, viewed from the rear, of the transmission gear shown in FIG. 4E.
FIG. 5K is a perspective view, viewed from the right, of the seal shown in FIG. 4E.

FIG. 5A is a perspective view, viewed from the front, of the driving shaft 134 and the driving member 135 shown in FIG. 4E; FIG. 5B is a perspective view, viewed from the rear, of the driving shaft 134 and the driving member 135 shown in FIG. 4E; FIG. 5C is a rear view of FIG. 5B; FIG. 5D is a front view of FIG. 5B; FIG. 5E is a perspective view, viewed from the rear, of the driving gear 136 shown in FIG. 4E; FIG. 5F is a front view of FIG. 5E; FIG. 5G is a perspective view, viewed from the front, of the transmission rod assembly 133 shown in FIG. 4E; FIG. 5H is a perspective view, viewed from the rear, of the transmission rod assembly 133 shown in FIG. 4E; Figure SI is a perspective view, viewed from the front, of the transmission gear 132 shown in FIG. 4E; FIG. 5J is a perspective view, viewed from the rear, of the transmission gear 132 shown in FIG. 4E; and FIG. 5K is a perspective view, viewed from the right, of a seal 137 shown in FIG. 4E. Examples of the driving gear 136 and the transmission gear 132 are disclosed in the Chinese patent application No. 202210108257.3 filed on Jan. 28, 2022, entitled "ACTUATION ASSEMBLY AND REFUELING PORT OR CHARGING PORT FLAP ASSEMBLY", which is incorporated herein by reference in its entirety.

As shown in FIGS. 5A through 5D, the driving member 135 and the transmission rod assembly 133 have corresponding cooperation structures, such that the rotational motion of the driving member 135 can be converted into the linear motion of the transmission rod assembly 133. The driving shaft 134 is generally in the shape of a long column, and the driving member 135 and the driving shaft 134 are disposed coaxially on the driving shaft 134 with their axial directions coinciding with the front and rear directions. The driving shaft 134 has a connection portion 141 and an assembly portion 142 respectively extending toward two opposite sides of the driving member 135. The connection portion 141 is configured to be connected to the power source 150, and the assembly portion 142 is configured to be connected to the driving gear 136. As an example, the connection portion 141 is provided with at least one axial protrusion 143. In this embodiment, eight protrusions 143 are provided. The outer contour of the cross-section of the connection portion 141 is substantially star-shaped, and the cross-section gradually becomes larger from the front side to the rear side. In other embodiments, the connection portion 141 of the driving shaft 134 has other suitable structures for engaging with the power source 150. The connection portion 141 is fixedly connected to the power source 150 by means of the protrusions 143 to receive the driving force from the power source 150, such that the driving shaft 134 can be rotated. At least one shaft driving protrusion 144 adjacent to the driving member 135 is provided on the assembly portion 142. In this embodiment, the number of shaft driving protrusions 144 is the same as the number of protrusion accommodating cavities 245 (see FIG. 5E) of the driving gear 136, and both are set to four, and they are substantially arranged in a cross shape. The shaft driving protrusions 144 arranged opposite to each other have the same structure, and the shaft driving protrusions 144 arranged adjacent to each other have different structures. In other embodiments, the assembly portion 142 of the driving shaft 134 has other suitable structures for engaging with the driving gear 136.

When the assembly portion 142 of the driving shaft 134 is mounted in the driving gear 136, the assembly portion 142 is accommodated in a shaft hole 244 in the driving gear 136, and the shaft driving protrusion 144 is accommodated in a corresponding protrusion accommodating cavity 245 of the driving gear 136. A rear end 145 of the assembly portion 142 facing away from the driving member 135 is cylindrical, and the rear end 145 is also an end of the driving shaft 134. The rear end 145 is accommodated in the recessed portion 428 (see FIG. 4I) of the rear housing 402 and can freely rotate in the recessed portion 428, so that the driving shaft 134 can freely rotate around its axis in the recessed portion 428. The recessed portion 428 of the rear housing 402 prevents the driving shaft 134 from being displaced in its radial direction.

The driving member 135 is in the shape of a disk having a notch and is integrally formed with the driving shaft 134, such that the driving member 135 and the driving shaft 134 can rotate synchronously. The driving member 135 is recessed inward in the radial direction from a circumferential surface 443 thereof to form the notch. Two corners are formed on the driving member 135 by means of the notch. A protrusion 147 is provided on the rear side of one corner 146 of the two corners and has a substantially cylindrical shape. The protrusion 147 can be accommodated in a guiding accommodating cavity 259 (see FIG. 5G) on the transmission rod assembly 133 and move in the guiding accommodating cavity 259. The corner 146 and the protrusion 147 together serve as the driving portion 148, for enabling the driving portion 148 to rotate with the rotation of the driving member 135 to drive the transmission rod assembly 133 to move, so as to drive the locking device 120 (see FIGS. 1B through 1C and 1D) to move. A mounting guide 149 is further provided on the rear side of the driving member 135 to facilitate the mounting of the driving member 135. In an embodiment, the mounting guide 149 is generally a cambered rib. In other embodiments, the protrusion 147 includes other suitable structures.

As shown in FIGS. 5E through 5F, the driving gear 136 has a driving axis. The driving gear 136 can rotate about the driving axis, which is substantially the same as the axis of a rotation shaft of the driving shaft 134 and the driving member 135. The driving gear 136 comprises a shaft hole 244 and at least one protrusion accommodating cavity 245 in communication with the shaft hole 244. The protrusion accommodating cavity 245 is formed by extending outward from a wall of the shaft hole 244 in a radial direction thereof. As a specific example, four protrusion accommodating cavities 245 are arranged in a cross shape in a circumferential direction of the shaft hole 244. The shaft driving protrusion 144 is accommodated in a corresponding protrusion accommodating cavity 245, such that the driving gear 136 and the driving member 135 are fixed in the radial direction without relative movement. When the rear end 145 of the driving shaft 134 is accommodated in the recessed portion 428 of the rear housing 402, the driving gear 136 and the shaft driving protrusion 144 are situated on the front side of the annular portion 429 of the rear housing 402. When being driven to rotate, the driving shaft 134 can drive the driving member 135 to rotate, and then the driving member 135 drives the driving gear 136 to rotate.

As shown in FIGS. 5G through 5H, the transmission rod assembly 133 comprises a locking engagement portion 251, a rod portion 252 and a transmission engagement portion 253. The rod portion 252 has one end connected to the locking engagement portion 251, and the other end connected to the transmission engagement portion 253. The transmission engagement portion 253 is connected to the driving member 135 for being driven to move by the driving member 135. The transmission engagement portion 253 comprises a first boss 254, a second boss 255 and a third boss 256. These bosses are arranged in an overlapping manner in the front-to-back direction to form a stepped shape. The lower right side of the first boss 254 is provided with an inclined curved surface 257 which can be engaged with the limiting portion 423 (see FIG. 4G) of the front housing 401. The second boss 255 and the third boss 256 form an engagement surface 258 on the right side in the front-to-back direction, and the engagement surface 258 is engaged with the driving portion 148 (see FIG. 5A) of the driving member 135. The engagement surface 258 can be driven by the driving portion 148 to move to the left, to cause the driving device 120 to move to the left to unlock the flap 190. The third boss 256 is recessed in the front-to-back direction to form a guiding accommodating cavity 259 for accommodating the protrusion 147 (see FIGS. 5A through 5C) of the driving member 135. A protrusion 260 is provided on the rear side of the third boss 256 which can be accommodated in the guiding groove 430 (see FIG. 4H) of the rear housing 402 and move in the guiding groove 430. A protrusion 261 is provided in the left and right directions on the rear side of the rod portion 252. When the rod portion 252 moves to the left and right, the protrusion 261 is guided to move to the left and right in the groove 438 (see FIG. 4H) on the left side of the rear housing 402. In an example, the protrusion 261 is a triangular rib. The locking engagement portion 251 (linear output mechanism) of the transmission rod assembly 133 is configured to lock and unlock the flap 190. The locking engagement portion 251 is engaged with the locking device 120 to drive the locking device 120 to move to the left and right when the transmission rod assembly 133 moves to the left and right, so as to unlock and lock the flap. The locking engagement portion 251 comprises a protrusion 262 and a shaft portion 263 which is connected to the rod portion 252. The protrusion 262 can be accommodated in the accommodating cavity 129 (see FIG. 1D) of the engagement portion 123 of the locking device 120 and is engaged with the engagement portion 123. When the driving member 135 rotates, the protrusion 147 of the driving member 135 moves in the guiding accommodating cavity 259, such that the transmission rod assembly 133 moves to the left and right.

As shown in FIGS. 5I through 5J, the transmission gear 132 is generally circular and has a transmission axis. The transmission gear 132 can rotate about the transmission axis. When rotating, the driving gear 136 can drive the transmission gear 132 to rotate about the transmission axis. The specific operation is described in detail below. An opening 264 is provided in the center of the transmission gear 132. The opening 264 is connected to the first section 172 (see FIG. 3B) of the flap rotating shaft 171 for driving the flap rotating shaft 171 to rotate when the transmission gear 132 rotates, so as to open and close the flap 190. The annular recess 520 is provided on the front side of the transmission gear 132 for accommodating the protrusion 425 (see FIG. 4G) on the front housing 401. The annular recess 265 is provided on the rear side of the transmission gear 132 for accommodating the annular portion 434 (see FIG. 4H) of the rear housing 402. The annular portion 434 can prevent the rotation of the transmission gear 132 from being deviated. The protrusion 425 and the annular portion 434 are configured to limit the axial movement of the transmission gear 132. As shown in FIG. 5K, the seal 137 has a first sealing body 266 and a second sealing body 267. The first sealing body 266 is configured to be engaged with and seal an outer wall on the left side of the housing, so as to seal the opening 405 (see FIG. 4C) on the left side of the housing. The second sealing body 267 is configured to be engaged with and seal the rod portion 252 of the transmission rod assembly 133 (see FIGS. 5G through 5H).

An outer periphery of the transmission gear 132 is provided with a plurality of transmission teeth 511, an abutting tooth 513, and a transmission gear abutting portion 512. The plurality of transmission teeth 511 and the transmission gear abutting portion 512 are provided on two opposite sides of the abutting tooth 513. The plurality of transmission teeth 511 and the abutting tooth 513 can be meshed with a plurality of driving teeth 502 on the driving gear 136 such that the driving gear 136 can drive the transmission gear 132 to rotate. The abutting tooth 513 and the plurality of transmission teeth 511 have the same shape, except that the abutting tooth 513 is arranged partly in the axial direction. The abutting tooth 513 is provided close to the front side. In other words, the tooth width of the abutting tooth 513 is smaller than the tooth width of the plurality of transmission teeth 511.

The transmission gear abutting portion 512 is arranged partly in the axial direction and extends for a distance in the circumferential direction. The transmission gear abutting portion 512 is provided close to the rear side so as to be offset from the abutting tooth 513 in the axial direction. Thus, a first tooth accommodating portion 515 is formed between the transmission gear abutting portion 512 and the transmission tooth 511 adjacent thereto, for accommodating a first driving tooth 501 among the plurality of driving teeth 502. The transmission gear abutting portion 512 has a transmission gear limiting surface 514. The transmission gear limiting surface 514 is an arc-shaped surface. The transmission gear limiting surface 514 can cooperate with a driving gear limiting surface 510. A distance between the transmission gear limiting surface 514 and the transmission axis, a distance between the tooth top of the plurality of transmission teeth 511 and the transmission axis, and a distance between the tooth top of the abutting tooth 513 and the transmission axis are equal.

As shown in FIGS. 5E through 5F, an outer periphery of the driving gear 136 is provided with a first outer periphery portion and a second outer periphery portion. The first outer periphery portion is provided on one side of the second outer periphery portion in the circumferential direction. The first outer periphery portion comprises a plurality of driving teeth 502. The plurality of driving teeth 502 are configured to be capable of meshing with the plurality of transmission teeth 511 and the abutting tooth 513 of the transmission gear 132. The second outer periphery portion comprises a driving gear abutting portion 504 and a driving gear limiting tooth 506. The driving gear abutting portion 504 is arranged partly in the axial direction, extends for a distance in the circumferential direction, and is connected to the adjacent driving tooth 502. The driving gear abutting portion 504 is provided close to the rear side. In other words, the width of the driving gear abutting portion 504 is less than the tooth width of the plurality of driving teeth 502. The driving gear abutting portion 504 does not drive the transmission gear 132 to rotate. Specifically, the driving gear abutting portion 504 has a top portion 505 which is configured to be capable of cooperating with the abutting tooth 513 to block the rotation of the transmission gear 132. For clarity of description, the driving tooth of the plurality of driving teeth 502 closest to the second outer periphery portion is referred to as a first driving tooth 501. The top portion 505 of the driving gear abutting portion 504 is connected to the first driving tooth 501. The top portion 505 can be connected to the tooth top of the first driving tooth 501 so as to form an arc surface. A distance between the top portion 505 and the driving axis is equal to a distance between the plurality of driving teeth 502 and the driving axis.

As shown in FIGS. 5E through 5F, the driving gear limiting tooth 506 is arranged partly in the axial direction and is offset from the driving gear abutting portion 504. The driving gear abutting portion 504 is provided close to the front side. The driving gear limiting tooth 506 is circumferentially separated by a distance from the adjacent driving tooth 502 (i.e., the first driving tooth 501) to form an accommodating portion 508 for accommodating the transmission gear abutting portion 512. The driving gear limiting tooth 506 has a driving gear limiting surface 510. The driving gear limiting surface 510 is located on a side portion of the driving gear limiting tooth 506 in the circumferential direction. The driving gear limiting surface 510 can cooperate with the transmission gear limiting surface 514 to limit the magnitude of rotation of the driving gear 136 relative to the transmission gear 132.

The process of unlocking and opening the flap 190 and the process of closing and locking the flap 190 will be described below with reference to FIGS. 6A through 6E.

Figure 6A:
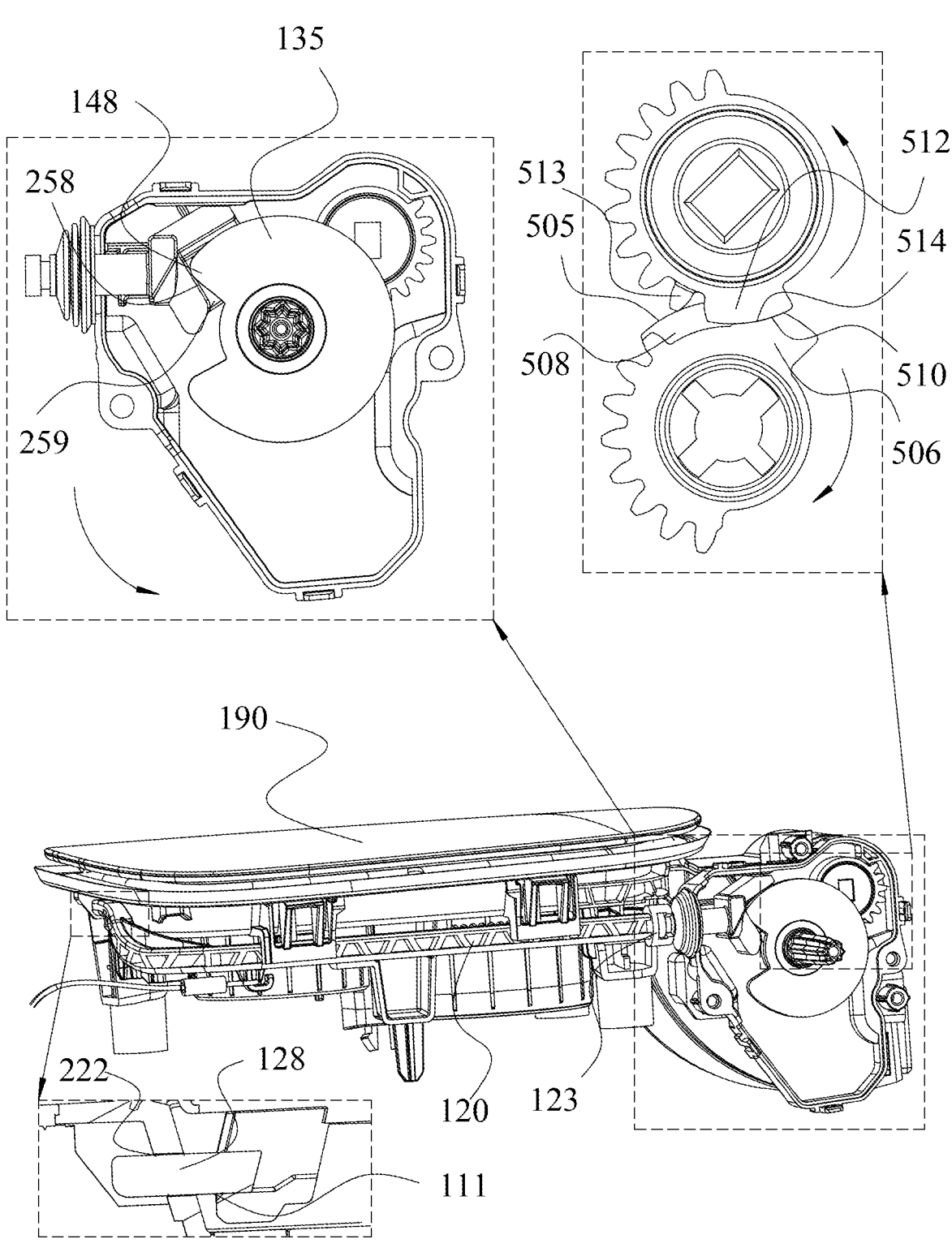
FIG. 6A is a schematic diagram showing the state of a flap assembly, with a locking device in a locked position and a flap in a closed position.
Figure 6B:
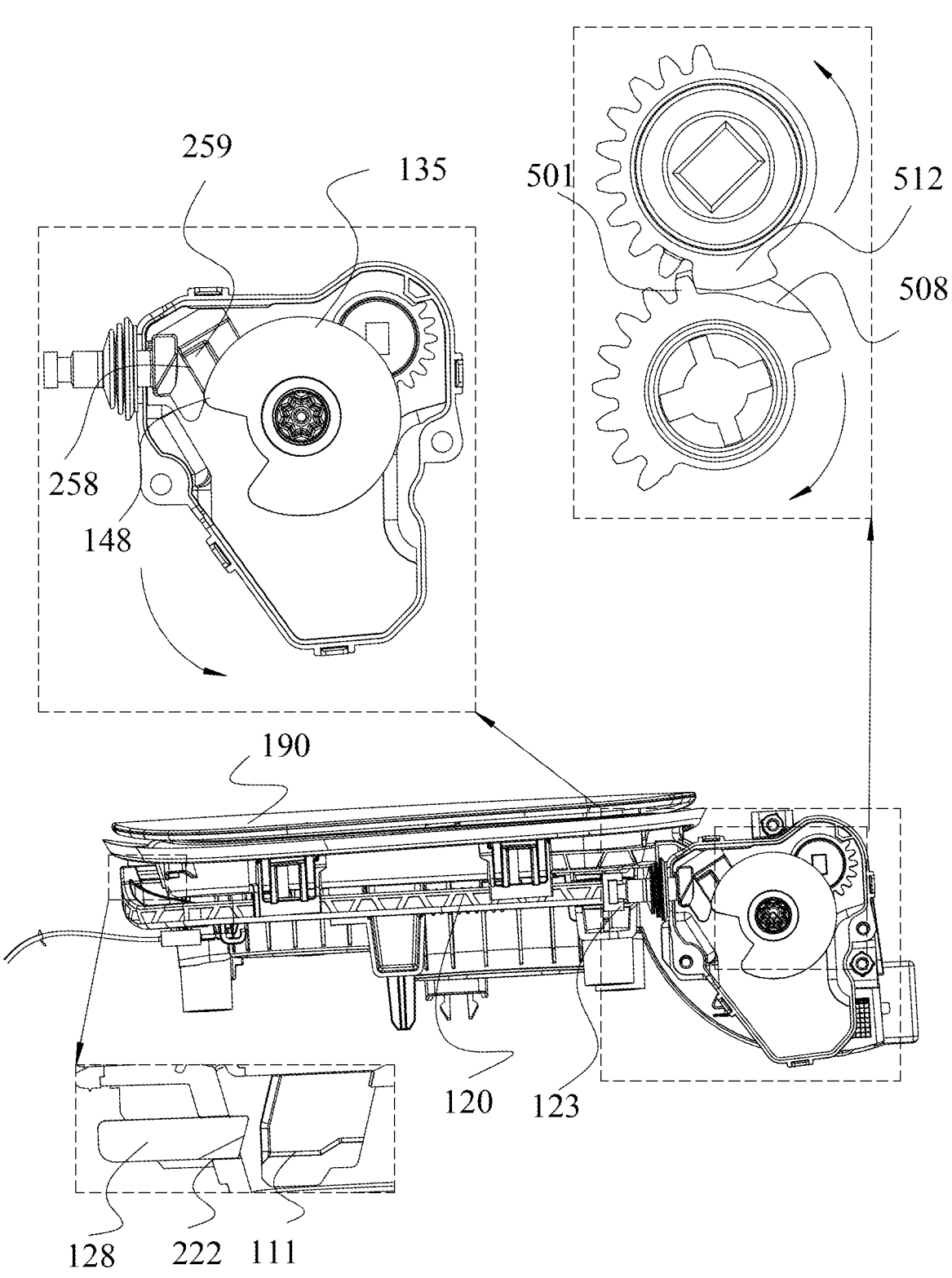
FIG. 6B is a schematic diagram showing the state of the flap assembly, with the locking device in an unlocked position and the flap in the closed position.
Figure 6C:
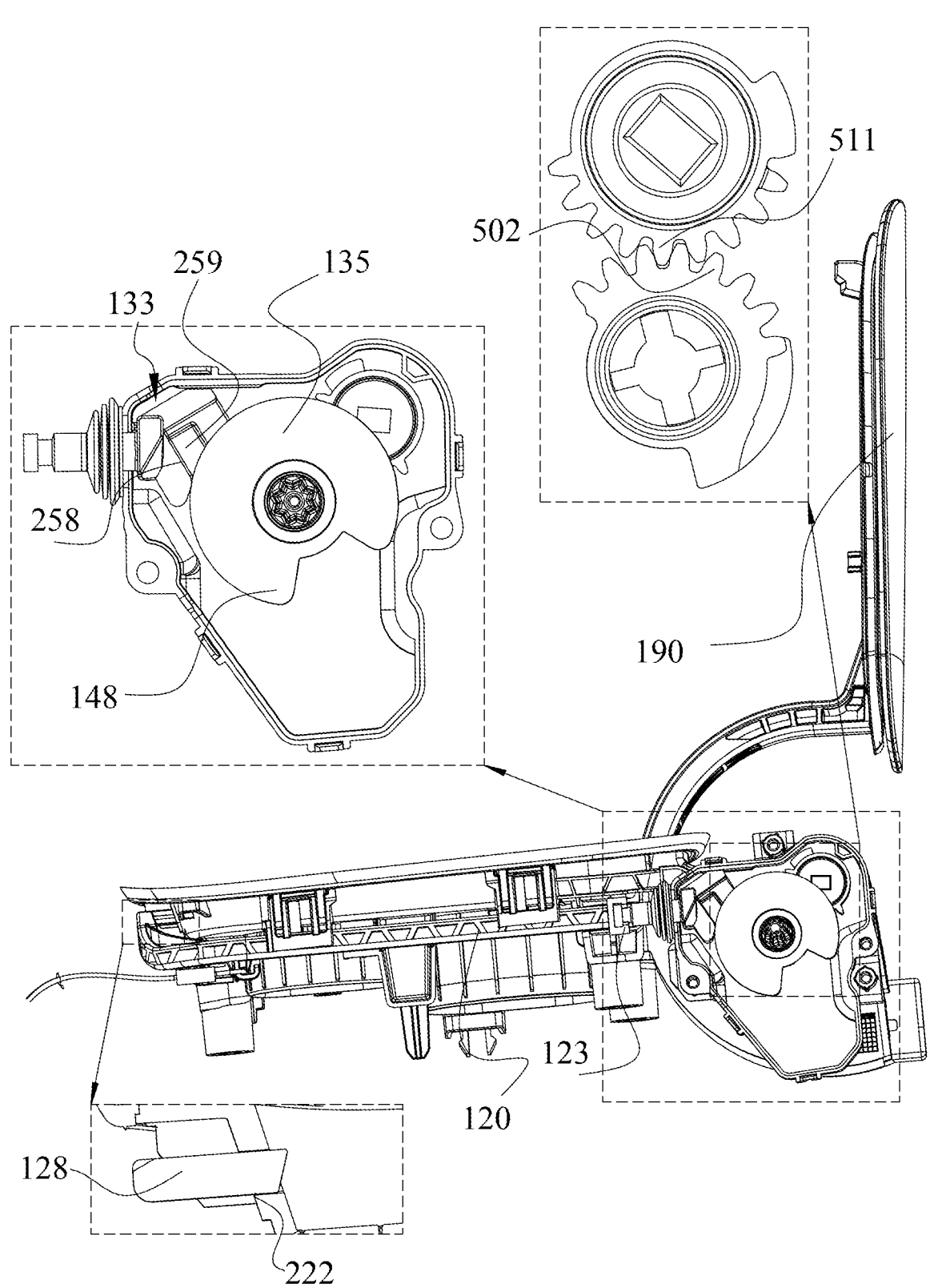
FIG. 6C is a schematic diagram showing the state of the flap assembly, with the flap completely opened.
Figure 6D:
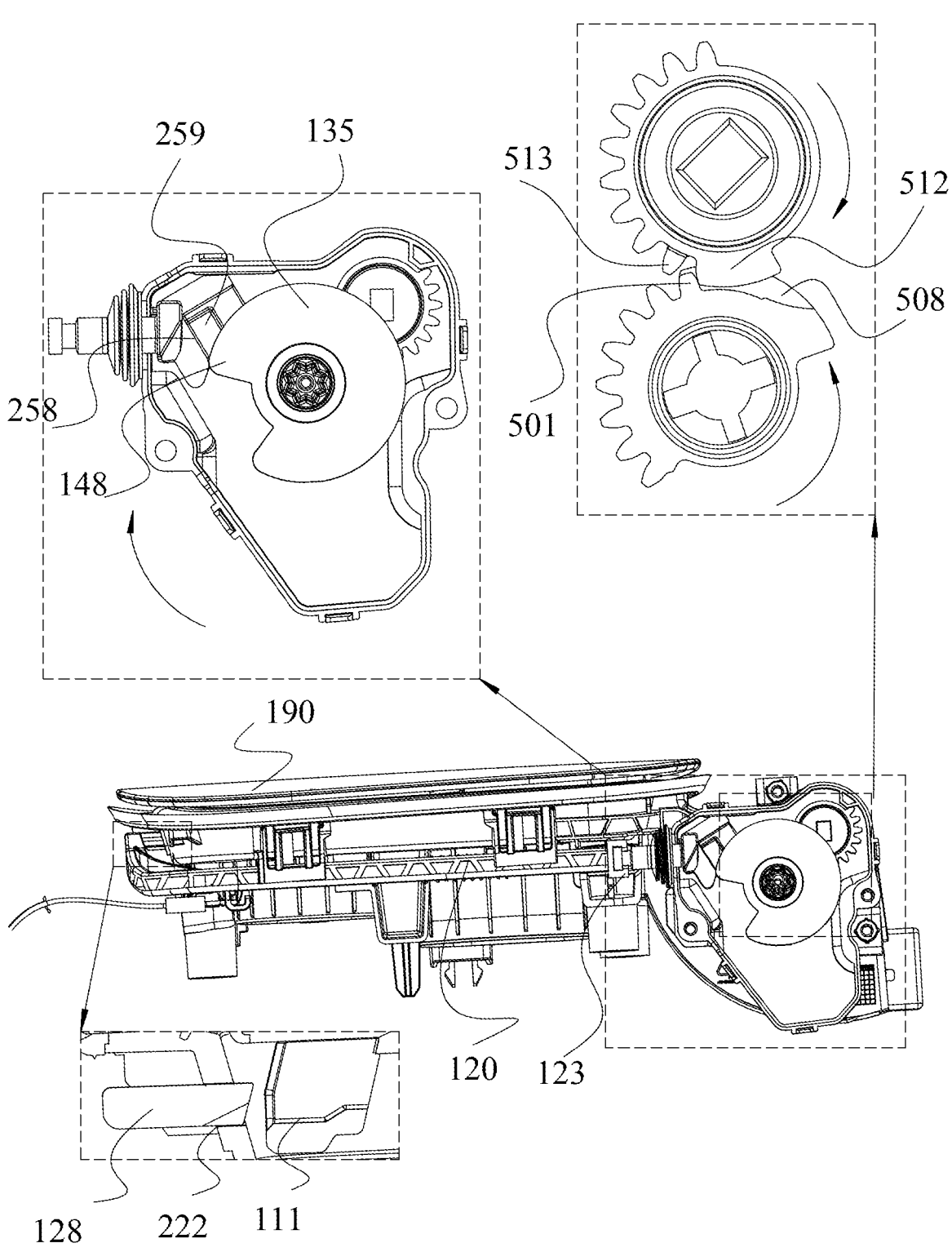
FIG. 6D is a schematic diagram showing the state of the flap assembly, with the locking device in the unlocked position and the flap in the closed position.
Figure 6E:
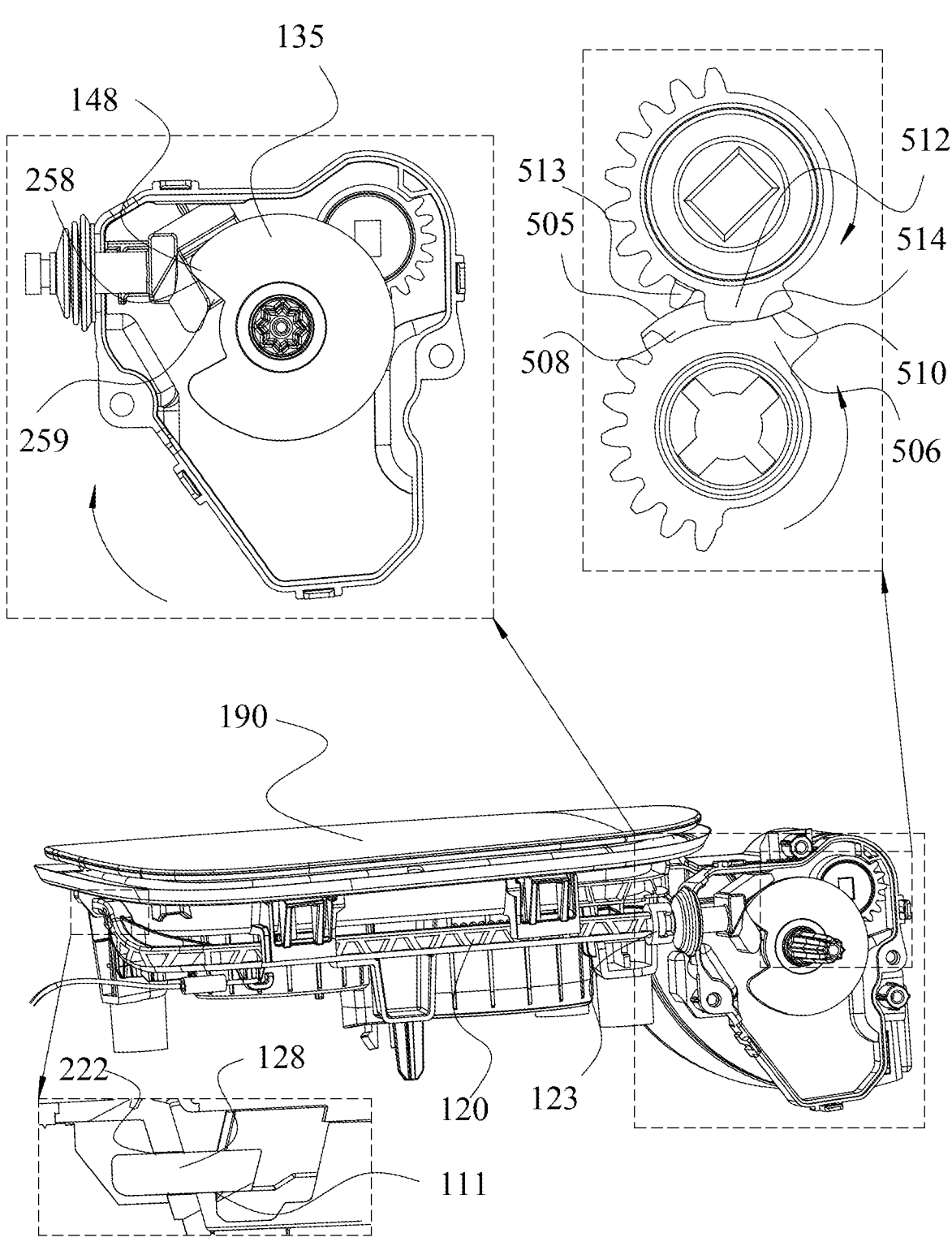
FIG. 6E is a schematic diagram showing the state of the flap assembly, with the locking device in the locked position and the flap in the closed position.

FIG. 6A is a schematic diagram showing the state of the flap assembly 100 with the locking device 120 in the locked position and the flap 190 in the closed position; FIG. 6B is a schematic diagram showing the state of the flap assembly 100 with the locking device 120 in the unlocked position and the flap 190 in the closed position; FIG. 6C is a schematic diagram showing the state of the flap assembly 100 with the flap 190 completely opened; FIG. 6D is a schematic diagram showing the state of the flap assembly 100 with the locking device 120 in the unlocked position and the flap 190 in the closed position; and FIG. 6E is a schematic diagram showing the state of the flap assembly 100 with the locking device 120 in the locked position and the flap 190 in the closed position. For the convenience of illustration of the positional relationship of the components in different states in FIGS. 6A through 6E, the power source 150 and the front housing 401 are removed from FIGS. 6A through 6E to better show the cooperative relationship of the components of the flap assembly 100. Rectangular dashed boxes in the lower portions of FIGS. 6A through 6E show enlarged cross-sectional views of the cooperative relationship of the locking pin 128 of the locking device 120 and the flap hole 111 of the connection portion 112. Rectangular dashed boxes on the upper left sides of FIGS. 6A through 6E show enlarged views, viewed from front to back, of the cooperative relationship between the driving member 135 and the transmission rod assembly 133. Rectangular dashed boxes on the upper right sides of FIGS. 6A through 6E show enlarged views, viewed from back to front, of the cooperative relationship between the driving gear 136 and the transmission gear 132.

FIGS. 6A through 6C show the process of unlocking and opening the flap 190. As shown in FIG. 6A, the flap 190 is in the closed position, and the locking device 120 is in the locked position. In the locked position, the locking pin 128 of the locking device 120 is inserted into the through hole 222 of the base 101 and the flap hole 111 in the connection portion 112, thereby retaining the flap 190 in the closed position. In this case, the transmission gear abutting portion 512 of the transmission gear 132 is accommodated in the accommodating portion 508, the transmission gear limiting surface 514 abuts against the driving gear limiting surface 510 of the driving gear limiting tooth 506, and the abutting tooth 513 abuts against the top portion 505. The protrusion 147 of the driving member 135 is accommodated in the upper end of the guiding cavity 259 of the transmission rod assembly 133, the driving portion 148 of the driving member 135 abuts against the engagement surface 258 of the transmission rod assembly 133, and the protrusion 260 on the rear side of the transmission rod assembly 133 is accommodated on the right side of the guiding groove 430 of the rear housing 402.

The process from FIG. 6A to FIG. 6B show an unlocking process of the locking device 120. During this process, the power source 150 drives the driving device 131 to rotate in the counterclockwise direction, so the driving member 135 rotates in the counterclockwise direction (that is, rotates in the counterclockwise direction in the rectangular dashed box on the upper left side of FIG. 6A), and the driving gear 136 rotates in the counterclockwise direction (that is, rotates in the clockwise direction in the rectangular dashed box on the upper right side of FIG. 6A). In one aspect, during the rotation of the driving member 135 in the counterclockwise direction, the driving portion 148 of the driving member 135 abuts against and pushes the engagement surface 258 of the transmission rod assembly 133, and pushes the locking device 120 connected to the transmission rod assembly 133 to move to the left, such that the locking pin 128 is withdrawn from the flap hole 111, that is, the locking device 120 moves from the locked position to the unlocked position. As shown in FIG. 6B, the protrusion 147 of the driving member 135 moves to the lower end of the guiding cavity 259 of the transmission rod assembly 133, the driving portion 148 of the driving member 135 moves to abut against a lower portion of the engagement surface 258 of the transmission rod assembly 133, and the protrusion 260 on the rear side of the transmission rod assembly 133 moves to the left side of the guiding groove 430 of the rear housing 402. In another aspect, during the rotation of the driving gear 136 in the counterclockwise direction, the transmission gear limiting surface 514 of the transmission gear 132 is gradually disengaged from the driving gear limiting surface 510 of the driving gear limiting tooth 506, but the transmission gear abutting portion 512 is still accommodated in the accommodating portion 508, and the abutting tooth 513 abuts against the top portion 505. In other words, the driving gear 136 does not drive the transmission gear 132 to rotate in this case. Accordingly, during the process from FIG. 6A to FIG. 6B, the locking device 120 is moved from the locked position to the unlocked position, and since the driving gear 136 rotates relative to the transmission gear 132, the flap rotating shaft 171 does not move, and the flap 190 remains in the closed position.

The process from FIG. 6B to FIG. 6C shows the process of the flap 190 from the closed position to the open position. During this process, the power source 150 continues to drive the driving device 131 to rotate in the counterclockwise direction, and therefore both the driving member 135 and the driving gear 136 also continue to rotate in the counterclockwise direction. As shown in FIG. 6B, during the rotation of the driving gear 136 in the counterclockwise direction, the first driving tooth 501 of the driving gear 136 starts to urge the transmission gear abutting portion 512 to rotate, such that the driving gear 136 no longer rotates relative to the transmission gear 132, but starts to drive the transmission gear 132 to rotate in the clockwise direction (i.e., a first direction). The plurality of driving teeth 502 are then meshed with the plurality of transmission teeth 511 to continue to drive the transmission gear 132 to rotate in the clockwise direction. In this way, the transmission gear 132 drives the hinge 170 to rotate, moving the flap 190 to the open position shown in FIG. 6C. During the process from FIG. 6B to FIG. 6C, the driving member 135 rotates in the counterclockwise direction, and the driving portion 148 of the driving member 135 is disengaged from the transmission rod assembly 133, so that the position of the transmission rod assembly 133 remains unchanged.

FIGS. 6C through 6E show the process of closing and locking the flap 190. The process from FIG. 6C to FIG. 6D shows the process of the flap 190 from the open position to the closed position. During this process, the power source 150 drives the driving device 131 to rotate in the clockwise direction, so the driving member 135 rotates in the clockwise direction (that is, rotates in the clockwise direction in the rectangular dashed box on the upper left side of FIG. 6D), and the driving gear 136 also rotates in the counterclockwise direction (that is, rotates in the counterclockwise direction in the rectangular dashed box on the upper right side of FIG. 6D). As shown in FIG. 6C, during the rotation of the driving gear 136 in the clockwise direction, the plurality of driving teeth 502 of the driving gear 136 are meshed with the plurality of transmission teeth 511 such that the clockwise rotation of the driving gear 136 can drive the transmission gear 132 to rotate in the counterclockwise direction (i.e., a second direction), and the rotation of the transmission gear 132 drives the flap 190 to rotate in the counterclockwise direction such that the flap 190 rotates to the closed position as shown in FIG. 6D. In this case, the first driving tooth 501 of the driving gear 136 starts to be disengaged from the abutting tooth 513, and the transmission gear abutting portion 512 is accommodated in the accommodating portion 508.

It should be noted that, during the process from FIG. 6C to FIG. 6D, the driving portion 148 of the driving member 135 is disengaged from the transmission rod assembly 133 until, at the position shown in FIG. 6D, the two are engaged with each other. In this case, the protrusion 147 of the driving member 135 moves to the lower end of the guiding cavity 259 of the transmission rod assembly 133, the driving portion 148 of the driving member 135 moves to and abuts against a lower portion of the engagement surface 258 of the transmission rod assembly 133, and the protrusion 260 on the rear side of the transmission rod assembly 133 moves to the left side of the guiding groove 430 of the rear housing 402.

During the process from FIG. 6D to FIG. 6E, the power source 150 drives the driving device 131 to continue to rotate in the clockwise direction. In one aspect, the plurality of driving teeth 502 of the driving gear 136 are disengaged from the plurality of transmission teeth 511 such that the rotation of the driving gear 136 no longer drives the rotation of the transmission gear 132. In this case, the driving gear 136 rotates relative to the transmission gear 132. More specifically, the driving gear 136 continues to rotate in the clockwise direction until the driving gear limiting surface 510 of the driving gear limiting tooth 506 of the driving gear 136 abuts against the transmission gear limiting surface 514 of the transmission gear 132, and the driving gear 136 no longer continues to rotate in the clockwise direction. In another aspect, during the rotation of the driving member 135 in the clockwise direction, the protrusion 147 of the driving member 135 abuts against and pushes a right wall of the guiding cavity 259 of the transmission rod assembly 133, and pushes the locking device 120 connected to the transmission rod assembly 133 to move to the right, such that the locking pin 128 is inserted into the flap hole 111 to retain the flap 190 in the closed position. As shown in FIG. 6E, the abutting tooth 513 abuts against the top portion 505 of the driving gear abutting portion 504 to prevent the rotation of the transmission gear 132 in the clockwise direction.

In the actuation assembly (comprising the driving gear 136 and the transmission gear 132) described above, the driving gear abutting portion 504 is provided on the driving gear 136, and is arranged partly in the axial direction, so that the plurality of driving teeth 502 (i.e., small teeth) can drive the transmission gear 132 to move without having to provide large teeth on the driving gear 136, thereby reducing the machining progress and making the meshing between the driving gear 136 and the transmission gear 132 smoother. The present disclosure comprises other suitable actuation assemblies.

Figure 7A:
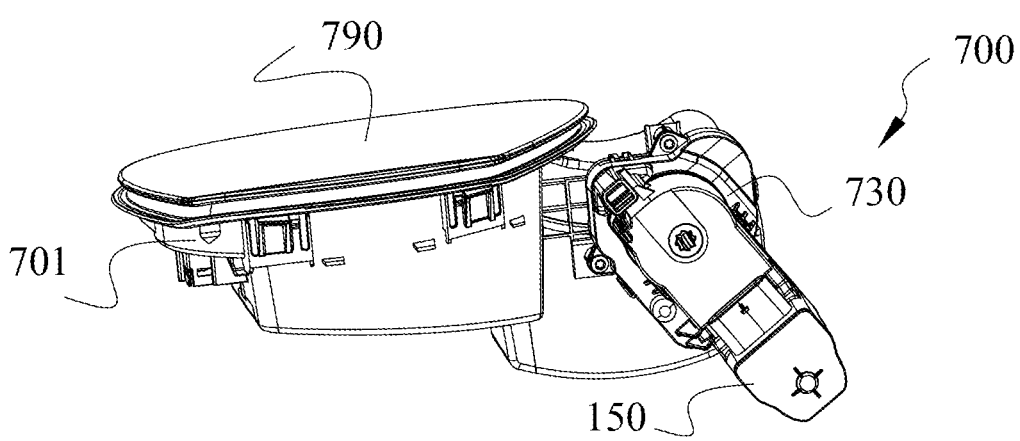
FIG. 7A is a perspective view, viewed from the front, of another embodiment of a refueling port or charging port flap assembly of the present disclosure, with a flap in a closed state.
Figure 7B:
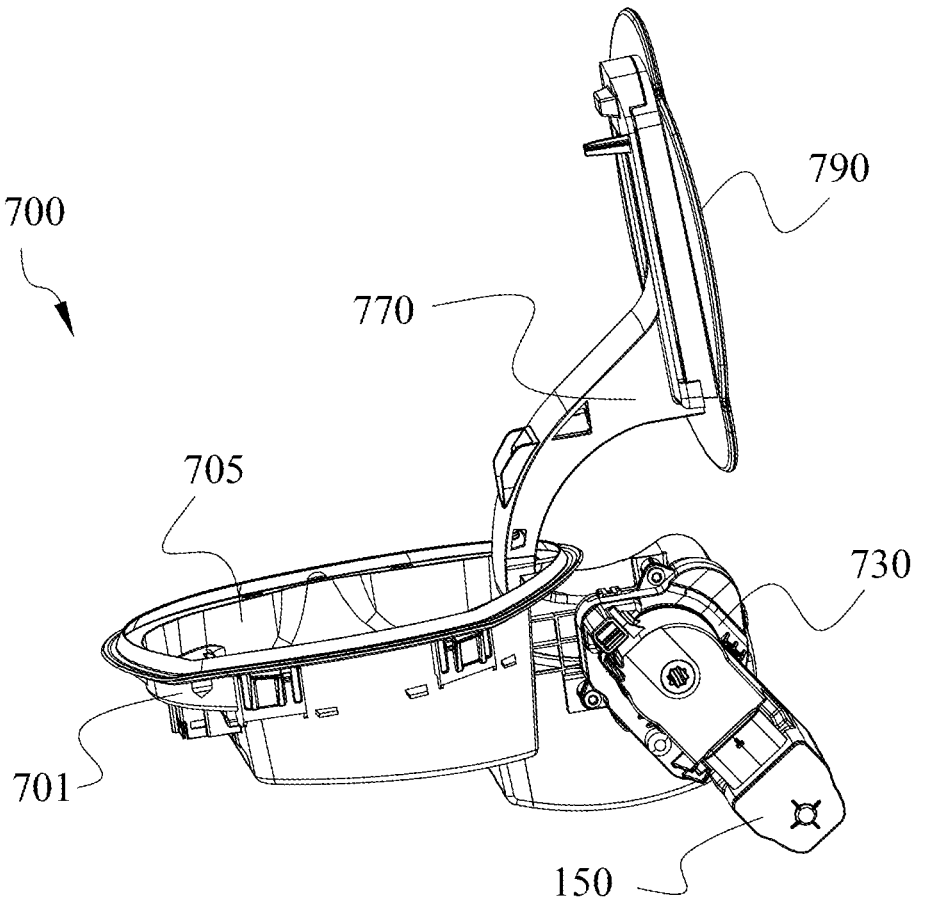
FIG. 7B is a perspective view, viewed from the front, of the refueling port or charging port flap assembly shown in FIG. 7A, with the flap in an open state.
Figure 7C:
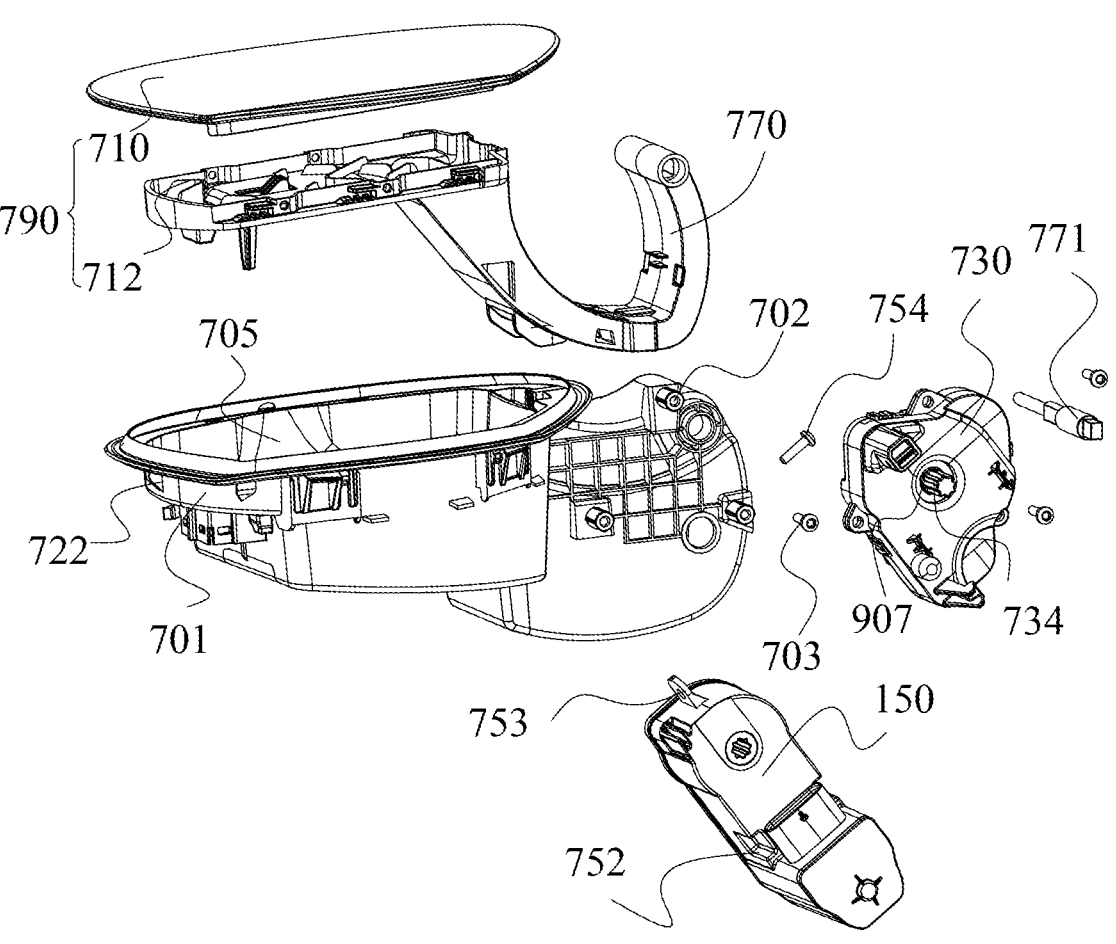
FIG. 7C is an exploded view, viewed from the front, of the refueling port or charging port flap assembly shown in FIG. 7A.
Figure 7D:
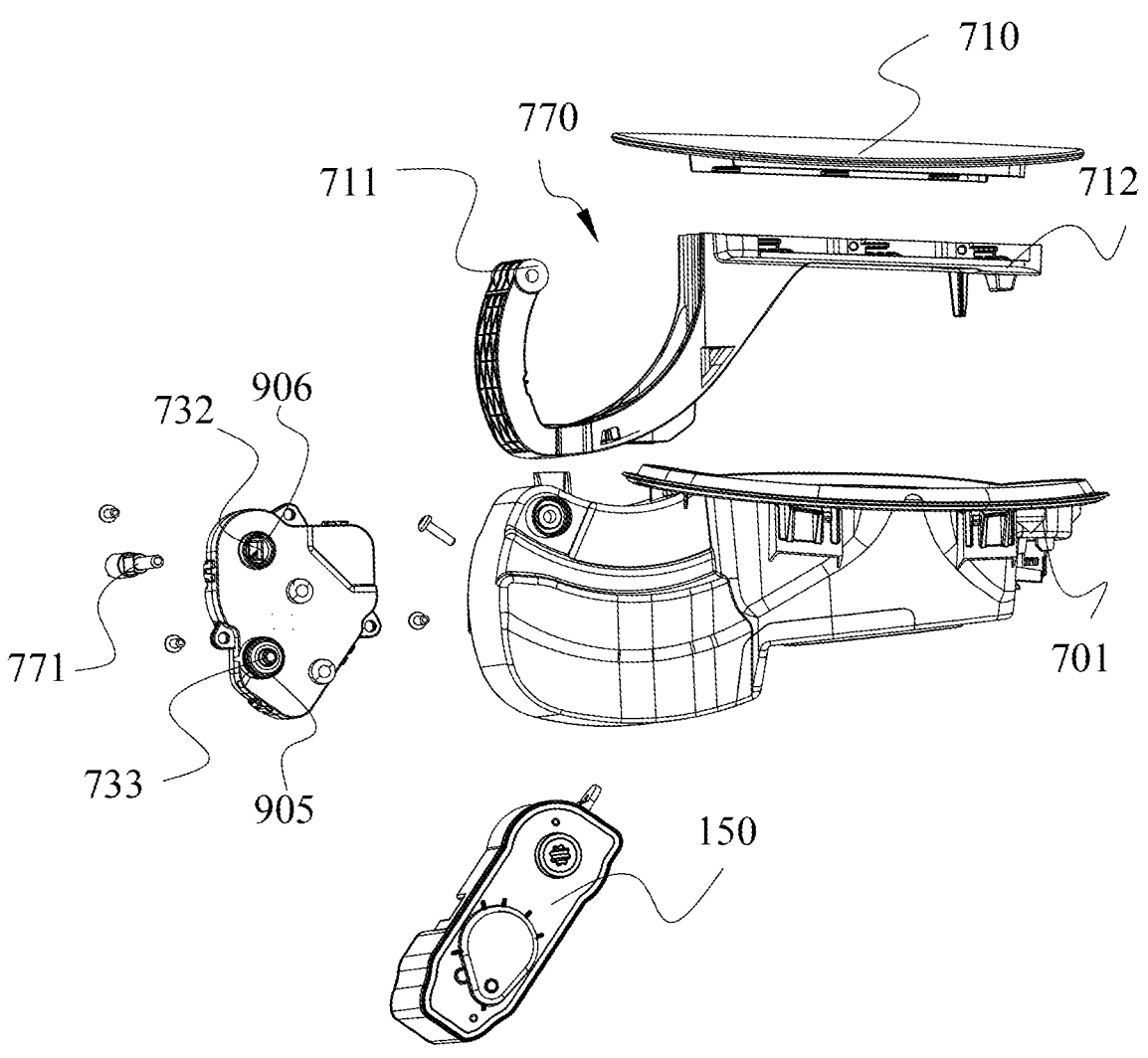
FIG. 7D is an exploded view, viewed from the rear, of the refueling port or charging port flap assembly shown in FIG. 7A.
Figure 8A:
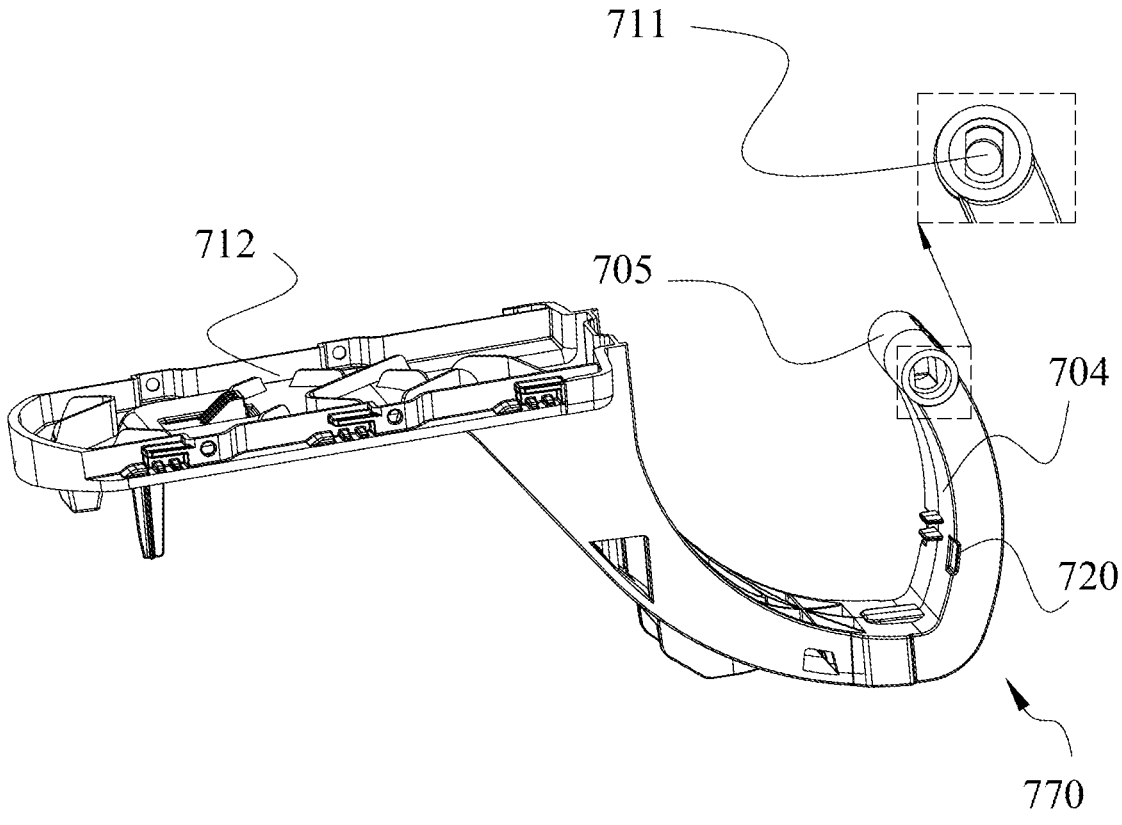
FIG. 8A is a perspective view, viewed from the front, of a hinge and a connection portion of a flap shown in FIGS. 7A through 7D.
Figure 8B:
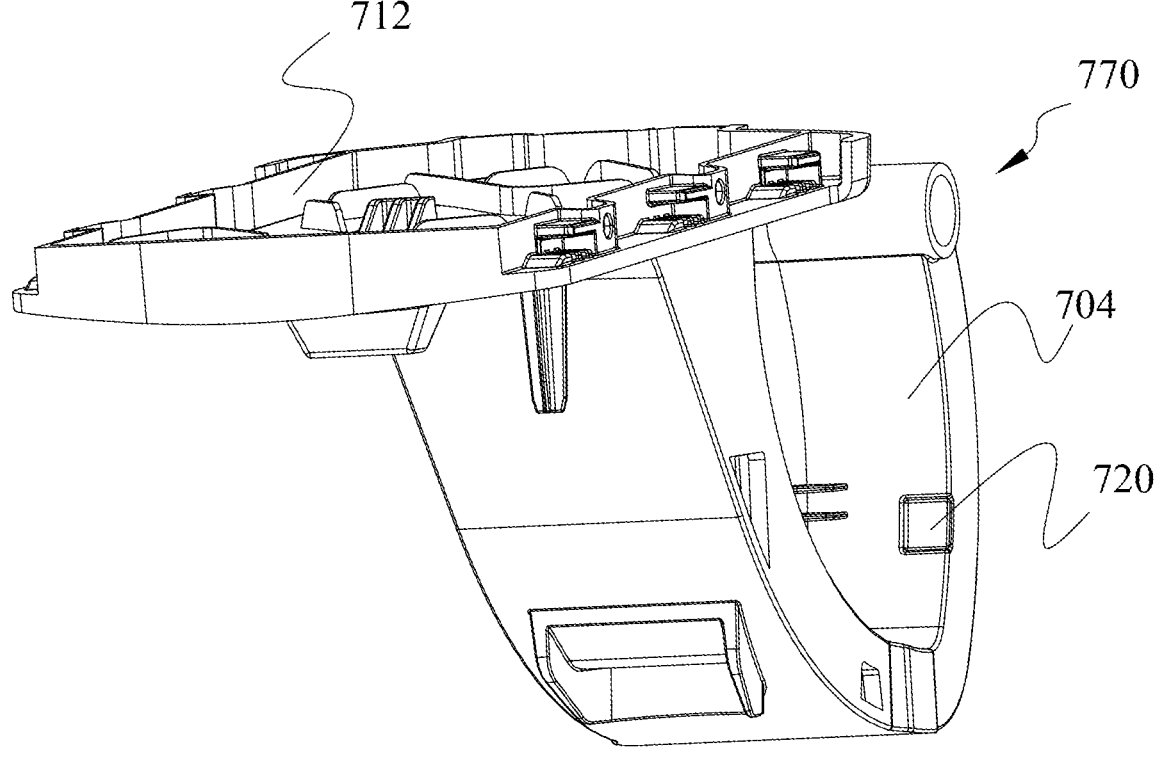
FIG. 8B is a perspective view, viewed from the left, of the hinge and the connection portion of the flap shown in FIGS. 7A through 7D.

FIG. 7A is a perspective view, viewed from the front, of another embodiment of a refueling port or charging port flap assembly of the present disclosure, with a flap in a closed state; FIG. 7B is a perspective view, viewed from the front, of the refueling port or charging port flap assembly shown in FIG. 7A, with the flap in an open state; FIG. 7C is an exploded view, viewed from the front, of the refueling port or charging port flap assembly shown in FIG. 7A; and FIG. 7D is an exploded view, viewed from the rear, of the refueling port or charging port flap assembly shown in FIG. 7A. FIG. 8A is a perspective view, viewed from the front, of a hinge and a connection portion of a flap shown in FIGS. 7A through 7D; and FIG. 8B is a perspective view, viewed from the left, of the hinge and the connection portion of the flap shown in FIGS. 7A through 7D.

It should be noted that although the structures of the base and the flap shown in FIGS. 7A through 7D are different from those in FIGS. 1B through 1E, only the different implementations of the base and the flap are shown here. The actuation device of the present disclosure can be applied to the bases and the flaps shown in FIGS. 1B through 1E and FIGS. 7A through 7D, and can also be used in bases and flaps in other implementations. The structures of the driving gear and the transmission gear in FIG. 7A through 7D are similar to those in FIGS. 1B through 1E, and the functions and effects realized by the two are the same, except that the structures of the driving gear and the transmission gear in FIGS. 1B through 1E are more suitable for gears made of a metal material, whereas the structures of the driving gear and the transmission gear in FIGS. 7A through 7D are more suitable for gears made of a plastic material.

The actuation device in FIGS. 7A through 7D does not have the locking device in FIGS. 1B through 1E, because the actuation device in FIGS. 7A through 7D can implement the locking and unlocking of the flap. The actuation device in FIG. 7A through 7D differs from the actuation device in FIGS. 1B through 1E in that the direction in which the transmission rod assembly (linear motion mechanism) of the actuation device moves linearly is perpendicular to the direction of the rotation axis around which the transmission gear (rotary motion mechanism) rotates in FIGS. 1B through 1E, whereas the direction in which the transmission rod assembly (linear motion mechanism) of the actuation device moves linearly is parallel to the direction of the rotation axis around which the transmission gear (rotary motion mechanism) rotates in FIGS. 7A through 7D. The actuation device shown in FIGS. 7A through 7D is mounted in a separate housing. This is one way of mounting of the actuation device. In other embodiments, the actuation device (comprising no housing) in FIGS. 7A through 7D can be mounted directly to the mechanism to which it is mounted, such as the vehicle body, or the base of the vehicle body.

As shown in FIGS. 7A through 7C, the refueling port or charging port flap assembly 700 comprises a base 701, a flap 790, and an actuation assembly. The actuation assembly comprises a hinge 770 (flap connecting mechanism), a flap rotating shaft 771, an actuation device 730, and a power source 150. The flap 790 is connected to the hinge 770, and the hinge 770 is connected to the flap rotating shaft 771 such that the rotation of the flap rotating shaft 771 can open and close the flap 790. The flap 790 is mounted to the base 701 via the hinge 770. The actuation device 730 is mounted to a mounting component 702 of the base 701 via a fastener 703, so as to be fixed to the front side of the base 701. The power source 150 is mounted, for example, by means of a fastener, a snap-fit member, etc., on the front side of the actuation device 730. As shown in FIGS. 8A through 8B, the hinge

770 comprises a locking engagement portion 720, and the transmission rod assembly 733 (locking mechanism) is engaged with the locking engagement portion 720 to lock the flap 790. In an embodiment, the locking engagement portion 720 is formed by recessing a surface 704 on the left side of the hinge 770 to the right (see FIG. 7C). In other embodiments, the locking engagement portion 720 includes other suitable structures.

Figure 9A:
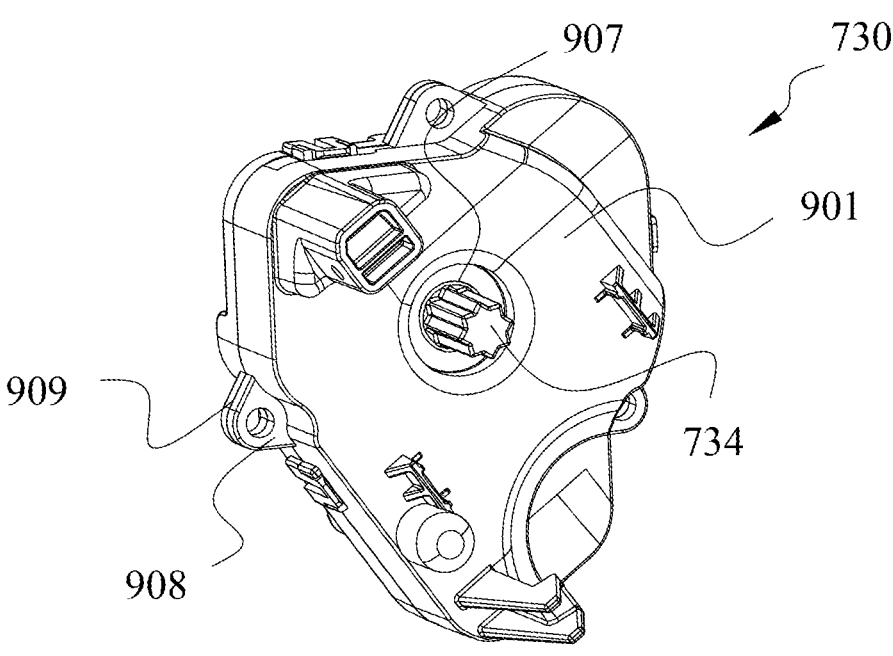
FIG. 9A is a perspective view, viewed from the front, of an actuation device shown in FIGS. 7A through 7D.
Figure 9B:
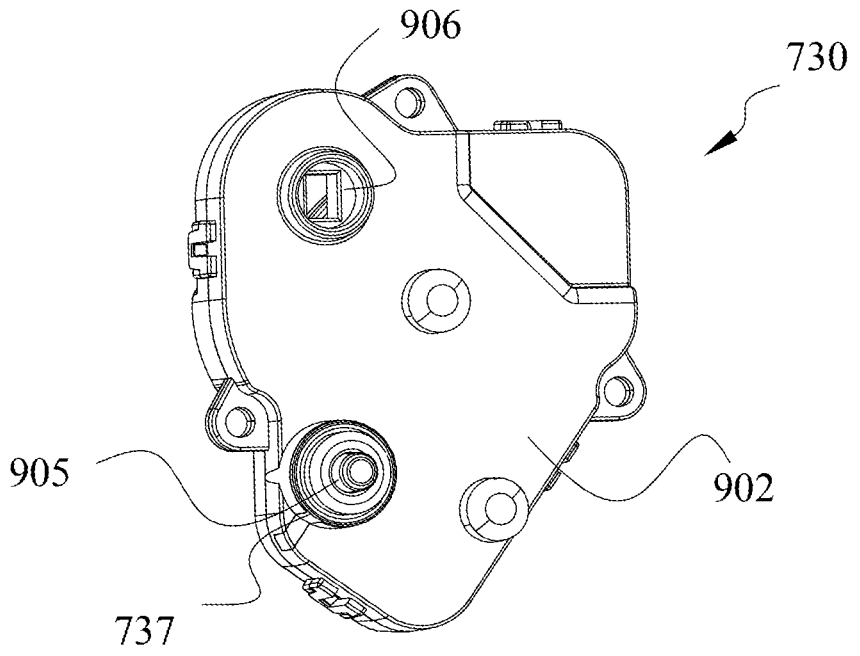
FIG. 9B is a perspective view, viewed from the rear, of the actuation device shown in FIGS. 7A through 7D.
Figure 9C:
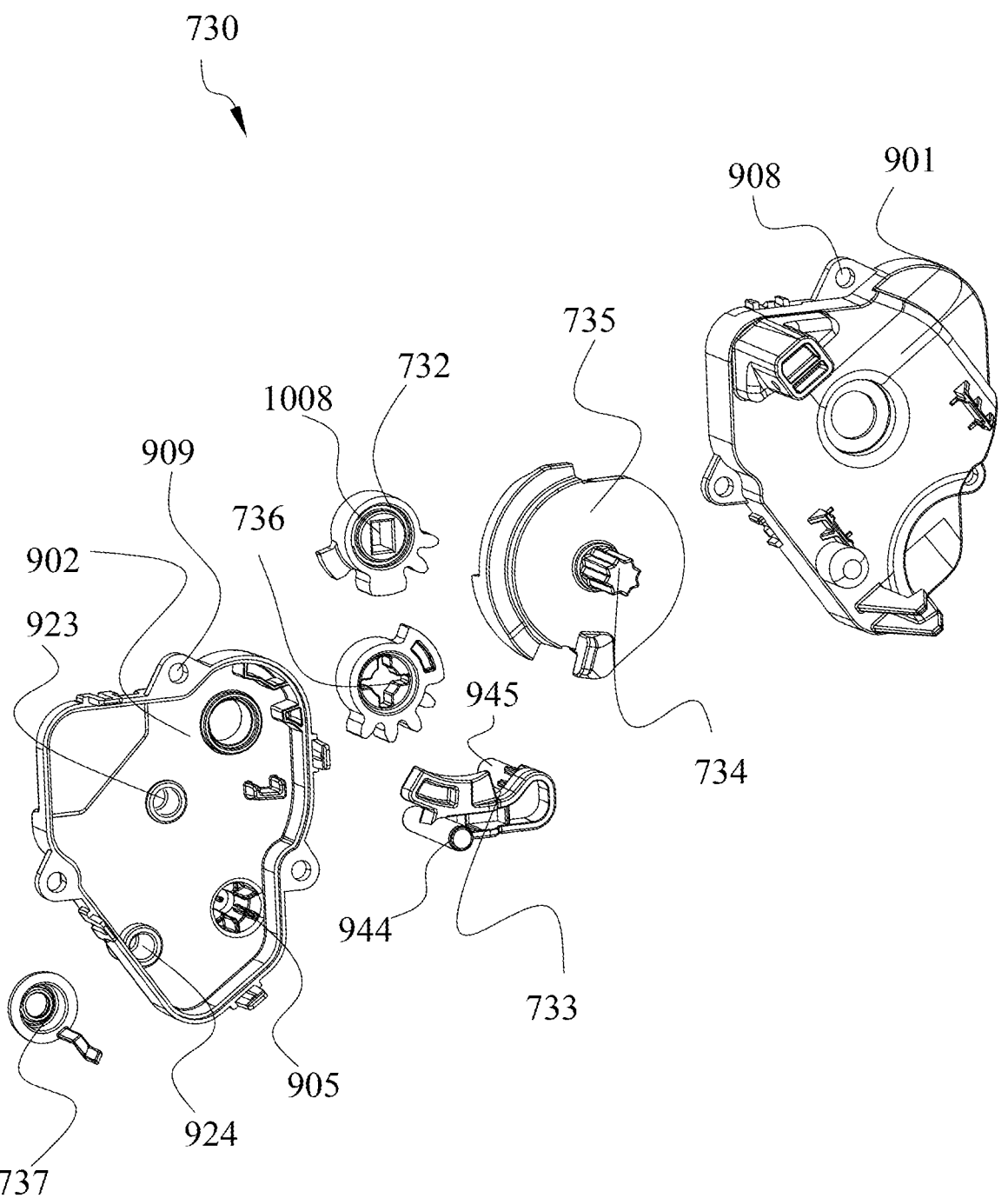
FIG. 9C is an exploded view, viewed from the front, of the actuation device shown in FIGS. 7A through 7D.

The actuation device 730 comprises a housing, a driving device (driving mechanism, which comprises a driving shaft 734, a driving member 735, and a driving gear 736), a transmission gear 732, a transmission rod assembly 733 and a seal 737 (see FIG. 9C). The driving device, the transmission gear 732 and the transmission rod assembly 733 are generally arranged inside the housing, and can operate independently without relying on the mechanism to which they are mounted outside the housing. The driving device is used as a driving input mechanism for receiving power input from the outside. The driving device is configured to receive the power provided by the power source 150 to drive the transmission gear 732 and the transmission rod assembly 733. The transmission rod assembly 733 is used as a linear motion mechanism, which is configured to perform a reciprocating linear motion along a predetermined linear path. A locking rod portion 945 (see FIGS. 10C through 10D) on the transmission rod assembly 733 is used as a linear output mechanism, which is configured to provide a linear motion output to unlock and lock the flap 790. The transmission gear 732 is used as a rotary motion mechanism, which is configured to perform a reciprocating rotary motion along a predetermined rotary path. An opening 1008 (see FIG. 10G) in the transmission gear 732 is used as a rotary output mechanism, which is configured to provide a rotary motion output to open and close the flap 790. The driving device, the transmission gear 732 and the transmission rod assembly 733 cooperate with each other to convert the power input into the linear motion output and the rotary motion output, so as to unlock and lock the flap 790 and open and close the flap 790. The driving device is driven by the power source to move by a predetermined angle to drive the transmission gear 732 to make a reciprocating rotary motion along a predetermined path to open and close the flap 790, and to drive the transmission rod assembly 733 to make a reciprocating linear motion along a predetermined path to unlock and lock the flap 790.

The driving device (power input mechanism), the transmission gear 732 (rotary output mechanism) and the transmission rod assembly 733 (linear output mechanism) of the actuation device 730 each have a predetermined structure and size. The housing of the actuation device 730 further comprises mounting components 408, 409 each of which has a predetermined structure and size. Therefore, the design and manufacture of the actuation device 730 can be simplified. Moreover, when the vehicle body, for example, the base of the vehicle body, is provided with components having structures and sizes which correspond to those of the driving device 731 (power input mechanism), the transmission gear 732 (rotary output mechanism) and the transmission rod assembly 733 (linear output mechanism) of the actuation device 730, the actuation device 730 can be easily mounted to the vehicle body, and engaged with these components on the vehicle body, so as to actuate the flap 790.

As shown in FIGS. 7C through 7D, the driving shaft 734 protrudes from an opening 907 on the front side of the housing to be engaged with the power source 150 on the front side of the actuation device 730, such that the driving shaft 734 can be driven to rotate by the power source 150, so as to drive the transmission gear 732 and the transmission rod assembly 733 to move. The transmission gear 732 is aligned with an opening 906 on the rear side of the housing and is engaged with an end of the flap rotating shaft 771, such that the rotation of the transmission gear 732 can drive the flap rotating shaft 771 to rotate, so as to open and close the flap 790. The transmission rod assembly 733 protrudes from an opening 905 on the rear side of the housing, and can move linearly in the front and rear directions. When the flap 790 is closed, the transmission rod assembly 733 can move linearly from front to back, so as to be engaged with the locking engagement portion 720 of the hinge 770, thereby blocking the rotation of the hinge 770 from opening the flap 790, that is, locking the flap 790. When the flap 790 is closed, the transmission rod assembly 733 can linearly move from back to front, so as to be disengaged from the locking engagement portion 720 of the hinge 770, so that the transmission rod assembly 733 no longer blocks the rotation of the hinge 770, that is, the flap 790 is unlocked, and the flap can be opened at this time. That is, the transmission rod assembly 733 is used as a locking mechanism for locking and unlocking the flap 790 in the closed position. The direction in which the transmission rod assembly 733 moves linearly is substantially parallel to the direction of the rotation axis about which the transmission gear 732 rotates, so the transmission rod assembly 733 can be used as a locking mechanism to lock and unlock the flap 790 without the need for additional locking devices or mechanisms. Moreover, such an arrangement also makes the transfer distance of the linear motion output shorter, thereby reducing transfer errors and providing reliable control of the linear motion output.

Figure 9D:
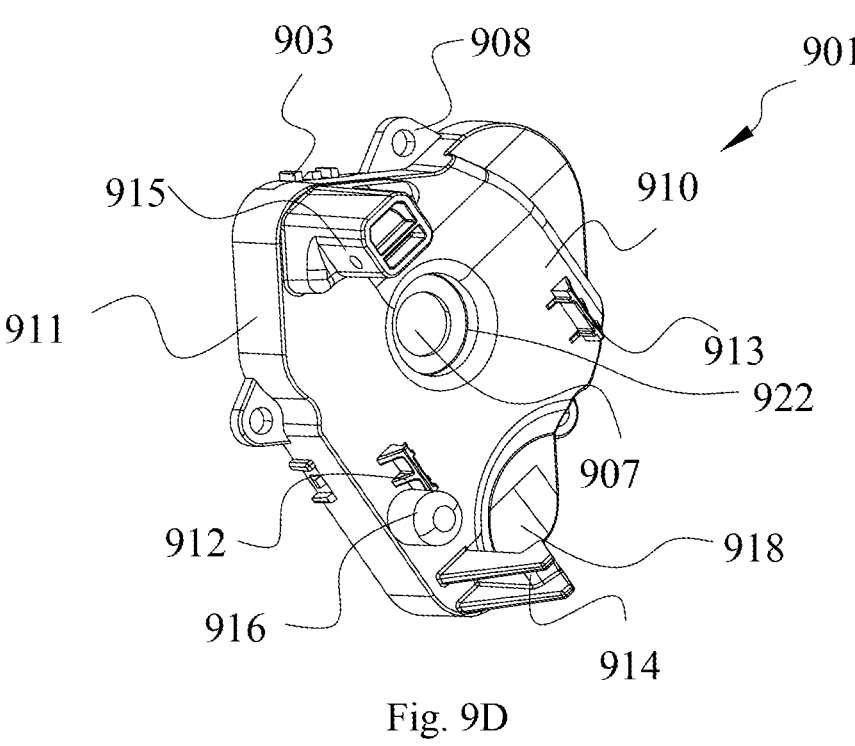
FIG. 9D is a perspective view, viewed from the front, of a front housing shown in FIGS. 7A through 7D.
Figure 9E:
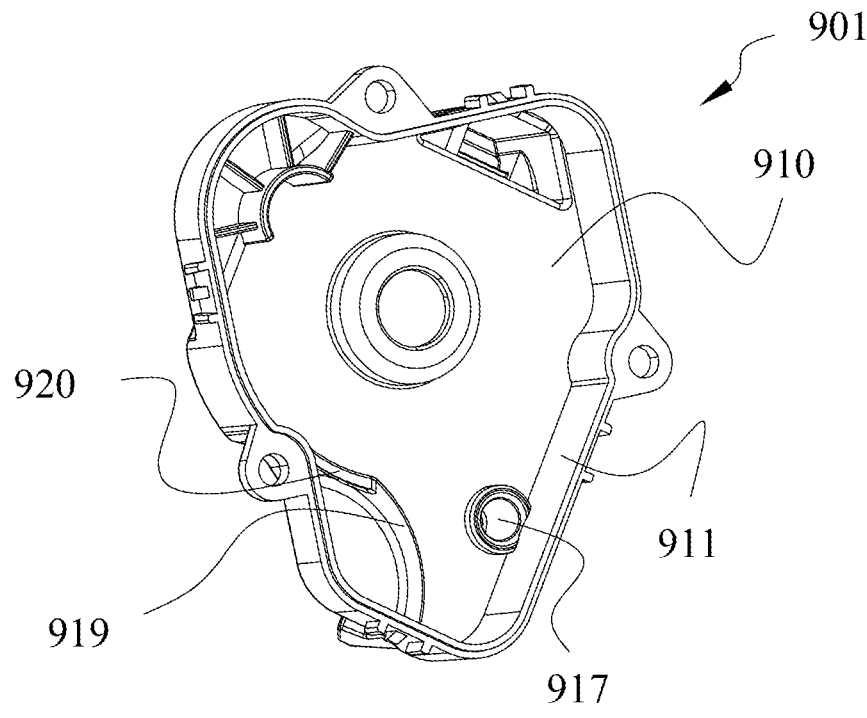
FIG. 9E is a perspective view, viewed from the rear, of the front housing shown in FIGS. 7A through 7D.
Figure 9F:
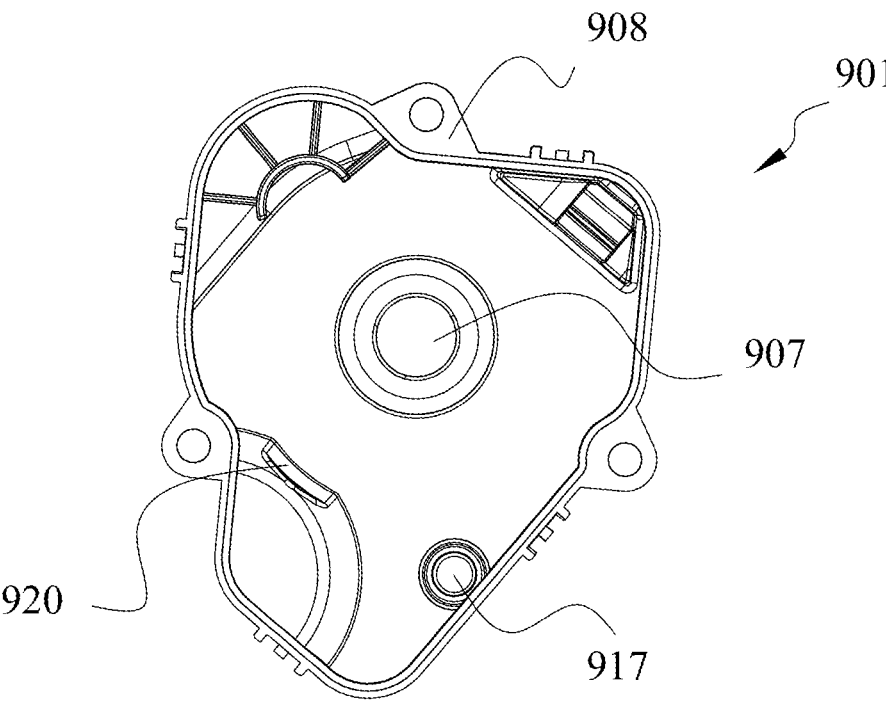
FIG. 9F is a front view of FIG. 9E.
Figure 9G:
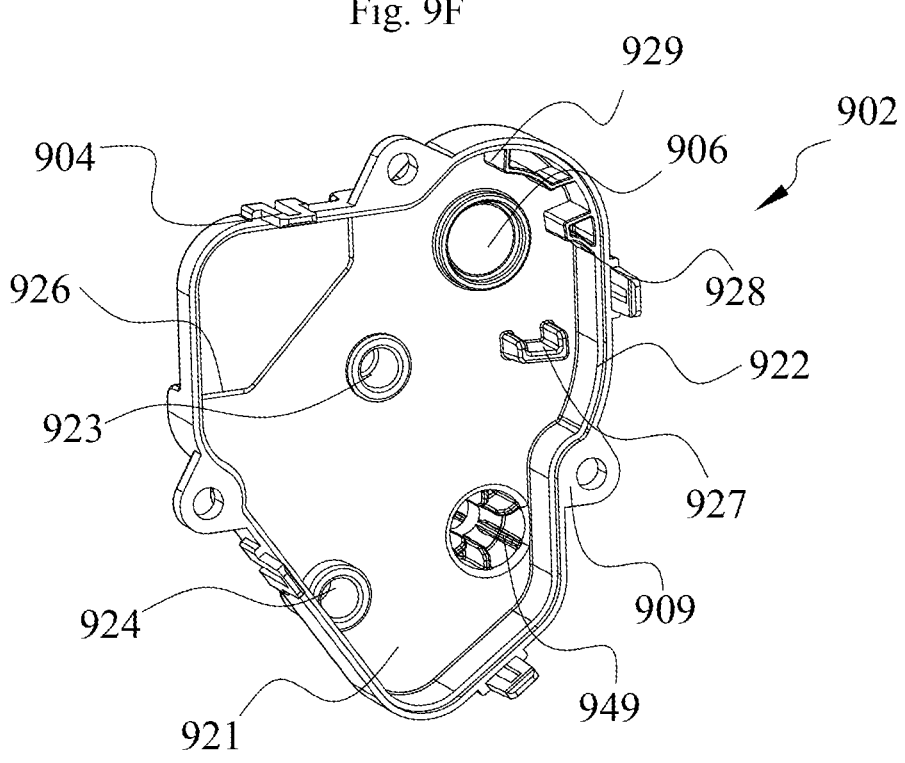
FIG. 9G is a perspective view, viewed from the front, of a rear housing shown in FIGS. 7A through 7D.

FIG. 9A is a perspective view, viewed from the front, of an actuation device 730 shown in FIGS. 7A through 7D; FIG. 9B is a perspective view, viewed from the rear, of the actuation device 730 shown in FIGS. 7A through 7D; FIG. 9C is an exploded view, viewed from the front, of the actuation device 730 shown in FIGS. 7A through 7D; FIG. 9D is a perspective view, viewed from the front, of the front housing 901 shown in FIGS. 7A through 7D; FIG. 9E is a perspective view, viewed from the rear, of the front housing 901 shown in FIGS. 7A through 7D; FIG. 9F is a front view of FIG. 9E; FIG. 9G is a perspective view, viewed from the front, of a rear housing 902 shown in FIGS. 7A through 7D; and FIG. 9H is a perspective view, viewed from the rear, of the rear housing 902 shown in FIGS. 7A through 7D.

As shown in FIG. 9A through 9H, the actuation device 730 comprises a housing, a driving device, a transmission gear 732 and a transmission rod assembly 733. The driving device comprises a driving shaft 734, a driving member 735 and a driving gear 736. The driving device is configured to be capable of rotating about an axis of the driving shaft 734 to drive the transmission gear 732 (rotary motion mechanism) to rotate about the rotation axis and to drive the transmission rod assembly 733 (linear motion mechanism) to move linearly. The direction of the rotation axis about which the transmission gear 732 (rotary motion mechanism) rotates is parallel to the direction of the axis of the driving shaft 734. The direction in which the transmission rod assembly 733 (linear motion mechanism) moves linearly is parallel to the direction of the axis of the driving shaft 734. An assembly structure is provided in the housing for assembling the driving device, the transmission gear 732 and the transmission rod assembly 733. The assembly structure is further configured to provide support and a working environment for the driving device, the transmission gear 732 and the transmission rod assembly 733, such that these components can operate independently to achieve complete functions, such as controlling the opening and closing of the flap 790, and locking and unlocking of the flap 790, without relying on the mechanism outside the housing. Mounting structures 908, 909, such as mounting through holes, are provided outside the housing for mounting the actuation device 730 to a desired mechanism.

Figure 9H:
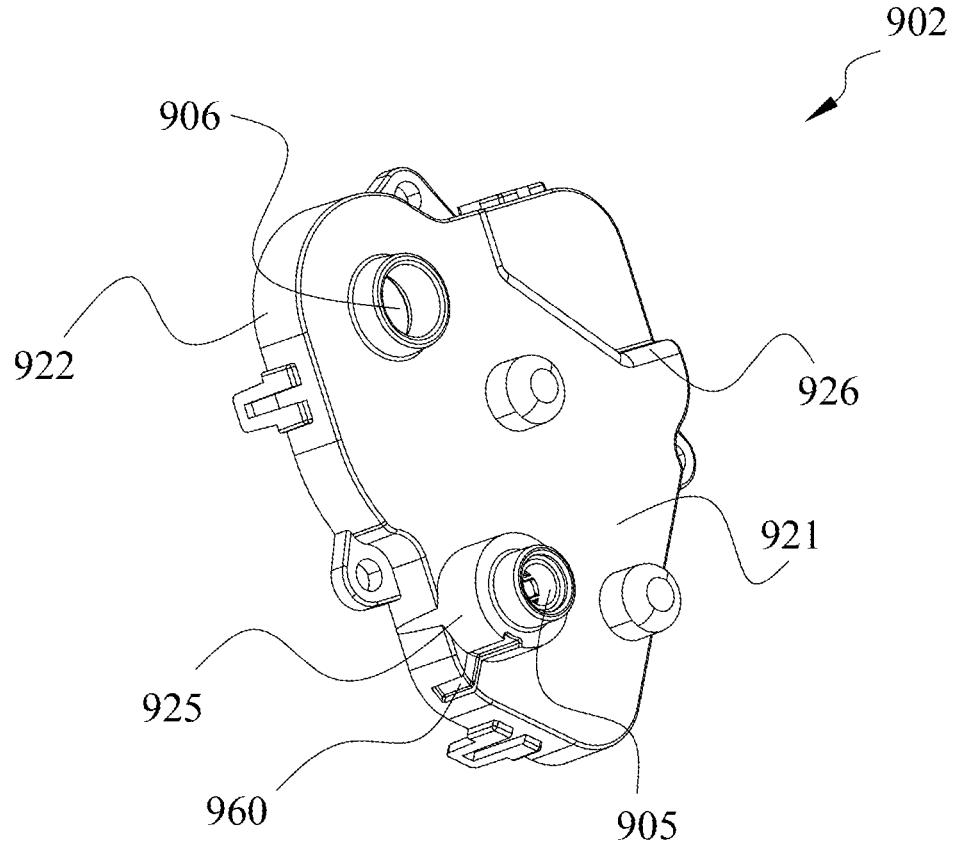
FIG. 9H is a perspective view, viewed from the rear, of the rear housing shown in FIGS. 7A through 7D.

As shown in FIGS. 9A through 9H, the housing comprises a front housing 901 and a rear housing 902. As shown in FIGS. 9D through 9F, the front housing 901 comprises a base portion 910 and a circumferential portion 911. The front housing 901 comprises an external mount for mounting the power source 150 to the front side of the front housing 901. The external mount comprises side snap-fit members 912, 913, an upper snap-fit member 914, and a fastening mount 915. The front housing 901 comprises a recessed portion 922 which is formed by recessing the base portion 910 to the rear side, and an opening 907 is provided in the center of the recessed portion 922. The driving shaft 734 protrudes from the opening 907 of the front housing 901, so as to be engaged with the power source 150, so that the driving shaft can be driven to rotate by the power source 150. An accommodating cavity 917 is formed inside a protrusion 916 of the front housing 901 for accommodating a guiding rod portion 944 of the transmission rod assembly 733 (see FIGS. 10C through 10D). The base portion 910 of the front housing 901 is further provided with a corner recess 918, and a guiding surface 919 is provided on the rear side of the corner recess 918 (the rear side of the front housing 901). The guiding surface 919 is provided with a guide 920 for guiding the rotation of the transmission gear 732. The circumferential portion 911 of the front housing 901 is provided with a lug 908 in which a mounting through hole is provided. Similarly, as shown in FIGS. 9G through 9H, the circumferential portion 922 of the rear housing 902 is provided with a lug 909 in which a mounting through hole is provided. The lugs 908, 909 of the front housing 901 and the rear housing 902 are aligned with the mounting components 702 on the base 701, so that the fastener 703 can pass through the mounting through holes to mount the actuation device 730 to the desired mounting structure or position (see FIG. 7C). The circumferential portion 911 of the front housing 901 is provided with a snap member 903, and the circumferential portion 922 of the rear housing 902 is provided with a matching snap member 904. The snap members 903, 904 are engaged to each other to fix the front housing 901 and the rear housing 902 together.

As shown in FIG. 9C and FIGS. 9G through 9H, the rear housing 902 comprises a base portion 921, a circumferential portion 922, an opening 906, an opening 905, a shaft accommodating cavity 923, a transmission rod accommodating cavity 924 and a boss 925. The opening 906 of the rear housing 902 is aligned with the opening 1008 of the transmission gear 732, and the flap rotating shaft 771 can be inserted into the opening 1008 of the transmission gear 732 through the opening 906 of the rear housing 902 and fixed in the opening 1008. The shaft accommodating cavity 923 of the rear housing 902 is configured to accommodate the driving shaft 734, and the transmission rod accommodating cavity 924 of the rear housing 902 is configured to accommodate the guiding rod portion 944 of the transmission rod assembly 733. The boss 925 of the rear housing 902 has a through hole, i.e., the opening 905. The locking rod portion 945 of the transmission rod assembly 733 protrudes from the opening 905 and moves linearly in the front and rear directions so as to be disengaged from and engaged with the locking engagement portion 720, to unlock and lock the flap 790. A first limiter 926, a second limiter 927, a third limiter 928 and a fourth limiter 929 are provided on the inner side of the rear housing 902, and these limiters comprise limiting surfaces. The first limiter 926 is configured to block the clockwise rotation of the driving member 735, so as to limit the extent to which the transmission rod assembly 733 (locking mechanism) blocks the locking engagement portion 720, for example, the engagement area of the two. The second limiter 927 is configured to block the counterclockwise rotation of the driving member 735, so as to limit the opening angle of the flap 790. The third limiter 928 is configured to block the counterclockwise rotation of the transmission gear 732, so as to limit the extent to which the transmission rod assembly 733 (locking mechanism) blocks the locking engagement portion 720. The fourth limiter 929 is configured to block the clockwise rotation of the transmission gear 732, so as to limit the opening angle of the flap 790. Only one of the second limiter and the fourth limiter may be provided. Only one of the first limiter and the third limiter may be provided. In an embodiment, the first limiter 926, the second limiter 927, the third limiter 928 and the fourth limiter 929 are ribs. Moreover, the reinforcing rib is configured to be connected to these limiters to enhance the firmness of the limiters. The limiters 926, 927, 928, 929 include other suitable structures.

Figures 10A, 10B:
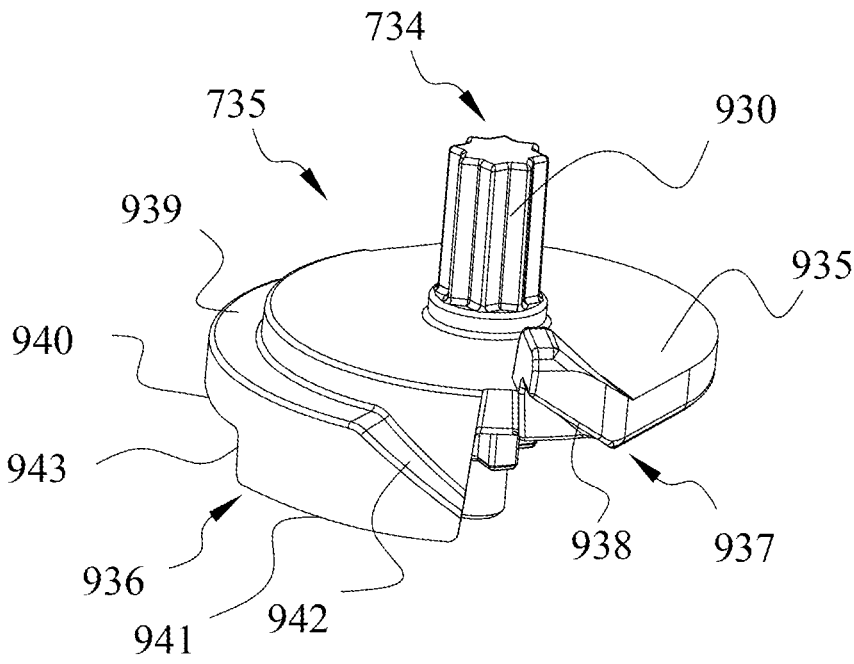
FIG. 10A is a perspective view of a driving shaft and a driving member shown in FIG. 9C.
FIG. 10B is a perspective view, viewed at another angle, of the driving shaft and the driving member shown in FIG. 9C.
Figure 10C:
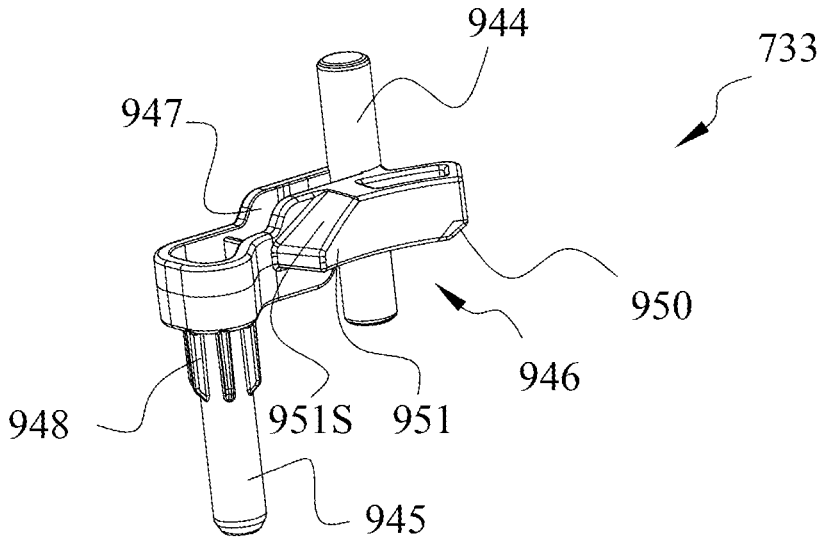
FIG. 10C is a perspective view of a transmission rod assembly shown in FIG. 9C.
Figure 10D:
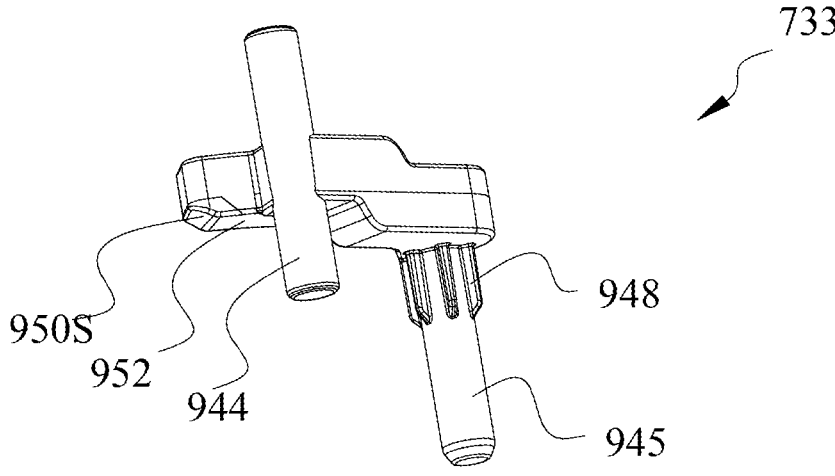
FIG. 10D is a perspective view, viewed at another angle, of the transmission rod assembly shown in FIG. 9C.
Figure 10E:
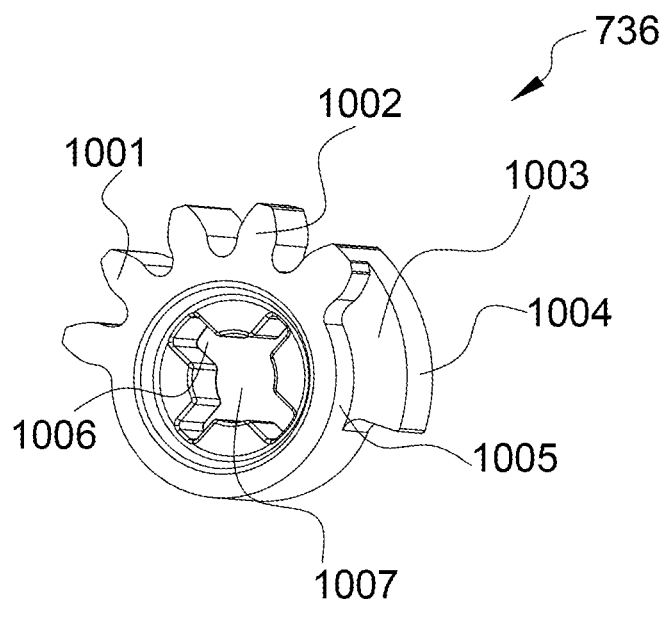
FIG. 10E is a perspective view, viewed from the front, of a driving gear shown in FIG. 9C.
Figure 10F:
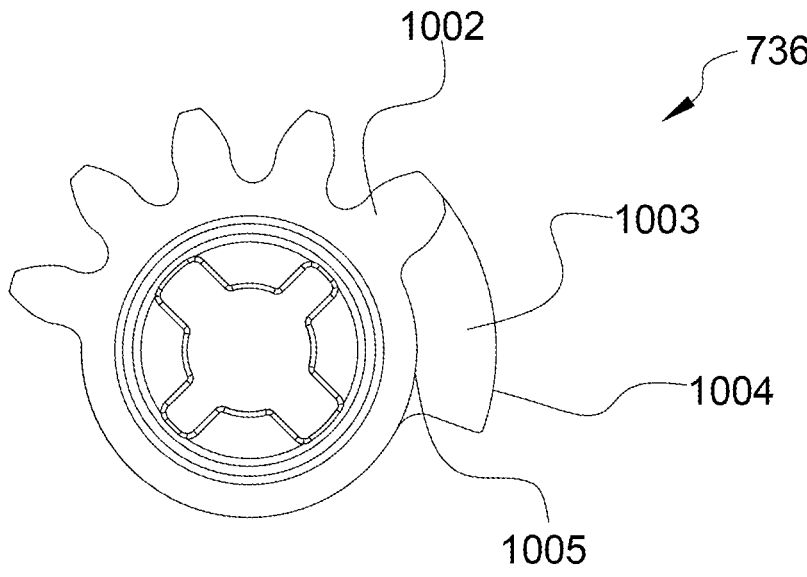
FIG. 10F is a front view of FIG. 10E.
Figure 10G:
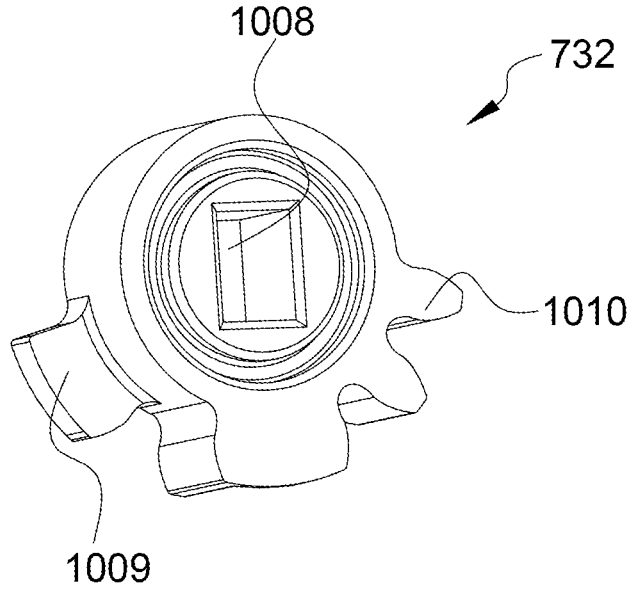
FIG. 10G is a perspective view, viewed from the front, of a transmission gear shown in FIG. 9C.
Figure 10H:
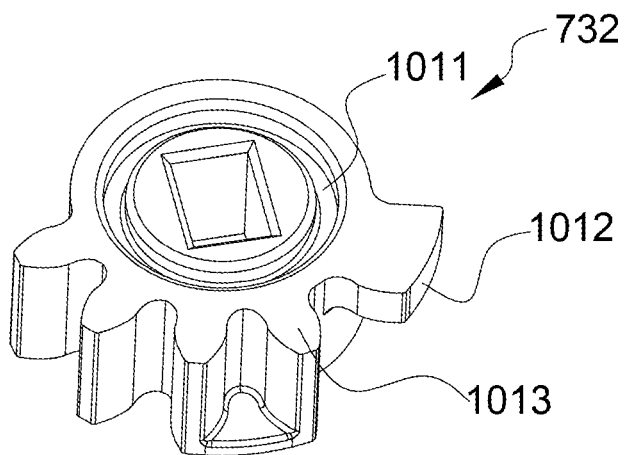
FIG. 10H is a perspective view, viewed from the rear, of the transmission gear shown in FIG. 9C.
Figure 10I:
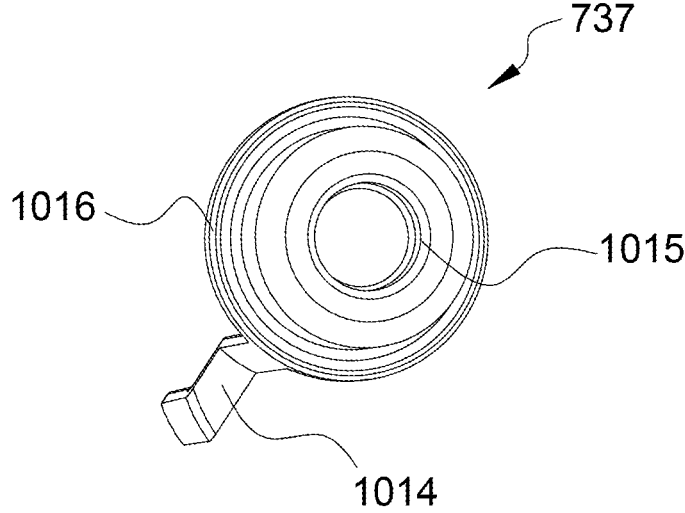
FIG. 10I is a perspective view, viewed from the rear, of a seal shown in FIG. 9C.

FIG. 10A is a perspective view of the driving shaft 734 and the driving member 735 as shown in FIG. 9C; FIG. 10B is a perspective view, viewed at another angle, of the driving shaft 734 and the driving member 735 shown in FIG. 9C; FIG. 10C is a perspective view of the transmission rod assembly 733 shown in FIG. 9C; FIG. 10D is a perspective view, viewed at another angle, of the transmission rod assembly 733 shown in FIG. 9C; FIG. 10E is a perspective view, viewed from the front, of the driving gear 736 shown in FIG. 9C; FIG. 10F is a front view of FIG. 10E; FIG. 10G is a perspective view, viewed from the front, of the transmission gear 732 shown in FIG. 9C; FIG. 10H is a perspective view, viewed from the rear, of the transmission gear 732 shown in FIG. 9C; and FIG. 10I is a perspective view, viewed from the rear, of the seal 737 shown in FIG. 9C.

As shown in FIGS. 10A through 10I, the actuation device 730 comprises a driving device, a transmission gear 732 and a transmission rod assembly 733. The driving device comprises a driving shaft 734, a driving member 735 and a driving gear 736. The structure and function of the driving shaft 734 shown in FIGS. 10A through 10B are similar to those of the driving shaft 134 in FIGS. 5A through 5D. The driving shaft 734 comprises a connection portion 930 and an assembly portion 931. The assembly portion 931 comprises a protrusion 932 and an end 934. The driving member 735 and the transmission rod assembly 733 have corresponding cooperation structures, such that the rotational motion of the driving member 735 can be converted into the linear motion of the transmission rod assembly 733 and the direction of the linear motion is parallel to the direction of the rotation axis about which the rotational motion is performed. As shown in FIGS. 10A through 10B, the driving member 735 comprises a generally circular base body 935, an unlocking driving portion 936 and a locking driving portion 937. The unlocking driving portion 936 and the locking driving portion 937 can rotate about the axis of the driving shaft 734. The unlocking driving portion 936 is arranged partially along the periphery of the base body 935. The unlocking driving portion 936 comprises a flat upper surface 939, a flat intermediate surface 940, a flat lower surface 941, an unlocking driving slope 942 and a limiting surface 943. The unlocking driving slope 942 is arranged obliquely relative to the axis of the driving shaft 734. The unlocking driving slope 942 cooperates with the unlocking engagement slope 950S (see FIG. 10D) of the transmission rod assembly 733. The locking driving portion 937 is arranged along the periphery of the base body 935 and extends from the base body 935 in a direction away from the unlocking driving portion 936. The bottom of the locking driving portion 937 is provided with a locking driving slope 938. The locking driving slope 938 is arranged obliquely relative to the axis of the driving shaft 734. The locking driving slope 938 cooperates with the locking engagement slope 951S (see FIG. 10C) of the transmission rod assembly 733. The locking driving portion 937 is circumferentially separated by a distance from the unlocking driving portion 936.

As shown in FIGS. 10C through 10D, the transmission rod assembly 733 comprises a guiding rod portion 944, a locking rod portion 945 (linear output portion), an inner circumferential portion 946 and an outer circumferential portion 947. The outer circumferential portion 947 is arranged partially around the inner circumferential portion 946 and is radially connected to the inner circumferential portion 946. The driving device (comprising the driving member 735) can drive the inner circumferential portion 946 and thus drive the outer circumferential portion 947 to perform a reciprocating linear motion in a direction parallel to the axis of the driving shaft 734 to lock and unlock the flap 790.

The guiding rod portion 944 is accommodated in the transmission rod accommodating cavity 924 (see FIG. 9G) of the rear housing 902. The guiding rod portion 944 is arranged parallel to the locking rod portion 945 (linear output portion). The locking rod portion 945 (linear output portion) and the guiding rod portion 944 are configured such that the linear motion mechanism 733 moves linearly around the driving device in the direction parallel to the axis of the driving shaft 734 without radial deviation. The locking rod portion 945 (linear output portion) is arranged parallel to the direction of the axis of the driving shaft 734. The locking rod portion 945 (linear output portion) can move linearly in the direction parallel to the axis of the driving shaft 734 to block and release the locking engagement portion 720 connected to the flap 790, so as to lock and unlock the flap 790. As shown in FIGS. 7A through 7D, the locking rod portion 945 of the transmission rod assembly 733 can move rearward through opening 905, so as to be engaged with the locking engagement portion 720 to lock the flap 790. The locking rod portion 945 of the transmission rod assembly 733 can move frontward from the opening 905, so as to be disengaged from the locking engagement portion 720 to unlock the flap 790. The locking engagement portion 720 is arranged on a hinge 770 (flap connecting mechanism) connected to the flap 790. The locking rod portion 945 is provided with an axial protrusion 948. The axial protrusion 948 cooperates with the inner structure of the opening 905 of the rear housing 902. An axial guiding groove 949 (see FIG. 9G) is provided inside the boss 925 for guiding the axial protrusion 948 to move, so as to guide the locking rod portion 945 to move linearly.

The inner circumferential portion 946 is arranged partially around the driving device (driving mechanism). The inner circumferential portion 946 is configured to cooperate with the driving device such that the transmission rod assembly 733 (linear motion mechanism) reciprocates along a predetermined linear path to unlock and lock the flap 790. The inner circumferential portion 946 is proximate to the driving member 735 and is engaged with the driving member 735. The inner circumferential portion 946 comprises an unlocking engagement portion 950, a locking engagement portion 951 and a bottom surface 952. The unlocking engagement portion 950 and the locking engagement portion 951 are respectively arranged at opposite ends of the inner circumferential portion 946. The unlocking driving portion 936 of the driving member 735 and the unlocking engagement portion 950 of the transmission rod assembly 733 are configured such that when the driving device rotates in a first rotational direction, the unlocking driving portion 936 can rotate to come into contact with and drive the unlocking engagement portion 950, so as to cause the transmission rod assembly 733 (linear motion mechanism) to move linearly in a first linear direction parallel to the axis of the driving shaft 734 to unlock the flap 790. The locking driving portion 937 of the driving member 735 and the locking engagement portion 951 of the transmission rod assembly 733 are configured such that when the driving device rotates in a second rotational direction, the locking driving portion 937 can rotate to come into contact with and drive the locking engagement portion 951, so as to cause the transmission rod assembly 733 (linear motion mechanism) to move linearly in a second linear direction parallel to the axis of the driving shaft 734 to lock the flap 790. The first rotational direction is opposite to the second rotational direction, and the first linear direction is opposite to the second linear direction.

The unlocking engagement portion 950 comprises an unlocking engagement slope 950S, and the locking engagement portion 951 comprises a locking engagement slope 951S. The unlocking engagement slope 950S is arranged facing the unlocking driving slope 942 of the unlocking driving portion 936. The locking engagement slope 951S is arranged facing the locking driving slope 938. The unlocking engagement slope 950S of the unlocking engagement portion 950 and the unlocking driving slope 942 of the unlocking driving portion 936 are configured such that when the unlocking driving portion 936 rotates in the first rotational direction, the unlocking driving slope 942 can come into contact with and drive the unlocking engagement slope 950S, so as to drive the linear motion mechanism 733 to move linearly in the first linear direction to unlock the flap 790. The locking driving slope 938 and the locking engagement slope 951S are configured such that when the locking driving portion 937 rotates in the second rotational direction, the locking driving slope 938 can come into contact with and drive the locking engagement slope 951S, so as to drive the linear motion mechanism 733 to move linearly in the second linear direction to lock the flap 790.

The bottom surface 952 of the transmission rod assembly 733 can be engaged with the flat upper surface 939 of the driving member 735. When the flat upper surface 939 moves below the bottom surface 952, the transmission rod assembly 733 maintains the axial position, that is, keeps unlocking the flap. The outer circumferential portion 947 has one end connected to the guiding rod portion 944, and the other end connected to the locking rod portion 945. The outer circumferential portion 947 is configured to define the relative positions of the guiding rod portion 944 and the locking rod portion 945. The accommodating cavity 917 of the front housing 901 and the transmission rod accommodating cavity 924 of the rear housing 902 are configured to accommodate the guiding rod portion 944 and limit the axial movement of the guiding rod portion 944.

As shown in FIGS. 10E through 10H, the driving gear 736 comprises a first driving tooth 1001, driving teeth 1002, an accommodating portion 1003, a driving gear abutting portion 1004, and a driving gear limiting surface 1005, which respectively correspond to and have basically the same functions as the first driving tooth 501, the driving teeth 502, the accommodating portion 508, the driving gear abutting portion 504 and the driving gear limiting surface 510 of the driving gear 136 in FIGS. 5E through 5F. The driving gear 736 further comprises an accommodating cavity 1006 and a shaft hole 1007, which respectively correspond to and have basically the same functions as the accommodating cavity 245 and the shaft hole 244 of the driving gear 136 in FIGS. 5E through 5F.

The transmission gear 732 comprises an opening 1008, transmission teeth 1010, an abutting tooth 1013, a transmission gear abutting portion 1009 and an annular recess 1011. The transmission gear abutting portion 1009 comprises a transmission gear limiting surface 1012. The transmission teeth 1010, the abutting tooth 1013, the transmission gear abutting portion 1009, the annular recess 1011 and the transmission gear limiting surface 1012 of the transmission gear 732 respectively correspond to and have basically the same functions as the transmission teeth 511, the abutting tooth 513, the transmission gear abutting portion 512, the annular recess 265 and the transmission gear limiting surface 514 of the transmission gear 132 in FIGS. 5I through 5J. The driving gear and the transmission gear in this embodiment can be replaced by the driving gear and the transmission gear in FIGS. 5E through 5F and FIGS. 5I through 5J, and also include other suitable structures of driving gears and transmission gears.

The seal 737 shown in FIG. 10I is similar to the seal 137 in FIG. 4E. As shown in FIG. 10I, the seal 737 comprises an opening 1015, an extension portion 1014 and a main body 1016. The opening 1015 is aligned with the opening 905 of the rear housing 905, and the locking rod portion 945 of the transmission rod assembly 733 extends from the opening 905 to the opening 1015 and through the opening 1015. The extension portion 1014 is engaged with the recessed portion 960 on the rear housing 902. The seal 737 can seal the opening 905 and the locking rod portion 945 to prevent contamination from entering the housing from the outside.

Figure 11A:
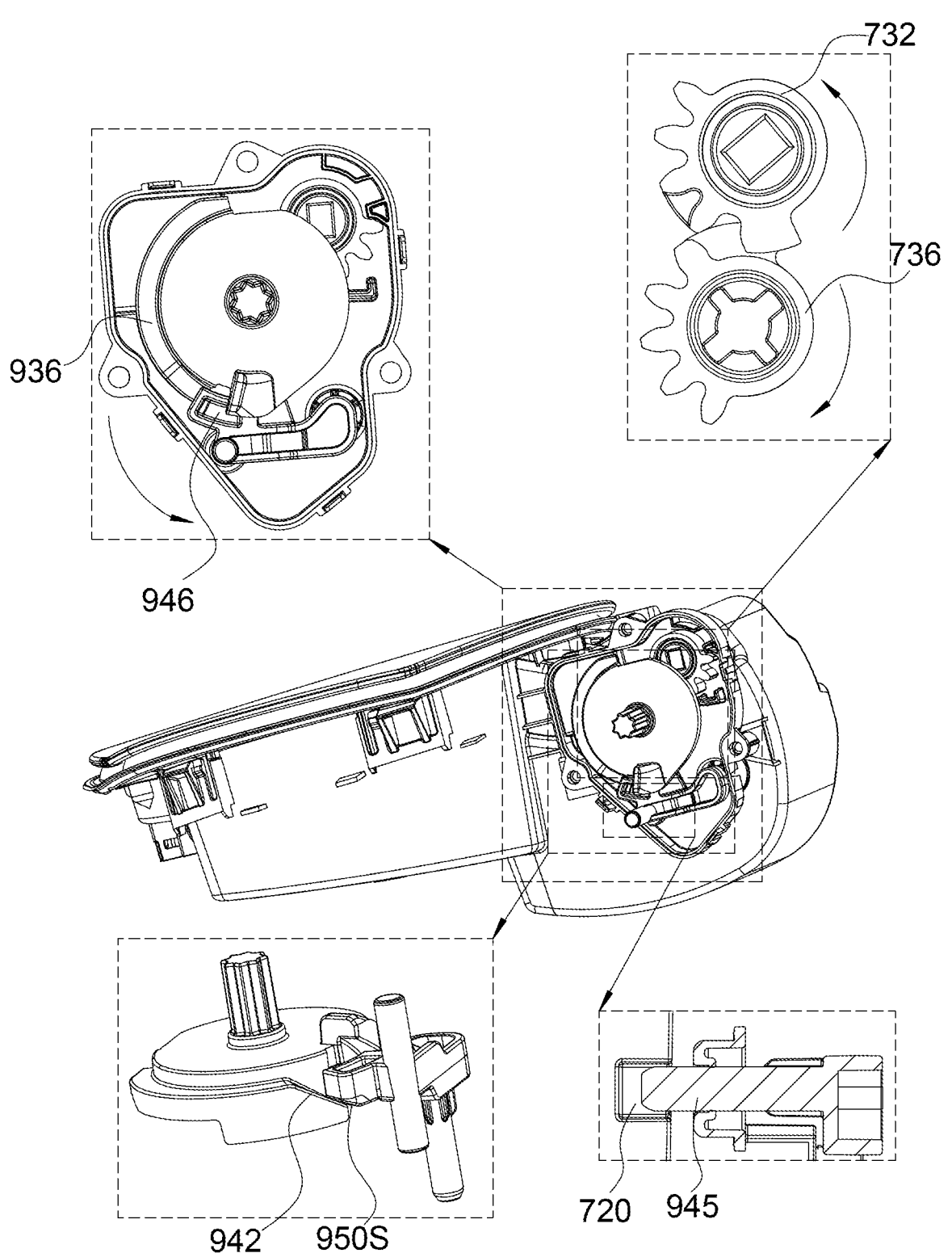
FIG. 11A is a schematic diagram showing the state of a flap assembly, with the transmission rod assembly (locking mechanism) in a locked position and a flap in a closed position.
Figure 11B:
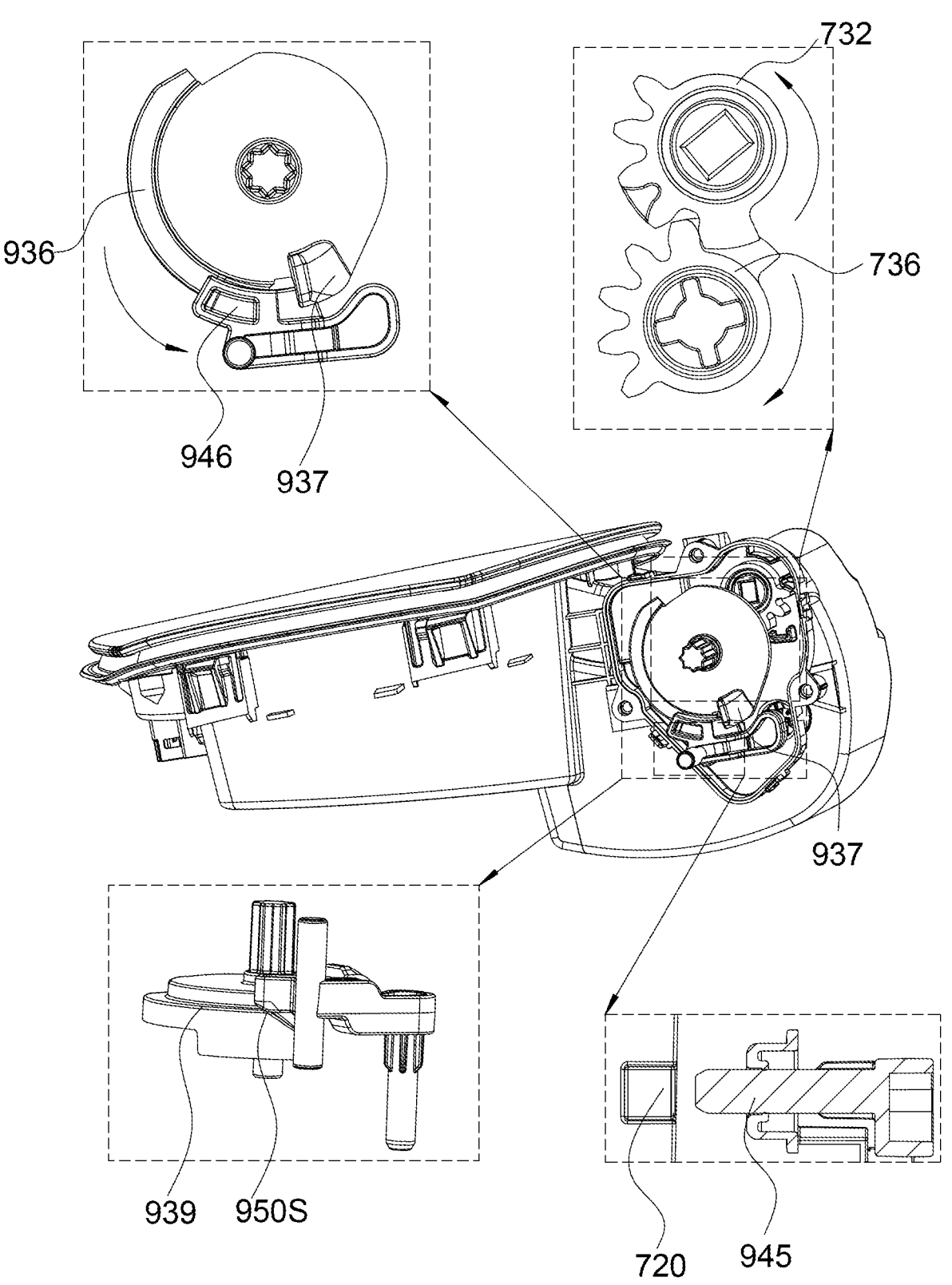
FIG. 11B is a schematic diagram showing the state of the flap assembly, with the transmission rod assembly (locking mechanism) in an unlocked position and the flap in the closed position.
Figure 11C:
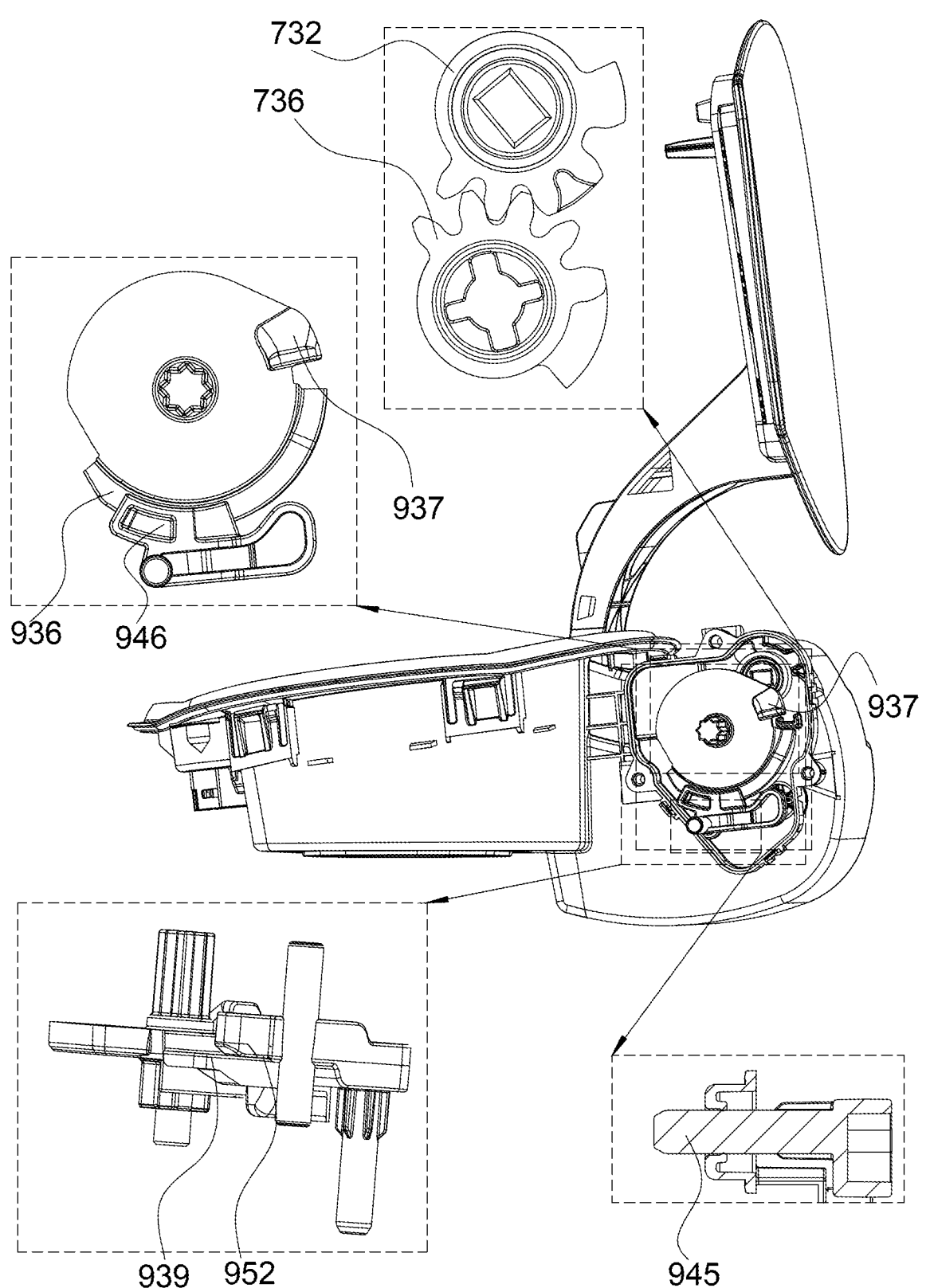
FIG. 11C is a schematic diagram showing the state of the flap assembly, with the flap completely opened.
Figure 11D:
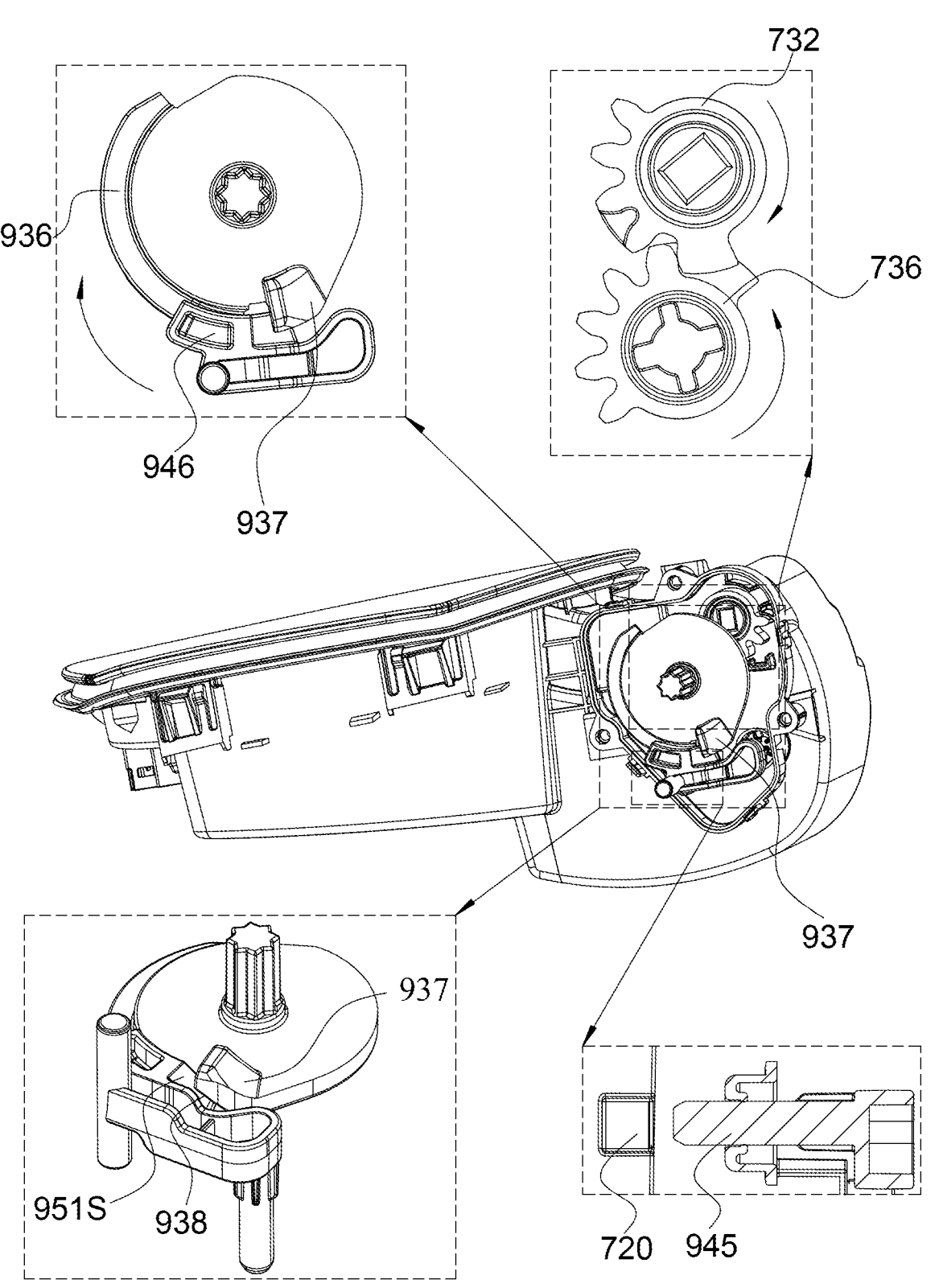
FIG. 11D is a schematic diagram showing the state of the flap assembly, with the transmission rod assembly (locking mechanism) in the unlocked position and the flap in the closed position.
Figure 11E:
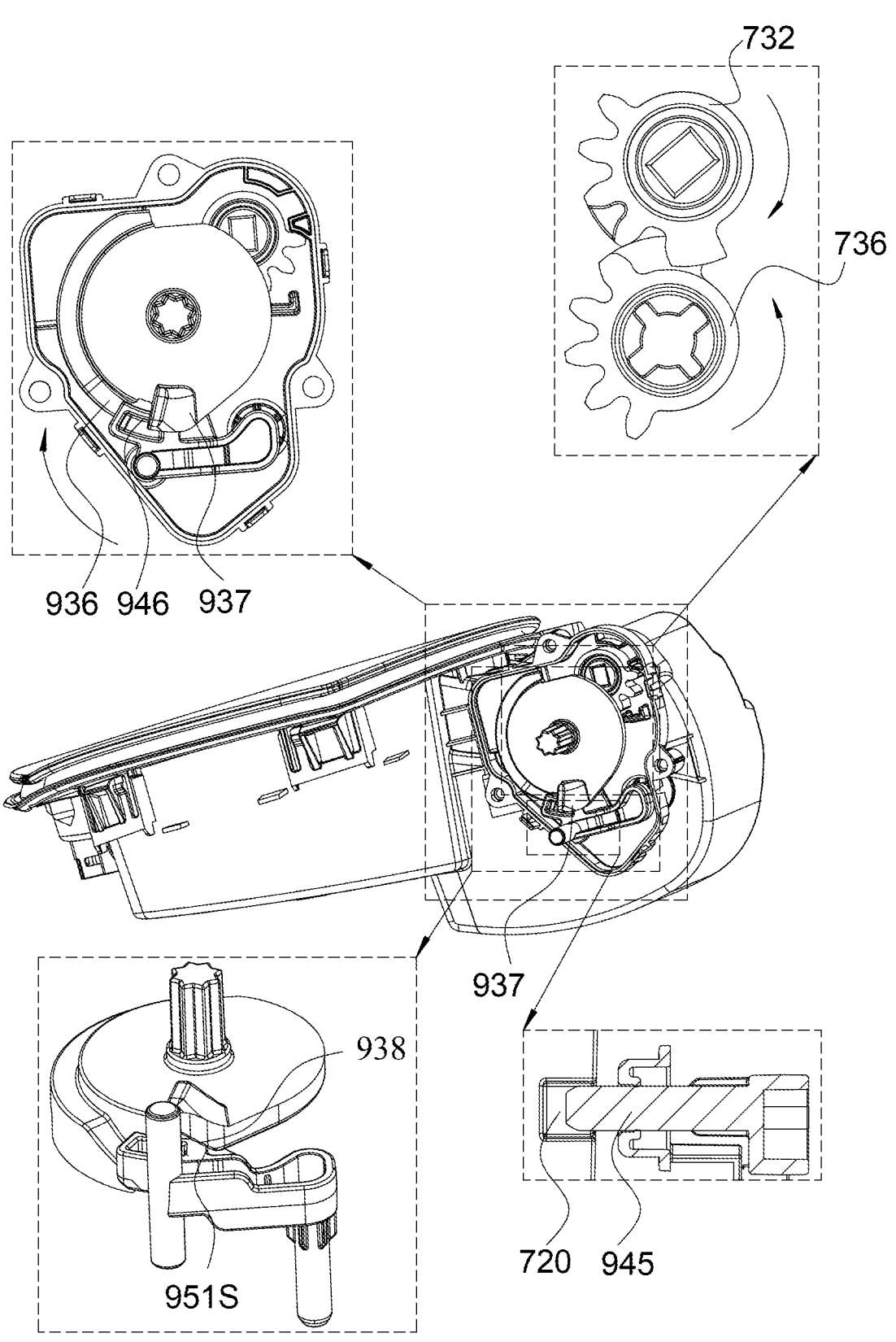
FIG. 11E is a schematic diagram showing the state of the flap assembly, with the transmission rod assembly (locking mechanism) in the locked position and the flap in the closed position.

FIGS. 11A through 11C show the process of unlocking and opening the flap 790, and FIGS. 11C through 11E show the process of closing and locking the flap 790, which are similar to the process of unlocking and opening the flap and the process of closing and locking the flap shown in FIGS. 6A through 6E, except that the locked position in FIGS. 6A through E is at the flap hole 111, and the locked position in FIGS. 11A through E is at the locking engagement portion 720. Other processes will not be repeated here. FIG. 11A is a schematic diagram showing the state of the flap assembly 700, with the transmission rod assembly 733 (locking mechanism) in the locked position and the flap 790 in the closed position; FIG. 11B is a schematic diagram showing the state of the flap assembly 700, with the transmission rod assembly 733 (locking mechanism) in the unlocked position and the flap 790 in the closed position; FIG. 11C is a schematic diagram showing the state of the flap assembly 700 with the flap 790 completely opened; FIG. 11D is a schematic diagram showing the state of the flap assembly 700, with the transmission rod assembly 733 (locking mechanism) in the unlocked position and the flap 790 in the closed position; and FIG. 11E is a schematic diagram showing the state of the flap assembly 700, with the transmission rod assembly 733 (locking mechanism) in the locked position and the flap 790 in the closed position. For the convenience of illustration of the positional relationship of the components in different states in FIGS. 11A through 11E, the power source 150 and the front housing 901 are removed from FIGS. 11A through 11E to better show the cooperative relationship of the components of the flap assembly 700. Rectangular dashed boxes on the lower right sides of FIGS. 11A through 11E show enlarged views of the cooperative relationship of the locking rod portion 945 of the transmission rod assembly 733 and the locking engagement portion 720 of the hinge 770. Rectangular dashed boxes on the upper left sides of FIGS. 11A through 11E show enlarged views, viewed from front to back, of the cooperative relationship between the driving member 735 and the transmission rod assembly 733. Rectangular dashed boxes on the lower left sides of FIGS. 11A through 11C show enlarged perspective views, viewed from the left, of the cooperative relationship between the driving member 735 and the transmission rod assembly 733. Rectangular dashed boxes on the lower left sides of FIGS. 11D through 11E show enlarged perspective views, viewed from the front, of the cooperative relationship between the driving member 735 and the transmission rod assembly 733. Rectangular dashed boxes on the upper right sides of FIGS. 11A through 11E show enlarged views, viewed from back to front, of the cooperative relationship between the driving gear 736 and the transmission gear 732.

FIGS. 11A through 11C show the process of unlocking and opening the flap 790. As shown in FIG. 11A, the flap 790 is in the closed position, and the transmission rod assembly 733 is in the locked position. In the locked position, the locking rod portion 945 (linear output portion) of the transmission rod assembly 733 blocks the locking engagement portion 720 connected to the flap 790, so as to retain the flap 190 in the closed position. The unlocking driving slope 942 of the driving member 735 is adjacent to the unlocking engagement slope 950S of the transmission rod assembly 733, and the unlocking engagement slope 950S is located at the right end of the unlocking driving slope 942. The unlocking driving slope 942 is in a critical state of engagement and disengagement with the unlocking engagement slope 950S.

The process from FIG. 11A to FIG. 11B show an unlocking process of the transmission rod assembly 733. During this process, the power source 150 drives the driving device to rotate in the counterclockwise direction, so the driving member 735 rotates in the counterclockwise direction (that is, rotates in the counterclockwise direction in the rectangular dashed box on the upper left side of FIG. 11A), and the driving gear 736 rotates in the counterclockwise direction (that is, rotates in the clockwise direction in the rectangular dashed box on the upper right side of FIG. 11A). During the rotation of the driving member 735 in the counterclockwise direction, the unlocking driving slope 942 of the driving member 735 abuts against and pushes the unlocking engagement slope 950S of the transmission rod assembly 733, and pushes the locking rod portion 945 (linear output portion) on the transmission rod assembly 733 to move frontward, so as to release the locking engagement portion 720, so that the flap 790 is in the unlocked position and can be opened. As shown in FIG. 11B, the top end of the unlocking driving slope 942 of the driving member 735 moves below the unlocking engagement slope 950S of the transmission rod assembly 733 (see the rectangular dashed box on the lower left side in FIG. 11B). The driving gear 736 does not drive the transmission gear 732 to rotate in this case. Accordingly, during the process from FIG. 11A to FIG. 11B, the transmission rod assembly 733 is moved from the locked position to the unlocked position, and since the driving gear 736 rotates relative to the transmission gear 732, the flap rotating shaft 771 does not move, and the flap 790 remains in the closed position.

The process from FIG. 11B to FIG. 11C shows the process of the flap 790 from the closed position to the open position. During this process, the power source 150 continues to drive the driving device to rotate in the counterclockwise direction, and therefore both the driving member 735 and the driving gear 736 also continue to rotate in the counterclockwise direction. As shown in FIG. 11B, during the rotation of the driving gear 736 in the counterclockwise direction, the driving gear 736 no longer rotates relative to the transmission gear 732, but starts to drive the transmission gear 732 to rotate in the clockwise direction (i.e., the first direction). In this way, the transmission gear 732 drives the hinge 770 to rotate, moving the flap 790 to the open position shown in FIG. 11C. During the process from FIG. 11B to FIG. 11C, the driving member 735 rotates in the counterclockwise direction, and the flat upper surface 939 of the driving member 735 moves in the counterclockwise direction below the bottom surface 952 of the transmission rod assembly 733, such that the transmission rod assembly 733 maintains the axial position, that is, maintains the state of unlocking the flap.

FIGS. 11C through 11E show the process of closing and locking the flap 790. The process from FIG. 11C to FIG. 11D shows the process of the flap 790 from the open position to the closed position. During this process, the power source 150 drives the driving device to rotate in the clockwise direction, so the driving member 735 rotates in the clockwise direction (that is, rotates in the clockwise direction in the rectangular dashed box on the upper left side of FIG. 11D), and the driving gear 736 also rotates in the clockwise direction (that is, rotates in the counterclockwise direction in the rectangular dashed box on the upper right side of FIG. 11D). During the rotation of the driving gear 736 in the clockwise direction, the clockwise rotation of the driving gear 736 can drive the transmission gear 732 to rotate in the counterclockwise direction (i.e., a second direction), and the rotation of the transmission gear 732 drives the flap 790 to rotate in the counterclockwise direction such that the flap 790 rotates to the closed position as shown in FIG. 11D.

In the process from FIG. 11C to FIG. 11D, when the driving member 735 rotates in the clockwise direction, the flat upper surface 939 of the driving member 735 moves in the clockwise direction below the bottom surface 952 of the transmission rod assembly 733 until, in the position as shown in FIG. 11D, the flat upper surface 939 of the driving member 735 starts to be disengaged from the bottom surface 952 of the transmission rod assembly 733. At this time, the locking driving slope 938 of the locking driving portion 937 of the driving member 735 starts to be engaged with the locking engagement slope 951S of the transmission rod assembly 733.

In the process from FIG. 11D to FIG. 11E, the power source 150 drives the driving device to continue to rotate in the clockwise direction. In one aspect, the rotation of the driving gear 736 no longer drives the transmission gear 732 to rotate. In this case, the driving gear 736 rotates relative to the transmission gear 732. The driving gear 736 continues to rotate in the clockwise direction until it no longer continues to rotate in the clockwise direction. In another aspect, during the rotation of the driving member 735 in the clockwise direction, the locking driving slope 938 of the locking driving portion 937 of the driving member 735 comes into contact with and drives the locking engagement slope 951S of the transmission rod assembly 733 to move rearward, such that the locking rod portion 945 (linear output portion) of the transmission rod assembly 733 moves from the position in which the locking engagement portion 720 is released to the position in which the locking engagement portion 720 is blocked. As shown in FIG. 11E, the locking rod portion 945 (linear output portion) is in the position in which the locking engagement portion 720 is blocked, so as to retain the flap 190 in the closed position. At this time, the bottom end of locking driving slope 938 of the locking driving portion 937 of the driving member 735 is engaged with the top end of the locking engagement slope 951S of the transmission rod assembly 733 (see the rectangular dashed box on the upper left side of FIG. 11E). The positions of the flat upper surface 939 of the driving member 735, the unlocking driving slope 942 and the unlocking engagement slope 950S of the transmission rod assembly 733 in FIGS. 11D through 11E are the same as the positions of the flat upper surface 939, the unlocking driving slope 942 and the unlocking engagement slope 950S in FIGS. 11B and 11A.

Figure 12:
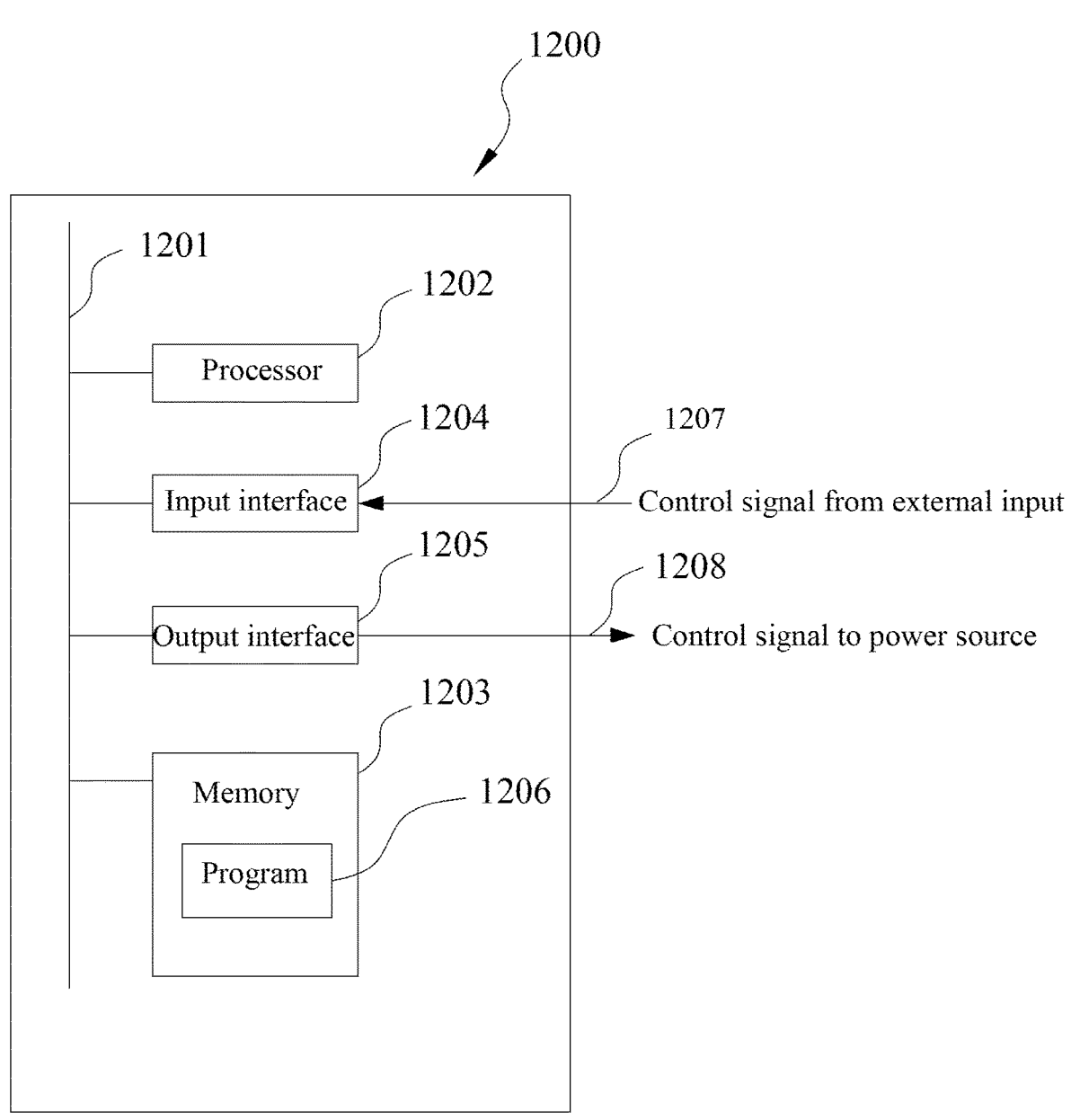
FIG. 12 is a block diagram of a controller.

FIG. 12 is a block diagram of a controller 1200. As shown in FIG. 12, the controller 1200 comprises a bus 1201, a processor 1202, a memory 1203, an input interface 1204, and an output interface 1205. The processor 1202, the memory 1203, the input interface 1204, and the output interface 1205 are connected to the bus 1201. The processor 1202 can read programs (or instructions) 1206 from the memory 1203 and execute the programs (or the instructions) 1206 to control the power source 150. The processor 1202 can further write data or programs (or instructions) into the memory 1203. The memory 1203 can store the programs (instructions) or the data. By executing the instructions in the memory 1203, the processor 1202 can control the memory 1203, the input interface 1204, and the output interface 1205.

The input interface 1204 is configured to receive a control signal from an external input through a connection line 1207 and convert the control signal into a signal recognizable by the processor 1202. The processor 1202 processes the received signal to output a power source control signal. The output interface 1205 is configured to receive the power source control signal from the processor 1202, convert the power source control signal into an output control signal suitable for the power source 150, and send to the power source 150 the output control signal through a connection line 1208. The power source 150 receives the output control signal to start to provide a driving force.

The actuation device of the present disclosure at least produces the following beneficial effects:

1. the housing structure of the actuation device enables all the components in the housing to work and achieve complete and independent functions without relying on the component to which they are mounted outside the housing;
2. the motion input and the motion output of the actuation device each have a predetermined structure and size, and the mounting structure of the actuation device has a predetermined structure and size, so that the design and manufacture of the actuation device can be simplified, and the mounting of the actuation device is facilitated; and
3. a direction of the linear motion output of the actuation device is configured to be parallel to a direction of an axis about which the rotary motion output is performed, and the actuation device of such a configuration can reduce transmission distances of the motion outputs and simplify the mechanical structure.

It should be noted that although the flap in the refueling port or charging port flap assembly of the present disclosure is rotatable relative to the base, translation or other movements of the flap relative to the base shall also fall within the scope of protection of the present disclosure.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. Furthermore, the technical effects and/or technical problems described in this description are exemplary rather than limiting; therefore, the disclosure in this description may be used to solve other technical problems and have other technical effects and/or may solve other technical problems. Accordingly, the examples of the embodiments of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements, and/or substantial equivalents.

What is claimed is:

1. An actuation device for actuating a flap movably mounted on a base, the actuation device comprising:
   a housing;
   a rotary motion mechanism and a linear motion mechanism mounted inside the housing;
   a rotary output mechanism connected to an outside of the housing and
   a linear output mechanism connected to the outside of the housing,
   wherein the rotary output mechanism is configured to open and close the flap, and the linear output mechanism is configured to lock and unlock the flap, and
   wherein the rotary motion mechanism and the linear motion mechanisms are configured to operate independently of components to which they are mounted outside the housing.

2. The actuation device according to claim 1, wherein the actuation device further comprises:
   a power input mechanism configured to receive power provided by a power source, so as to drive the rotary motion mechanism and the linear motion mechanism.

3. The actuation device according to claim 2, wherein the rotary output mechanism, the linear output mechanism and the power input mechanism each have a predetermined structure and size.

4. The actuation device according to claim 3, wherein the housing comprises a mounting component having a predetermined structure and size.

5. The actuation device according to claim 4, wherein the actuation device is mounted on the base by means of the mounting component;
   the rotary output mechanism cooperates with a rotary driving mechanism mounted on the base; and
   the linear output mechanism cooperates with a linear driving mechanism mounted on the base, or the linear output mechanism cooperates with a flap connecting mechanism connected to the flap.

6. The actuation device according to claim 5, wherein the flap is opened and closed by the rotary driving mechanism; and
   the flap is locked and unlocked by the linear driving mechanism.

7. A refueling port or charging port flap assembly, comprising:
   a base;
   a flap movably mounted on the base; and
   an actuation device according to claim 1 arranged on the base.

8. The refueling port or charging port flap assembly of claim 7, wherein the refueling port or charging port flap assembly further comprises:

a power source arranged on the actuation device.

9. An actuation device for actuating a flap movably mounted on a base, the actuation device comprising:

a rotary motion mechanism configured to rotate about a rotation axis to open and close the flap;

a linear motion mechanism configured to move linearly to lock and unlock the flap; and a driving mechanism connected to the rotary motion mechanism and the linear motion mechanism, and configured to drive the rotary motion mechanism and the linear motion mechanism, wherein a direction in which the linear motion mechanism moves linearly is parallel to a direction of the rotation axis about which the rotary motion mechanism rotates.

10. The actuation device according to claim 9, wherein the driving mechanism comprises a driving shaft, and is configured to be capable of rotating about an axis of the driving shaft so as to drive the rotary motion mechanism to rotate about the rotation axis and to drive the linear motion mechanism to move linearly, the direction of the rotation axis about which the rotary motion mechanism rotates is parallel to a direction of the axis of the driving shaft, and the direction in which the linear motion mechanism moves linearly is parallel to the direction of the axis of the driving shaft.

11. The actuation device according to claim 10, wherein the linear motion mechanism comprises an inner circumferential portion arranged partially around the driving mechanism, wherein the inner circumferential portion is configured to cooperate with the driving mechanism such that the linear motion mechanism reciprocates along a predetermined linear path to unlock and lock the flap.

12. The actuation device according to claim 11, wherein the driving mechanism comprises an unlocking driving portion configured to be capable of rotating about the axis of the driving shaft; and the inner circumferential portion of the linear motion mechanism comprises an unlocking engagement portion, wherein the unlocking driving portion and the unlocking engagement portion are configured such that when the driving mechanism rotates in a first rotational direction, the unlocking driving portion is capable of rotating to come into contact with and drive the unlocking engagement portion, so as to cause the linear motion mechanism to move linearly in a first linear direction parallel to the axis of the driving shaft to unlock the flap.

13. The actuation device according to claim 12, wherein the driving mechanism further comprises a locking driving portion configured to be capable of rotating about the axis of the driving shaft, and the unlocking driving portion and the locking driving portion are separated by a distance in a circumferential direction; and the inner circumferential portion of the linear motion mechanism further comprises a locking engagement portion, and the unlocking engagement portion and the locking engagement portion are respectively arranged at two opposite ends of the inner circumferential portion, wherein the locking driving portion and the locking engagement portion are configured such that when the driving mechanism rotates in a second rotational direction, the locking driving portion is capable of rotating to come into contact with and drive the locking engagement portion, so as to cause the linear motion mechanism to move linearly in a second linear direction parallel to the axis of the driving shaft to lock the flap, wherein the first rotational direction is opposite to the second rotational direction, and the first linear direction is opposite to the second linear direction.

14. The actuation device according to claim 13, wherein the locking driving portion comprises a locking driving slope arranged obliquely relative to the axis of the driving shaft; and the locking engagement portion comprises a locking engagement slope arranged facing the locking driving slope, wherein the locking driving slope and the locking engagement slope are configured such that when the locking driving portion rotates in the second rotational direction, the locking driving slope is capable of coming into contact with and driving the locking engagement slope, so as to drive the linear motion mechanism to move linearly in the second linear direction to lock the flap.

15. The actuation device according to claim 12, wherein the unlocking driving portion comprises an unlocking driving slope arranged obliquely relative to the axis of the driving shaft; and the unlocking engagement portion comprises an unlocking engagement slope arranged facing the unlocking driving slope, wherein the unlocking driving slope and the unlocking engagement slope are configured such that when the unlocking driving portion rotates in the first rotational direction, the unlocking driving slope is capable of coming into contact with and driving the unlocking engagement slope, so as to drive the linear motion mechanism to move linearly in the first linear direction to unlock the flap.

16. The actuation device according to claim 11, wherein the linear motion mechanism further comprises an outer circumferential portion arranged partially around the inner circumferential portion and radially connected to the inner circumferential portion, wherein the driving mechanism is configured to be capable of driving the inner circumferential portion and thus driving the outer circumferential portion to move linearly in a direction parallel to the axis of the driving shaft to lock and unlock the flap.

17. The actuation device according to claim 16, wherein the outer circumferential portion is provided with a linear output portion arranged parallel to the direction of the axis of the driving shaft, and the linear output portion is configured to be capable of linearly moving in the direction parallel to the axis of the driving shaft to lock and unlock the flap.

18. The actuation device according to claim 17, wherein the linear output portion is configured to be capable of moving linearly in the direction parallel to the axis of the driving shaft to block and release a locking engagement portion connected to the flap, so as to lock and unlock the flap, and the locking engagement portion is arranged on a flap connecting mechanism connected to the flap.

19. The actuation device according to claim 17, wherein the outer circumferential portion is further provided with a guiding rod portion arranged parallel to the linear output portion, wherein the linear output portion and the guiding rod portion are configured such that the linear motion mechanism moves linearly around the driving mechanism in the direction parallel to the axis of the driving shaft without radial deviation.

20. The actuation device according to claim 9, wherein the actuation device is capable of being mounted in a separate housing and operates independently.

\* \* \* \* \*